United States Patent
Kundu et al.

(10) Patent No.: US 11,580,785 B1
(45) Date of Patent: Feb. 14, 2023

(54) DETECTING INTERACTIONS WITH NON-DISCRETIZED ITEMS AND ASSOCIATING INTERACTIONS WITH ACTORS USING DIGITAL IMAGES

(71) Applicant: Amazon Technologies, Inc., Seattle, WA (US)

(72) Inventors: Kaustav Kundu, Seattle, WA (US); Pahal Kamlesh Dalal, Seattle, WA (US); Nishitkumar Ashokkumar Desai, Redmond, WA (US); Jayakrishnan Kumar Eledath, Kenmore, WA (US); Geoffrey A. Franz, Seattle, WA (US); Gerard Guy Medioni, Seattle, WA (US); Hoi Cheung Pang, Bellevue, WA (US); Rakesh Ramakrishnan, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/436,500

(22) Filed: Jun. 10, 2019

(51) Int. Cl.
*G06T 7/246* (2017.01)
*G06N 20/00* (2019.01)
*G06V 40/20* (2022.01)
*G06V 20/64* (2022.01)
*G06V 40/10* (2022.01)

(52) U.S. Cl.
CPC .......... *G06V 40/25* (2022.01); *G06N 20/00* (2019.01); *G06T 7/246* (2017.01); *G06V 20/64* (2022.01); *G06V 40/103* (2022.01); *G06V 40/28* (2022.01); *G06T 2207/30241* (2013.01)

(58) Field of Classification Search
CPC combination set(s) only.
See application file for complete search history.

(56) References Cited

U.S. PATENT DOCUMENTS

| | | | |
|---|---|---|---|
| 7,225,980 B2 | 6/2007 | Ku et al. | |
| 7,949,568 B2 | 5/2011 | Fano et al. | |
| 8,009,864 B2 | 8/2011 | Linaker et al. | |

(Continued)

OTHER PUBLICATIONS

Connor Schenck,"Visual Closed-Loop Control for Pouring Liquids",2017 IEEE International Conference on Robotics and Automation (ICRA),Singapore, May 29-Jun. 3, 2017,pp. 2629-2639.*

(Continued)

*Primary Examiner* — Omar S Ismail
(74) *Attorney, Agent, or Firm* — Athorus, PLLC

(57) ABSTRACT

Commercial interactions with non-discretized items such as liquids in carafes or other dispensers are detected and associated with actors using images captured by one or more digital cameras including the carafes or dispensers within their fields of view. The images are processed to detect body parts of actors and other aspects therein, and to not only determine that a commercial interaction has occurred but also identify an actor that performed the commercial interaction. Based on information or data determined from such images, movements of body parts associated with raising, lowering or rotating one or more carafes or other dispensers may be detected, and a commercial interaction involving such carafes or dispensers may be detected and associated with a specific actor accordingly.

22 Claims, 27 Drawing Sheets

(56) References Cited

U.S. PATENT DOCUMENTS

| | | | |
|---|---|---|---|
| 8,175,925 B1* | 5/2012 | Rouaix | G06Q 20/203 705/26.9 |
| 8,189,855 B2* | 5/2012 | Opalach | G06Q 10/087 382/209 |
| 8,423,431 B1 | 4/2013 | Rouaix et al. | |
| 8,630,924 B2 | 1/2014 | Groenevelt et al. | |
| 8,688,598 B1 | 4/2014 | Shakes et al. | |
| 9,449,343 B2 | 9/2016 | Mayerle et al. | |
| 9,473,747 B2 | 10/2016 | Kobres et al. | |
| 10,055,853 B1* | 8/2018 | Fisher | G06T 7/248 |
| 10,304,053 B1 | 5/2019 | Templeton et al. | |
| 10,373,322 B1* | 8/2019 | Buibas | G06T 7/246 |
| 10,535,146 B1* | 1/2020 | Buibas | G06Q 20/208 |
| 10,956,726 B1 | 3/2021 | Quark et al. | |
| 10,963,704 B2 | 3/2021 | Glaser et al. | |
| 11,087,271 B1 | 8/2021 | Guan et al. | |
| 2003/0002712 A1 | 1/2003 | Steenburgh et al. | |
| 2004/0181467 A1 | 9/2004 | Raiyani et al. | |
| 2008/0055087 A1 | 3/2008 | Horii et al. | |
| 2008/0077511 A1 | 3/2008 | Zimmerman | |
| 2008/0109114 A1 | 5/2008 | Orita et al. | |
| 2009/0121017 A1* | 5/2009 | Cato | G06Q 10/087 235/385 |
| 2009/0220124 A1 | 9/2009 | Siegel | |
| 2009/0245573 A1 | 10/2009 | Saptharishi et al. | |
| 2011/0011936 A1 | 1/2011 | Morandi et al. | |
| 2011/0193939 A1* | 8/2011 | Vassigh | G06F 3/011 348/169 |
| 2012/0284132 A1 | 11/2012 | Kim et al. | |
| 2013/0076898 A1 | 3/2013 | Philippe et al. | |
| 2013/0182114 A1* | 7/2013 | Zhang | H04N 7/181 348/150 |
| 2013/0253700 A1 | 9/2013 | Carson et al. | |
| 2014/0279294 A1 | 9/2014 | Field-Darragh et al. | |
| 2014/0362223 A1* | 12/2014 | LaCroix | H04N 7/183 348/150 |
| 2015/0019391 A1 | 1/2015 | Kumar et al. | |
| 2015/0073907 A1 | 3/2015 | Purves et al. | |
| 2018/0232796 A1 | 8/2018 | Glaser et al. | |
| 2018/0240180 A1* | 8/2018 | Glaser | G06V 20/64 |
| 2019/0122424 A1 | 4/2019 | Moore et al. | |
| 2020/0019921 A1* | 1/2020 | Buibas | G06T 19/003 |
| 2020/0020112 A1 | 1/2020 | Buibas et al. | |
| 2020/0202177 A1* | 6/2020 | Buibas | G06N 3/08 |
| 2020/0279240 A1 | 9/2020 | Glaser et al. | |
| 2021/0350545 A1 | 11/2021 | Fan et al. | |

OTHER PUBLICATIONS

Justin Wilson,"Analyzing Liquid Pouring Sequences via Audio-Visual Neural Networks",2019 IEEE/RSJ International Conference on Intelligent Robots and Systems (IROS), Nov. 3-8, 2019,pp. 1-5.*

Chau Do,"Accurate Pouring with an Autonomous Robot Using an RGB-D Camera",Autonomous Intelligent Systems,arXiv: 1810.03303v1 [cs.RO], Aug. 10, 2018,Pages III-X.*

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

Cristian Pop, "Introduction to the BodyCom Technology", Microchip AN1391, May 2, 2011, pp. 1-24, vol. AN1391, No. DS01391A, Publisher: 2011 Microchip Technology Inc.

Do, Chau, and Wolfram Burgard. "Accurate Pouring with an Autonomous Robot Using an RGB-D Camera." International Conference on Intelligent Autonomous Systems. Springer, Cham, 2018,12 pages.

Do, Chau, Tobias Schubert, and Wolfram Burgard. "A Probabilistic Approach to Liquid Level Detection in Cups Using an RGB-D Camera." 2016 IEEE/RSJ International Conference on Intelligent Robots and Systems (IROS). IEEE, 2016, 5 pages.

Schenck, Connor, and Dieter Fox. "Visual Closed-Loop Control for Pouring Liquids." 2017 IEEE International Conference on Robotics and Automation (ICRA). IEEE, 2017, 8 pages.

Wilson, Justin, Auston Sterling, and Ming C. Lin. "Analyzing Liquid Pouring Sequences via Audio-Visual Neural Networks." IROS. 2019, 8 pages.

* cited by examiner

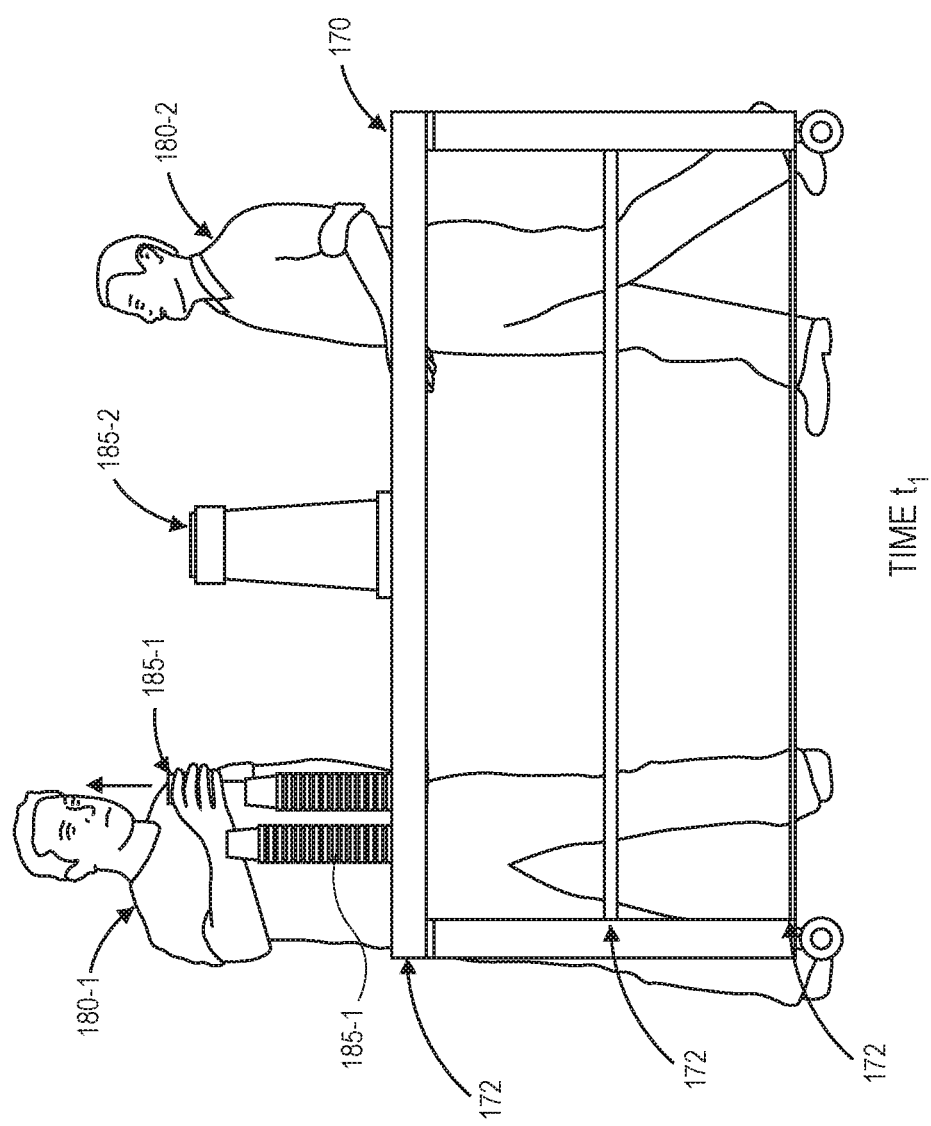

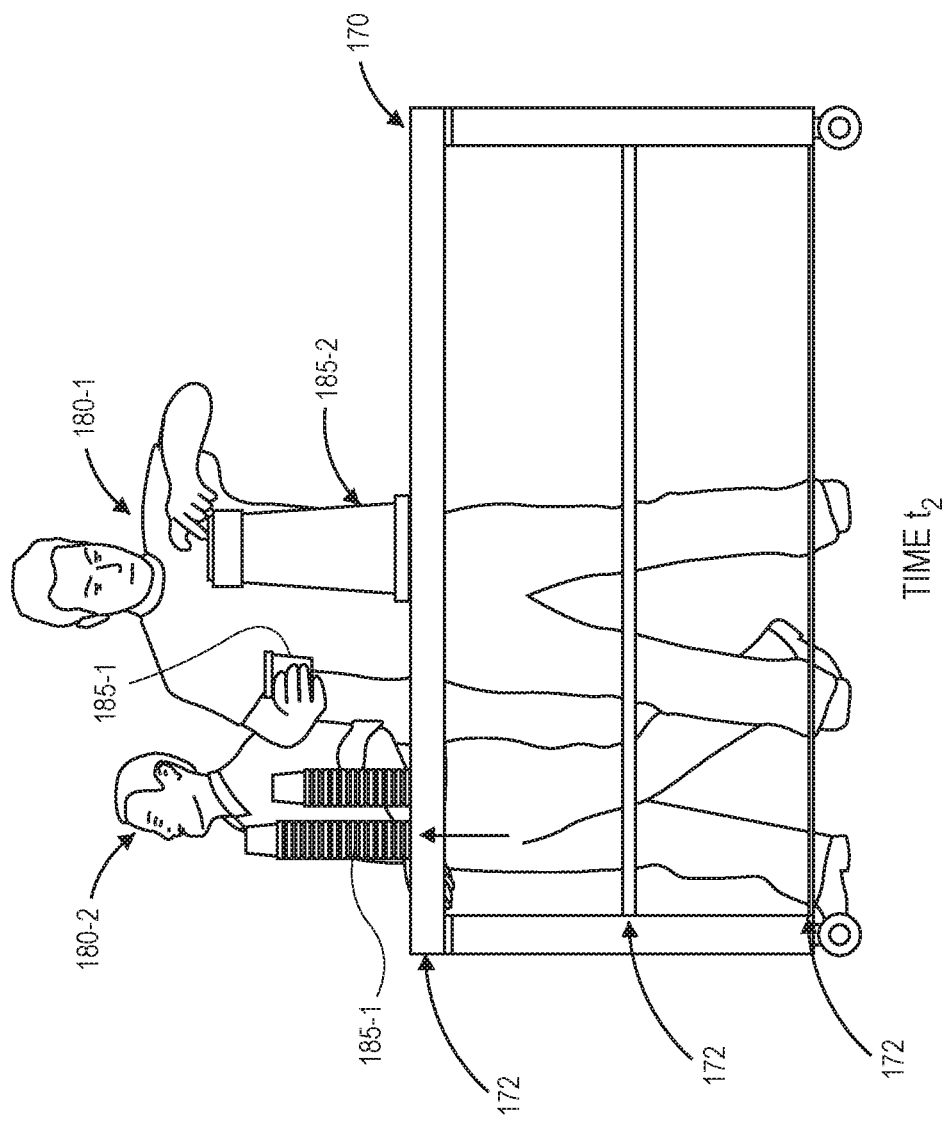

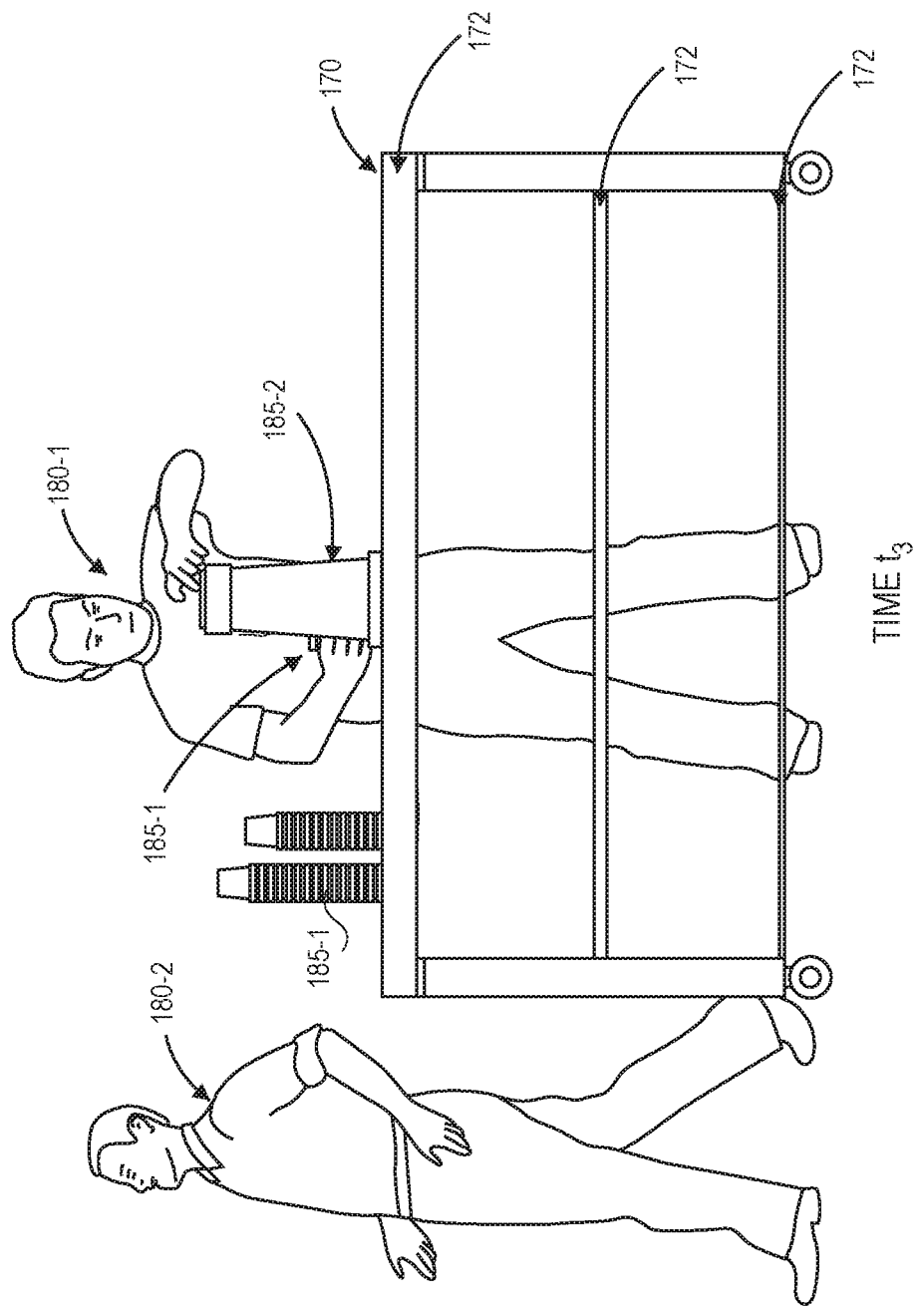

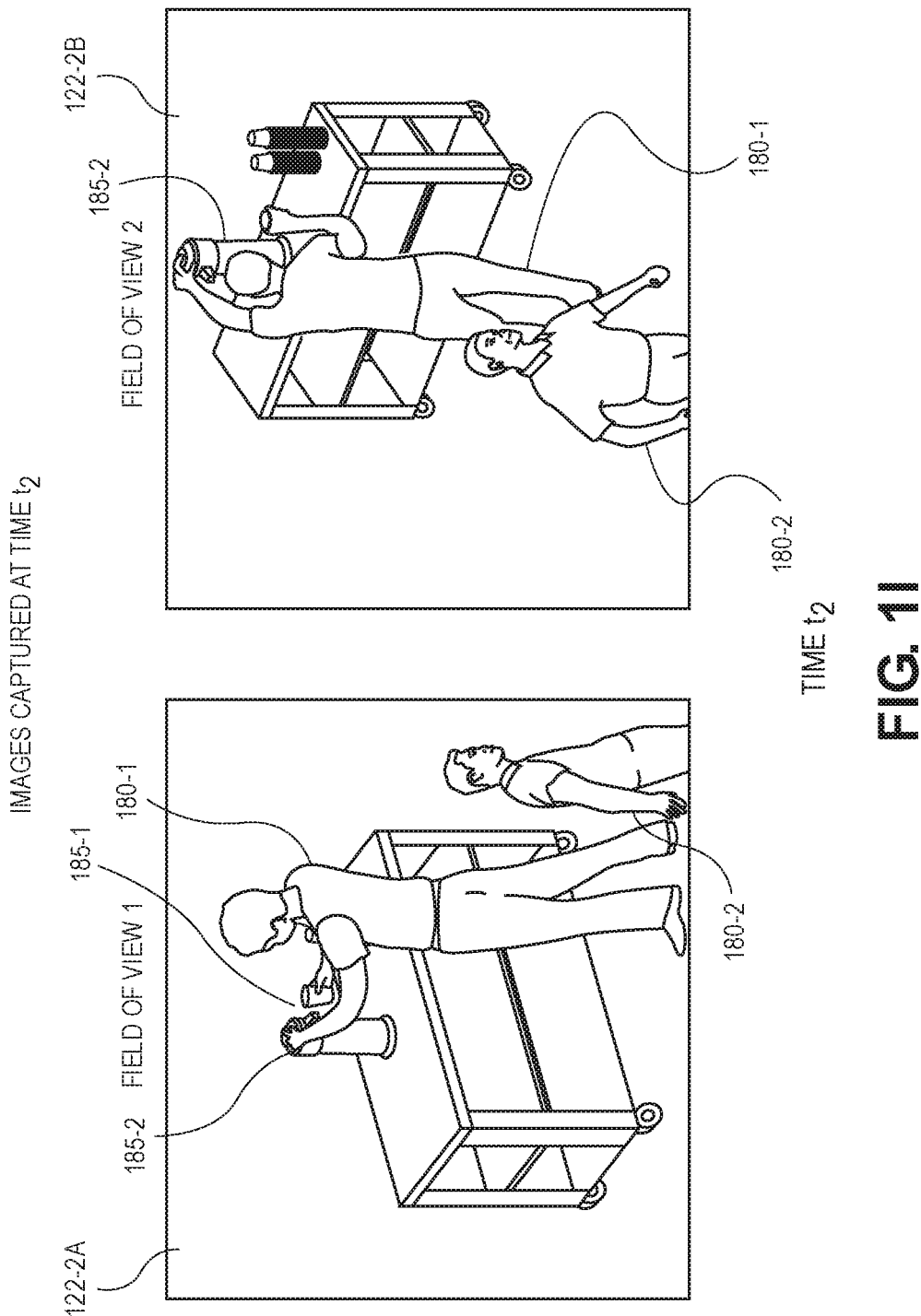

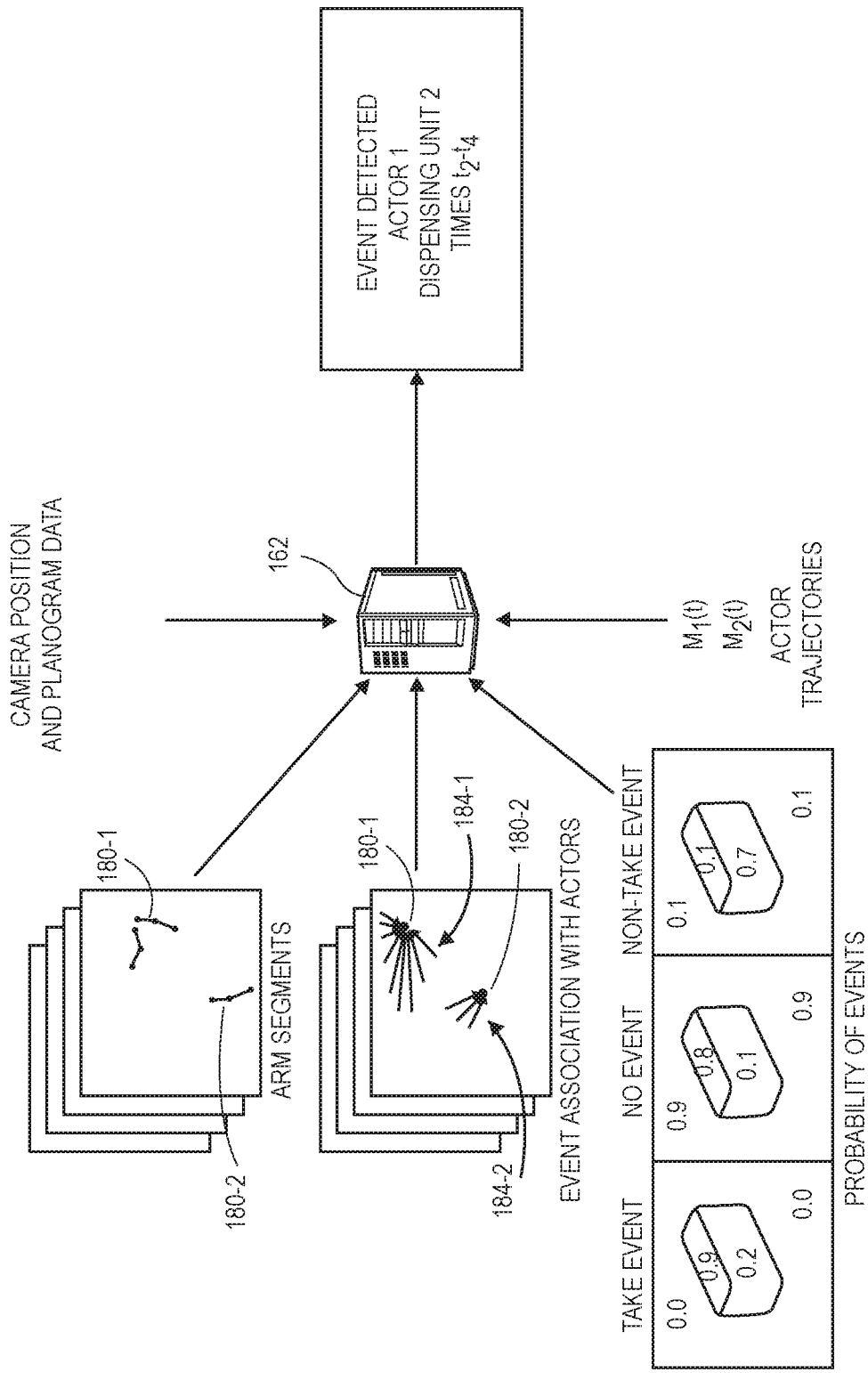

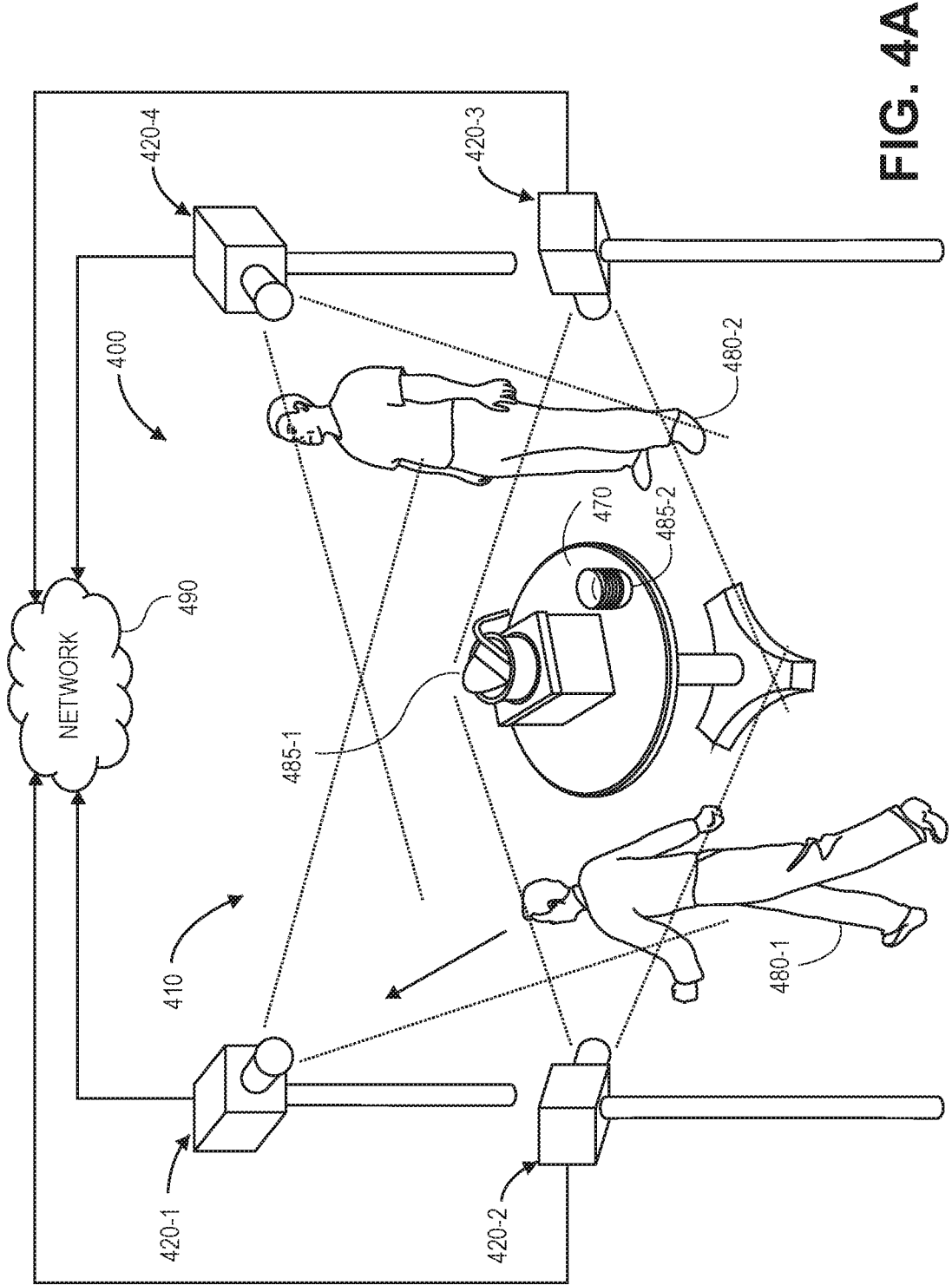

DETERMINE ACTOR TRAJECTORIES, CAMERA POSITIONS AND ORIENTATIONS

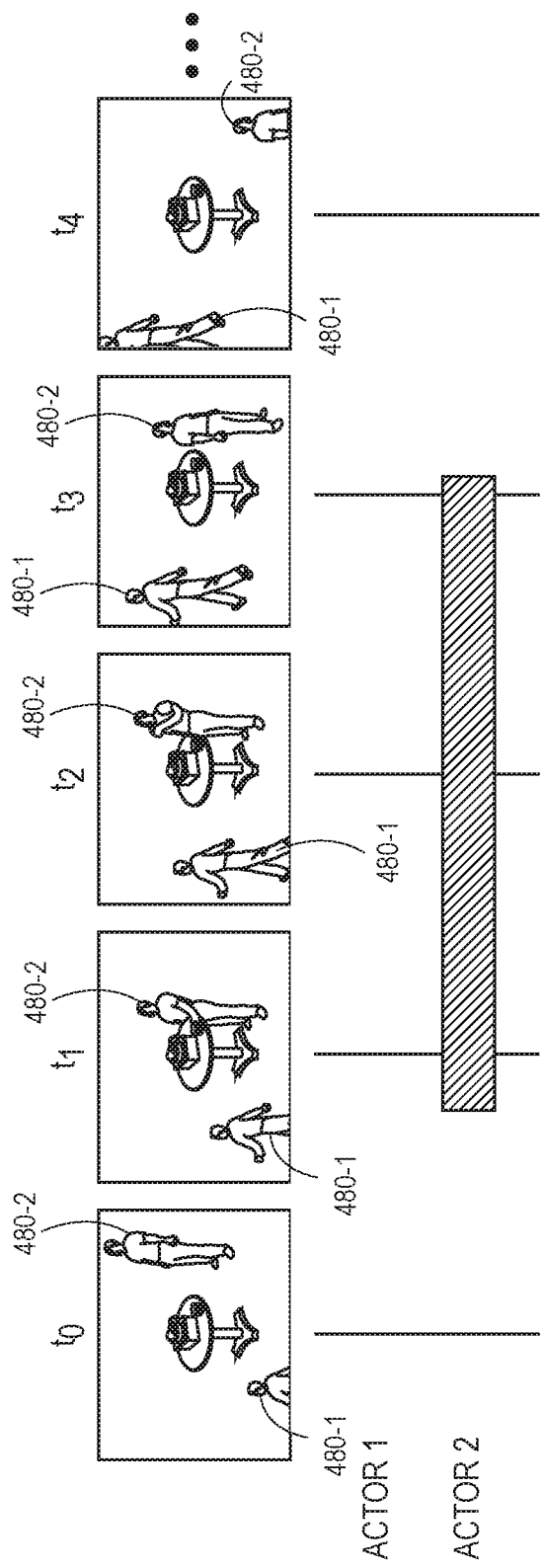

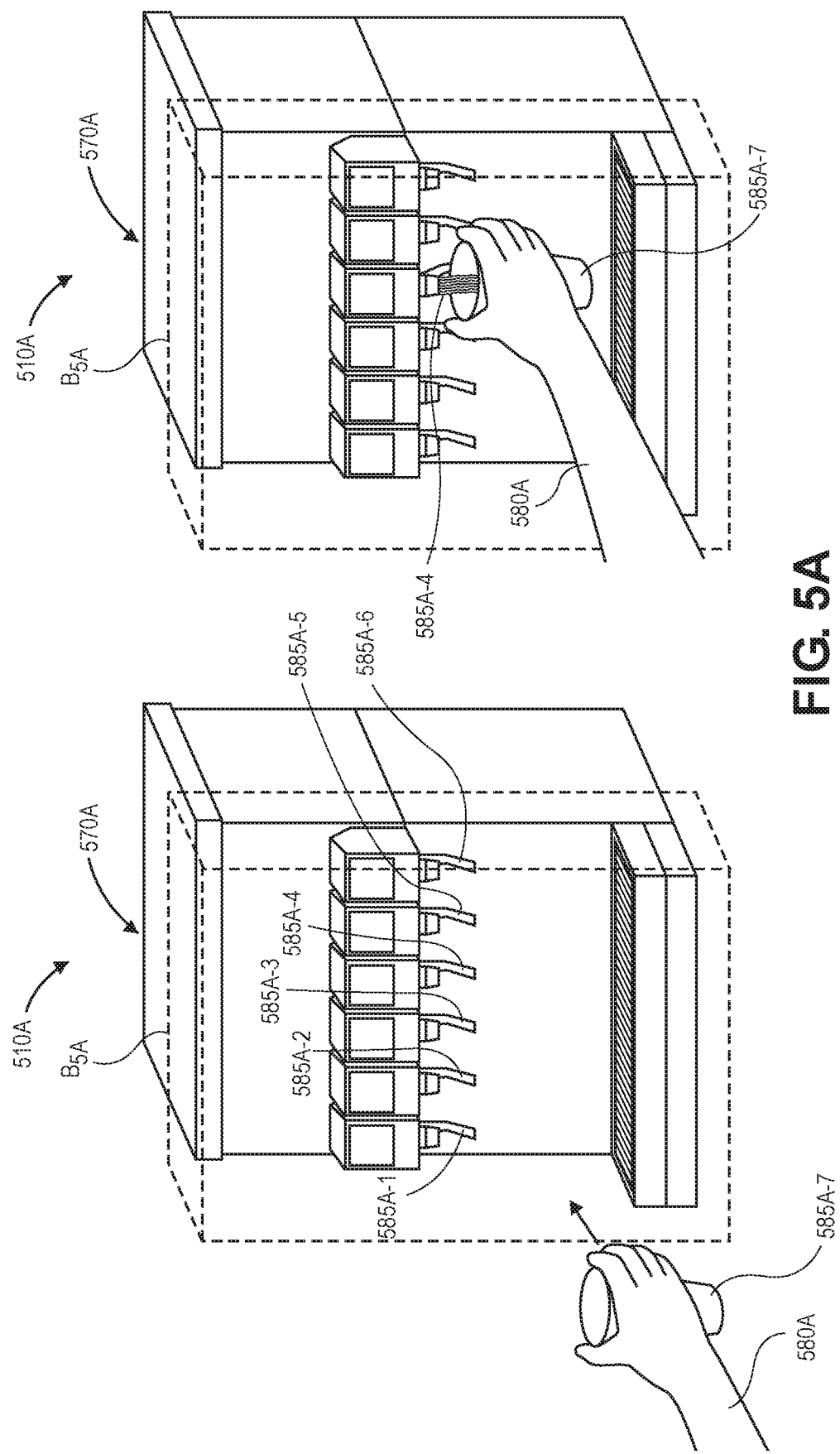

DETECTING INTERACTIONS WITH NON-DISCRETIZED ITEMS AND ASSOCIATING INTERACTIONS WITH ACTORS USING DIGITAL IMAGES

BACKGROUND

Today, materials handling facilities such as traditional stores or retail establishments (or physical, walk-in or bricks-and-mortar stores or establishments) increasingly rely upon sensors that are coupled to computer-based machines to detect interactions with commercial goods by actors, or to associate such interactions with specific actors, such as when a customer removes an item from a shelf or other storage unit, or returns the item to the shelf or storage unit. For example, shelves or other storage units may be outfitted with one or more sensors such as imaging devices, load sensors (e.g., scales), radiofrequency identification (or "RFID") sensors, light detection and ranging (or "LIDAR") sensors, or other components for detecting interactions with one or more items by customers, associates or other personnel, or identifying the items or personnel involved in the interactions, e.g., by increasing or decreasing a level of inventory of the one or more items in a record, or by adding one or more items to or subtracting one or more items from a virtual "shopping cart" or other list of items to be purchased by a customer.

Sensors that are provided in association with one or more storage units are typically configured to detect interactions with discretized items, such as when one or more discrete items are retrieved from a shelf, or when one or more items are placed onto a shelf. For example, one or more digital cameras may capture imaging data which may be processed to determine when one or more hands of actors are empty or full, or to identify items that are disposed on a shelf or another storage unit, located within an actor's hand, or disposed in a bag, a basket or another carrying device associated with an actor. One or more load sensors may detect changes in mass or loading on a shelf, identify an item based on magnitudes of such changes, and determine that the item has been placed on the shelf or removed from the shelf based on whether the mass or loading has increased or decreased. Where items have one or more RFID transmitters (or tags) associated therewith, the placement of an item on a shelf or storage unit, or the removal of the item from the shelf or storage unit, may be detected based on the presence or absence of an RFID signal at an RFID reader or receiver.

Such sensors are typically unable, however, to detect interactions with non-discretized items, including but not limited to types of consumer goods that are distributed and sold in amounts that may be selected by customers, or in containers having a variety of sizes or shapes, or different external appearances (e.g., colors or textures). Some consumer goods that are sold in non-discretized quantities may include liquids (e.g., beverages such as coffees, fountain drinks or other dispensed beverages, or ice creams) or solids (e.g., dry stores such as flour, sugar, rice, beans or candy). Where non-discretized items are sold, sensors such as imaging devices are frequently unable or ill-suited to determine whether an event of interest with one or more of such items has occurred, or to calculate a mass, a volume or another measurable quantity associated with the event.

BRIEF DESCRIPTION OF THE DRAWINGS

FIGS. 4A through 4F are views of aspects of one system for detecting interactions with non-discretized items and associating interactions with actors in accordance with implementations of the present disclosure.

FIGS. 5A through 5D are views of aspects of interactions with non-discretized items that may be detected and associated with actors in accordance with implementations of the present disclosure.

DETAILED DESCRIPTION

As is set forth in greater detail below, the present disclosure is directed to detecting interactions with non-discretized items and associating interactions with actors based on digital imagery captured from within a materials handling facility. More specifically, one or more implementations of the present disclosure are directed to capturing imaging data from a scene and processing the imaging data in order to detect one or more body parts such as arm segments (e.g., hands, wrists, forearms, elbows or upper arms) depicted within the imaging data, and to calculate one or more regression vectors, association scores or other representations (e.g., pairings of pixels) that associate various aspects of the imaging data with any actors that may be present on a scene from which the imaging data was captured, as well as to determine whether an interaction has occurred at a given pixel or set of pixels of the imaging data.

For example, probabilities that each pixel, or a set of pixels, depicts or represents an event of interest (e.g., a "taking" of a quantity of a non-discretized item), an event other than the event of interest, or no event at all, may be determined for each pixel or pixels of image frames captured using imaging devices that include portions of a scene within a field of view over finite periods of time, such as ten seconds. Information or data regarding identified body parts, regression vectors, association scores or other pairings of pixels and the locations interactions or events within the imaging data, along with information or data regarding positions or movements of one or more actors on a scene are known, and information or data regarding positions or orientations of one or more cameras that captured the imaging data therefrom, may be processed to determine whether an event of interest involving a non-discretized item has occurred on the scene during each of the periods of time, or a duration (e.g., a number of the periods of time) over which the event of interest has occurred, and to identify one or more actors that are responsible for the event of interest.

Figure 1A:
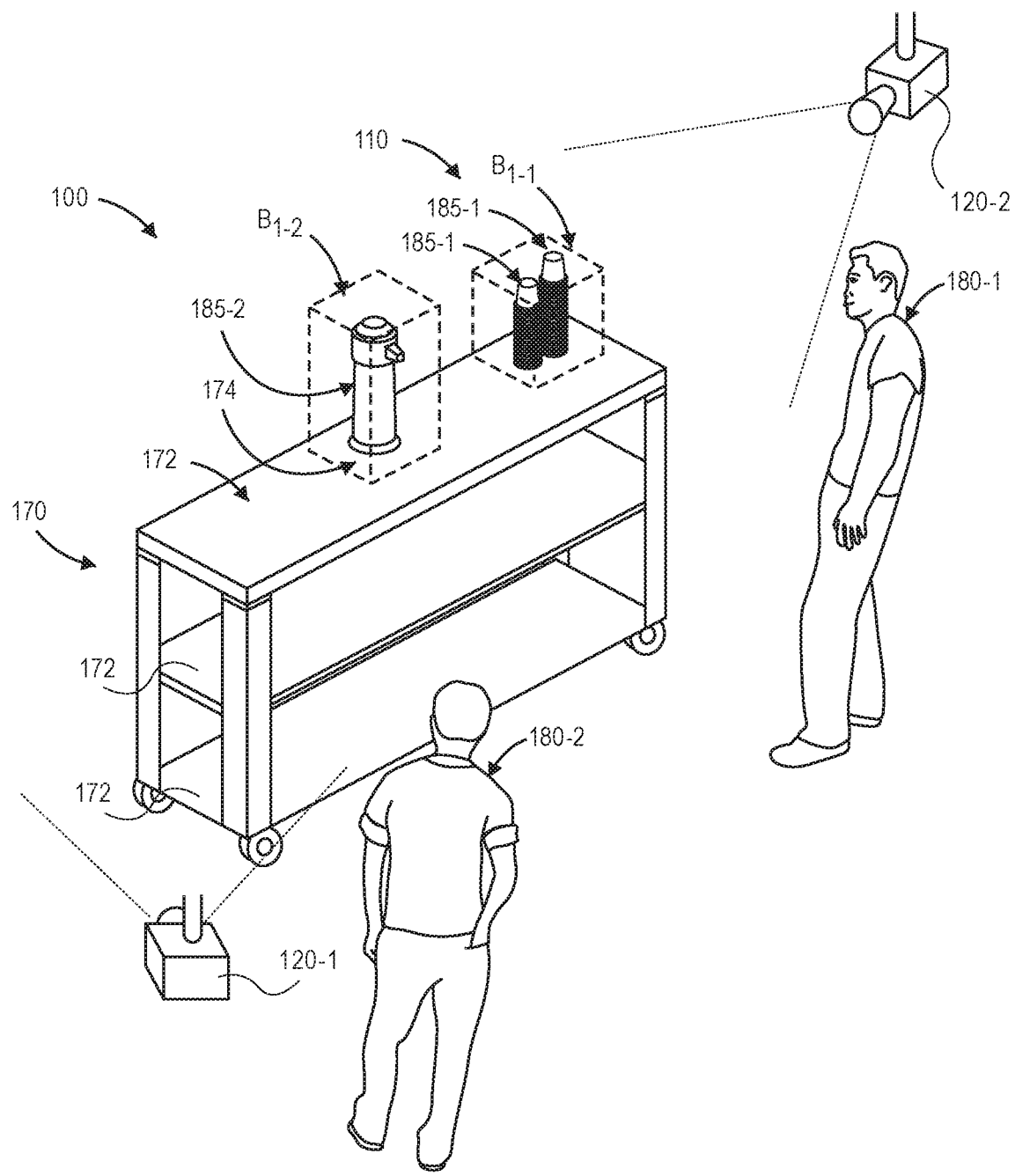
FIGS. 1A through 1N are views of aspects of one system for detecting interactions with non-discretized items and associating interactions with actors in accordance with implementations of the present disclosure.
Figure 1B:
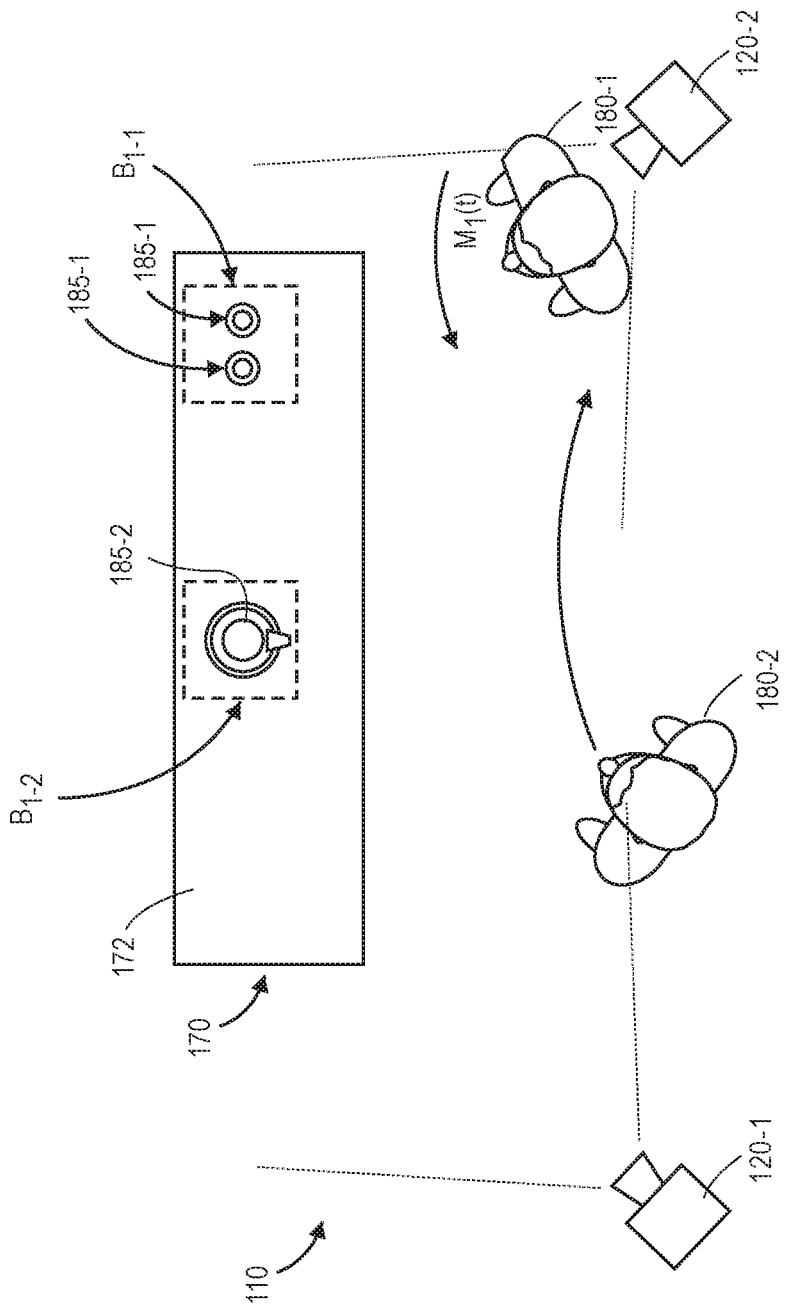

Referring to FIGS. 1A through 1N, views of aspects of one system 100 for detecting interactions with non-discretized items and associating interactions with actors in accordance with implementations of the present disclosure are shown. As is shown in FIGS. 1A and 1B, the system 100 includes a scene 110 such as a materials handling facility, a fulfillment center, a warehouse, or any other like facility. The scene 110 includes a pair of imaging devices 120-1, 120-2 (e.g., digital cameras), a storage unit 170 having a plurality of shelves 172, and a pair of actors 180-1, 180-2. An uppermost shelf 172 of the storage unit 170 includes stacks of cups 185-1 and a coffee dispenser (or pitcher or other dispensing vessel) 185-2 resting thereon. The coffee dispenser 185-2 may be a system, or a component part of a system, for storing non-discretized liquids such as beverages (e.g., coffee), toppings, sauces, soups, dressings, or the like, and may be configured to supply heat to such liquids, or to maintain such liquids at one or more selected temperature levels. Alternatively, the coffee dispenser 185-2 may be a system or component part of a system for accommodating non-discretized solids (e.g., powders such as cocoa or flour, grains, beans, candy or the like) in a similar manner.

As is shown in FIGS. 1A and 1B, the cups 185-1 may be any vessels having a common or standard size, including but not limited to nominal sizes such as "small," "medium" or "large," or volumetric sizes such as one cup, twelve ounces, one pint, or half-gallon, or any other common or standard sizes. The cups 185-1 may be sized or configured to accommodate up to a specific volume of liquid or solid, and may, in some implementations, include a fixed or removable lid or cover of any type or form. The cups 185-1 may have any shape, such as cylinders or frustrums (e.g., frustocones), and may be stored independently or in association with one another, such as by stacking.

The imaging devices 120-1, 120-2 are aligned with fields of view that overlap at least in part over a portion of the scene 110, and are configured to capture imaging data, such as still or moving images, from the scene 110. The imaging devices 120-1, 120-2 may be installed or otherwise operated independently or as components of an imaging device network (or camera network), and may be in communication with one or more computer devices or systems (not shown), e.g., over one or more computer networks. Additionally, the imaging devices 120-1, 120-2 may be calibrated, such that mappings between coordinates of imaging data captured by the imaging devices 120-1, 120-2 and directions relative to their respective image sensors are known.

The scene 110 may be any open or enclosed environment or space in which any number of actors (e.g., humans, other animals or machines), such as the actors 180-1, 180-2, may execute one or more poses, gestures or other actions within the fields of view of the imaging devices 120-1, 120-2. For example, as is shown in FIGS. 1A and 1B, the actors 180-1, 180-2 are in motion within a vicinity of the storage unit 170. Each of the actors 180-1, 180-2 is partially or entirely within the fields of view of the imaging devices 120-1, 120-2.

In accordance with some implementations of the present disclosure, one or more interactions with non-discretized items may be detected across spaces of a scene and over time using digital imagery captured from the scene. The interactions may be associated with one or more actors on the scene, where body parts of the one or more actors are detected within a vicinity of one or more interaction points (e.g., product spaces) on the scene for durations of sufficient length. In particular, and in some implementations, detections of body parts such as hands and arms, or segments of such hands and arms within imaging data captured by imaging devices on a scene may be processed to detect whether an actor's hands or arms (or other body parts) could have executed an interaction at one or more interaction points over a finite period of time.

Information or data regarding interactions may be determined by identifying predictions of interactions generated over a period of time and fusing such predictions, or by identifying trajectories (e.g., tracklets) of actors during the period of time to determine which, if any, of the actors on the scene may have executed the one or more interactions. For example, imaging data captured using the imaging devices 120-1, 120-2 over a finite period of time, such as ten seconds, may be processed to determine probabilities that an event of interest, such as a removal or retrieval of a quantity of non-discretized items, has occurred at a given interaction point (or product space) during the period of time. Each interaction point at the inventory area 170 may exist in or be represented by one of three states, namely, that an event of interest is occurring at the interaction point, that no event is occurring at the interaction point, or that an event other than the event of interest is occurring at the interaction point. For each pixel or set of pixels corresponding to an interaction point, probabilities may be calculated to determine the state in which the interaction point exists. A state of the interaction point may be determined for the period of time based on such probabilities.

Detections of events of interest, and associations of such events with one or more actors, may be jointly optimized, e.g., by an energy minimization approach, such as by determining distances between trajectories of actors and interaction points, as well as hand or arm segments (or other body parts) within a vicinity of such interaction points. For example, where imaging data captured using the imaging devices 120-1, 120-2 indicates that a change in state has occurred at an interaction point (e.g., a product space), whether an event of interest is occurring at the interaction point over a period of time, the imaging data is further processed to determine whether the event of interest is occurring during with the interaction point in the given state, or to associate the event of interest with one or more of the actors. One or more of the implementations of the present disclosure are particularly useful where the events of interest involve the retrieval of non-discretized items by one or more actors (e.g., customers), or the distribution of such non-discretized items to such actors.

Figure 1C:
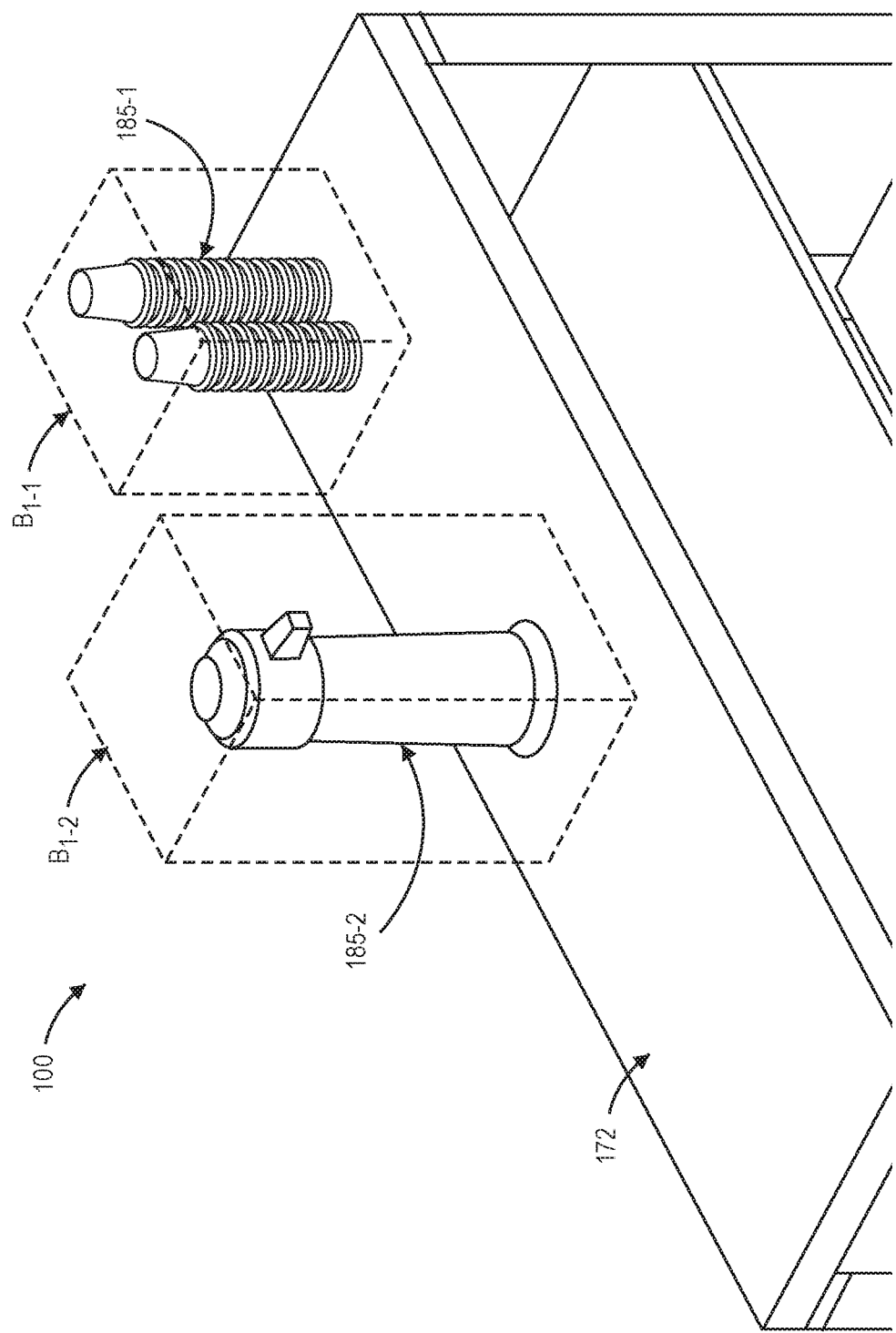

The interaction points (or product spaces) may be identified with respect to any number of points in three-dimensional space, e.g., by sets of Cartesian coordinates, or coordinates according to any other system, that define a location where an interaction by an actor may result in an event. As is shown in FIG. 1C, a bounding box $B_{1-1}$ may define a product space with respect to the cups 185-1, and a bounding box $B_{1-2}$ may define a product space with respect to the coffee dispenser 185-2 thereon. Interactions with the cups 185-1 or the coffee dispenser 185-2, e.g., events of interest such as depositing coffee from the coffee dispenser 185-2 into one or more of the cups 185-1, may be inferred where segments of hands or arms, or other body parts, are determined to have interacted with sets of pixels corresponding to the bounding boxes $B_{1-1}$, $B_{1-2}$ for sufficient durations. Such interactions may be associated with one or more of the actors 180-1, 180-2 at the scene 110 where portions of such actors are detected within a vicinity of the bounding boxes $B_{1-1}$, $B_{1-2}$ at such times, or where trajectories of such actors pass within the vicinity of the bounding boxes $B_{1-1}$, $B_{1-2}$ over such times.

For example, where an actor, e.g., one or more of the actors 180-1, 180-2, desires some of the non-discretized liquids or solids maintained within the coffee dispenser 185-2, the actor may retrieve one or more of the cups 185-1, and manually deposit some of the liquids or solids from the coffee dispenser 185-2 into the one of the cups 185-1. As is shown in FIG. 1D, at a time $t_1$, the actor 180-1 extends a right hand to retrieve one of the cups 185-1 from a stack on the uppermost shelf 172 of the storage unit 170 as the actor 180-2 walks by without interacting with the storage unit 170. As is shown in FIG. 1E, at a time t₂, and with one of the cups 185-1 in his or her right hand, the actor 180-1 extends a left hand toward a button or other feature for initiating flow of coffee from the coffee dispenser 185-2, as the actor 180-2 continues to walk by without interacting with the storage unit 170.

Figure 1G:
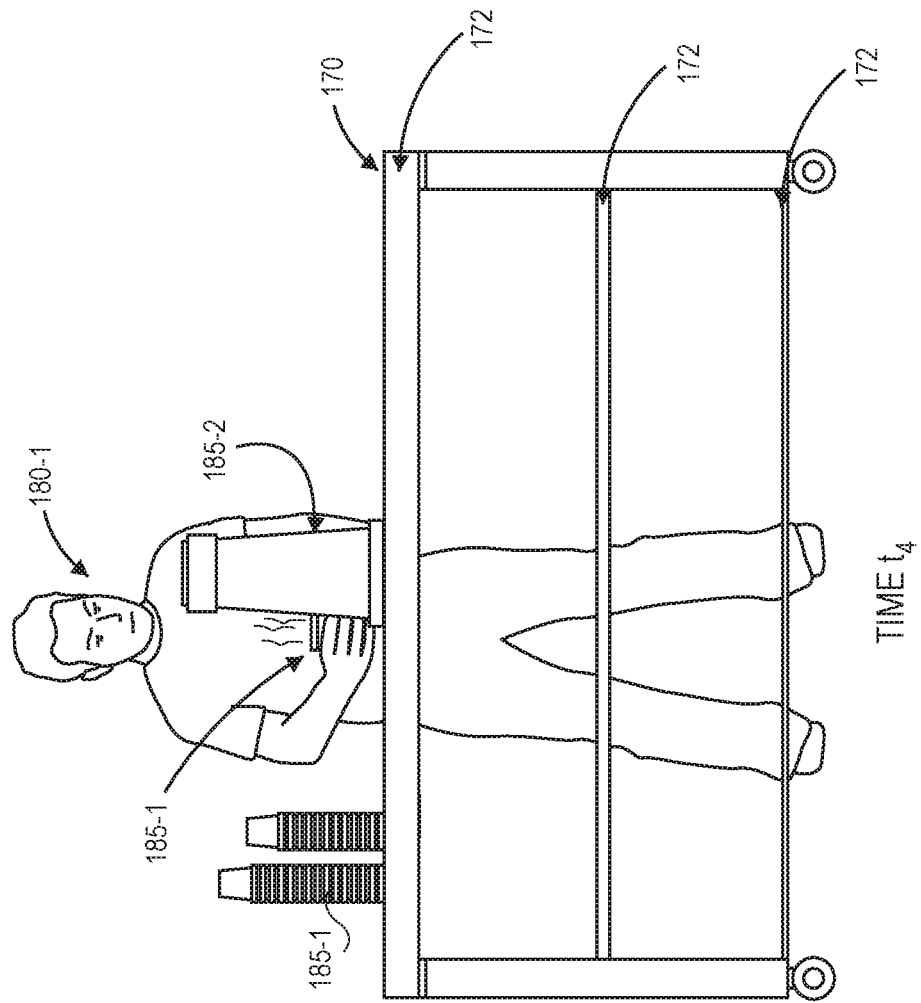
Figure 1G:
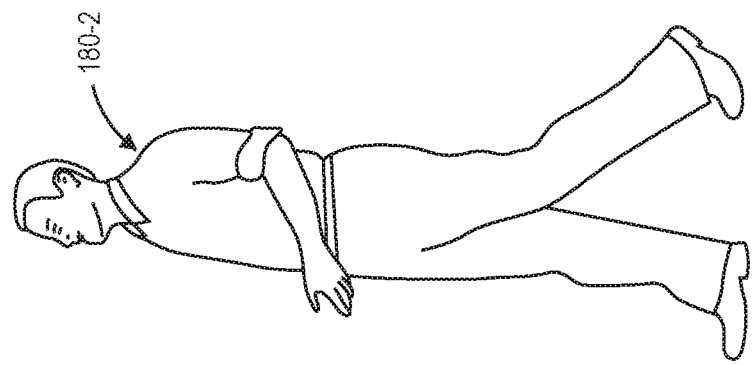

As is shown in FIG. 1F, at a time t₃, the actor 180-1 depresses the button or other feature on the coffee dispenser 185-2 with his or her left hand, thereby activating flow of coffee from the coffee dispenser 185-2 into the cup 185-1 within his or her right hand. As is shown in FIG. 1G, at a time t₄, after a desired amount or volume of the liquid has been poured into the cup 185-1 from the coffee dispenser 185-2, the actor 180-1 releases pressure on the button or other feature on the coffee dispenser 185-2, thereby halting the flow of coffee from the coffee dispenser 185-2.

Figure 1H:
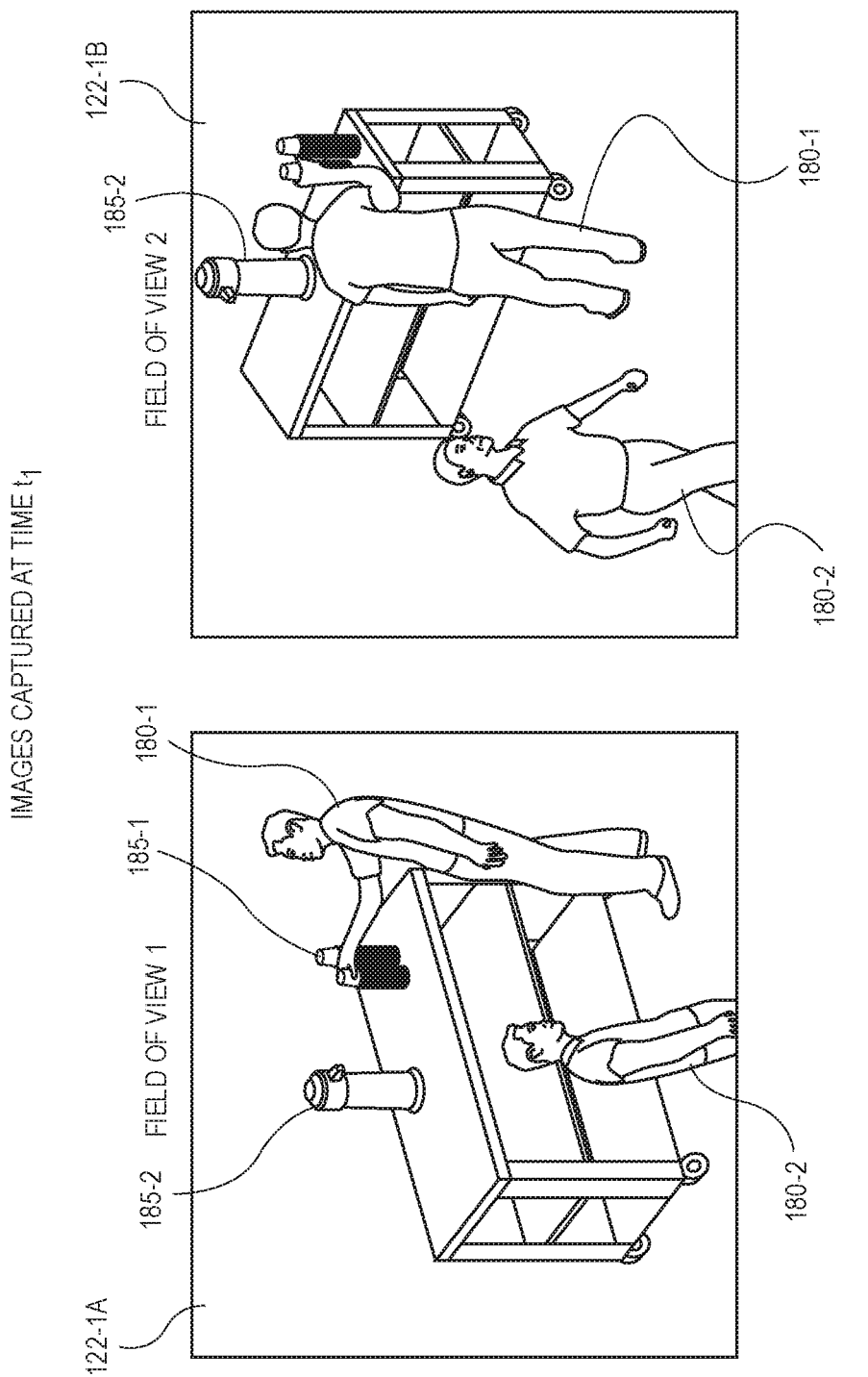

In some implementations of the present disclosure, imaging data captured by the imaging devices 120-1, 120-2 may be processed to detect various interactions with the product spaces defined by the bounding boxes $B_{1-1}$, $B_{1-2}$ shown in FIGS. 1A-1C. Such imaging data may be processed to determine, for example, probabilities that one or more of the cups 185-1 has been retrieved from the storage unit 170, or that the coffee dispenser 185-2 has activated to deposit liquids from the coffee dispenser 185-2 into the one or more of the cups 185-1. For example, as is shown in FIG. 1H, images 122-1A, 122-1B captured at time $t_1$ using the imaging devices 120-1, 120-2, respectively, depict the actor 180-1 interacting with the bounding box $B_{1-1}$ to retrieve one of the cups 185-1 with a right hand, and the actor 180-2 in motion passing behind the actor 180-1. As is shown in FIG. 1I, images 122-2A, 122-2B captured at time $t_2$ using the imaging devices 120-1, 120-2, respectively, depict the actor 180-1 interacting with the bounding box $B_{1-2}$ to approach the coffee dispenser 185-2 with a left hand, and the actor 180-2 continuing in motion within a vicinity of the storage unit 170 and behind the actor 180-1.

Figure 1J:
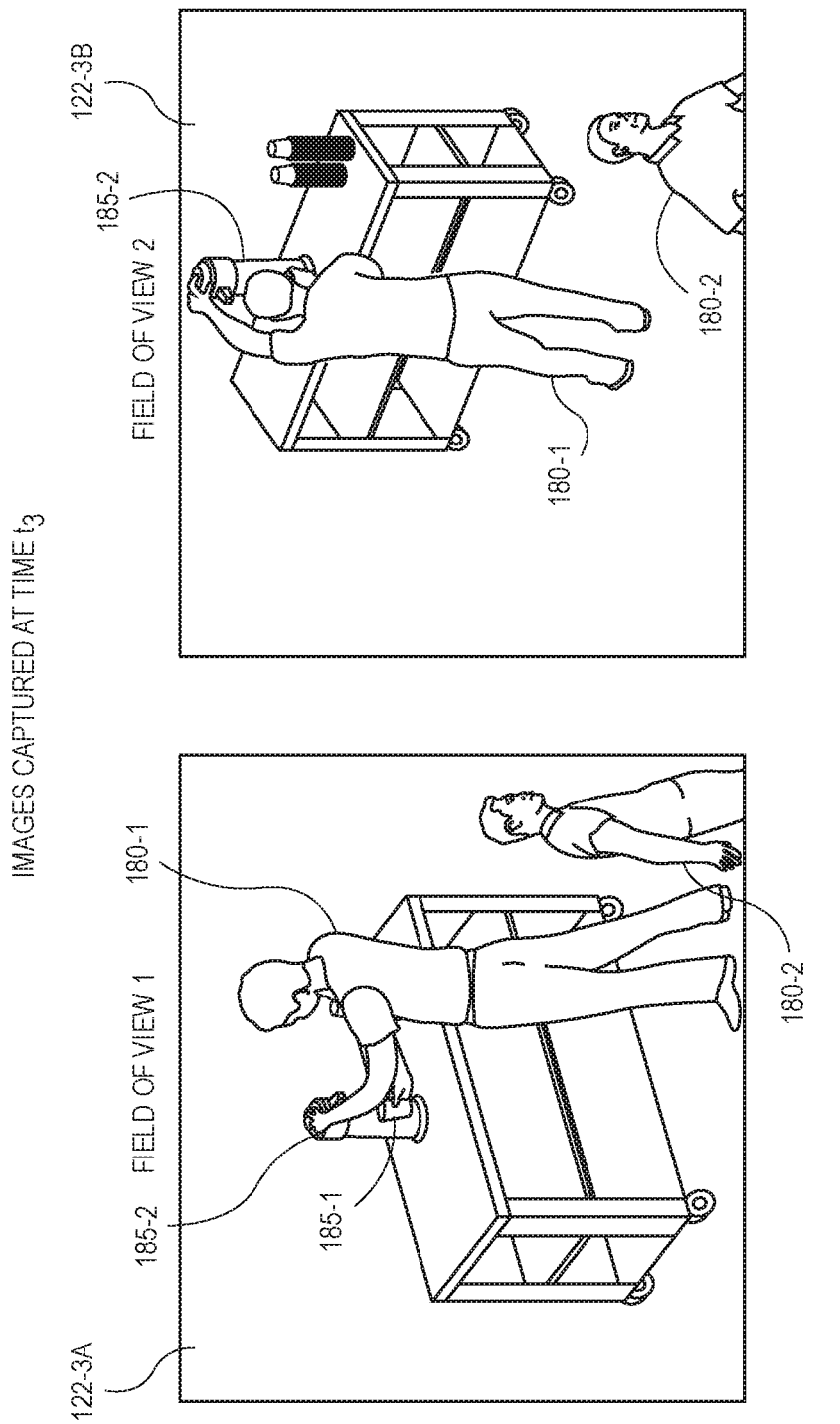
Figure 1K:
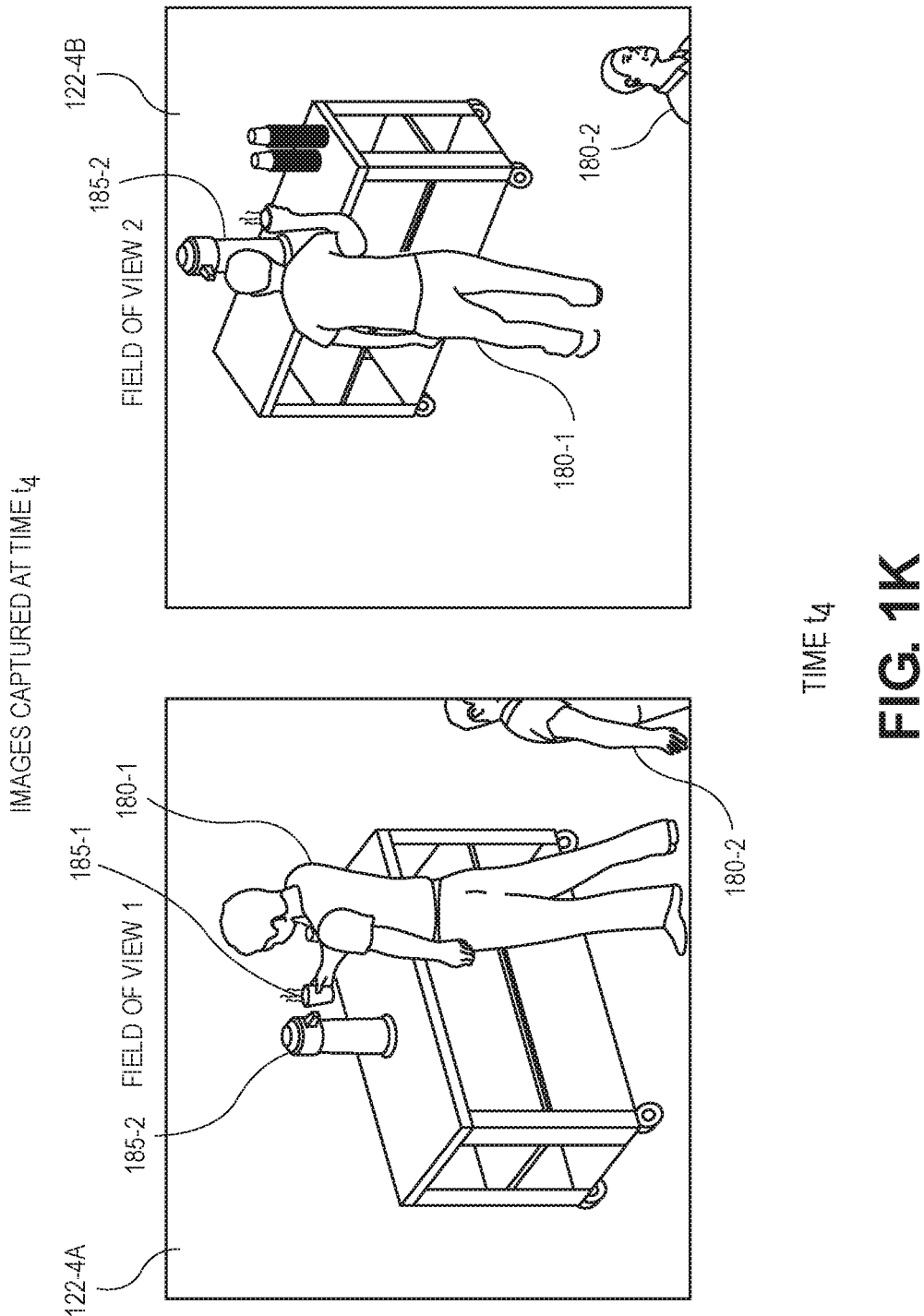

As is shown in FIG. 1J, images 122-3A, 122-3B captured at time $t_3$ using the imaging devices 120-1, 120-2, respectively, depict the actor 180-1 continuing to interact with the bounding box $B_{1-2}$, e.g., to depress the button or other feature of the coffee dispenser 185-2 with the left hand to cause liquid to be poured into the cup 185-1 within the right hand, as the actor 180-2 continues to move away from the storage unit 170 and the actor 180-1. As is shown in FIG. 1K, images 122-4A, 122-4B captured at time $t_4$ using the imaging devices 120-1, 120-2, respectively, depict the actor 180-1 releasing the button or other feature of the coffee dispenser 185-2 with the left hand, after having poured liquid into the cup 185-1 within the right hand.

Figure 1L:
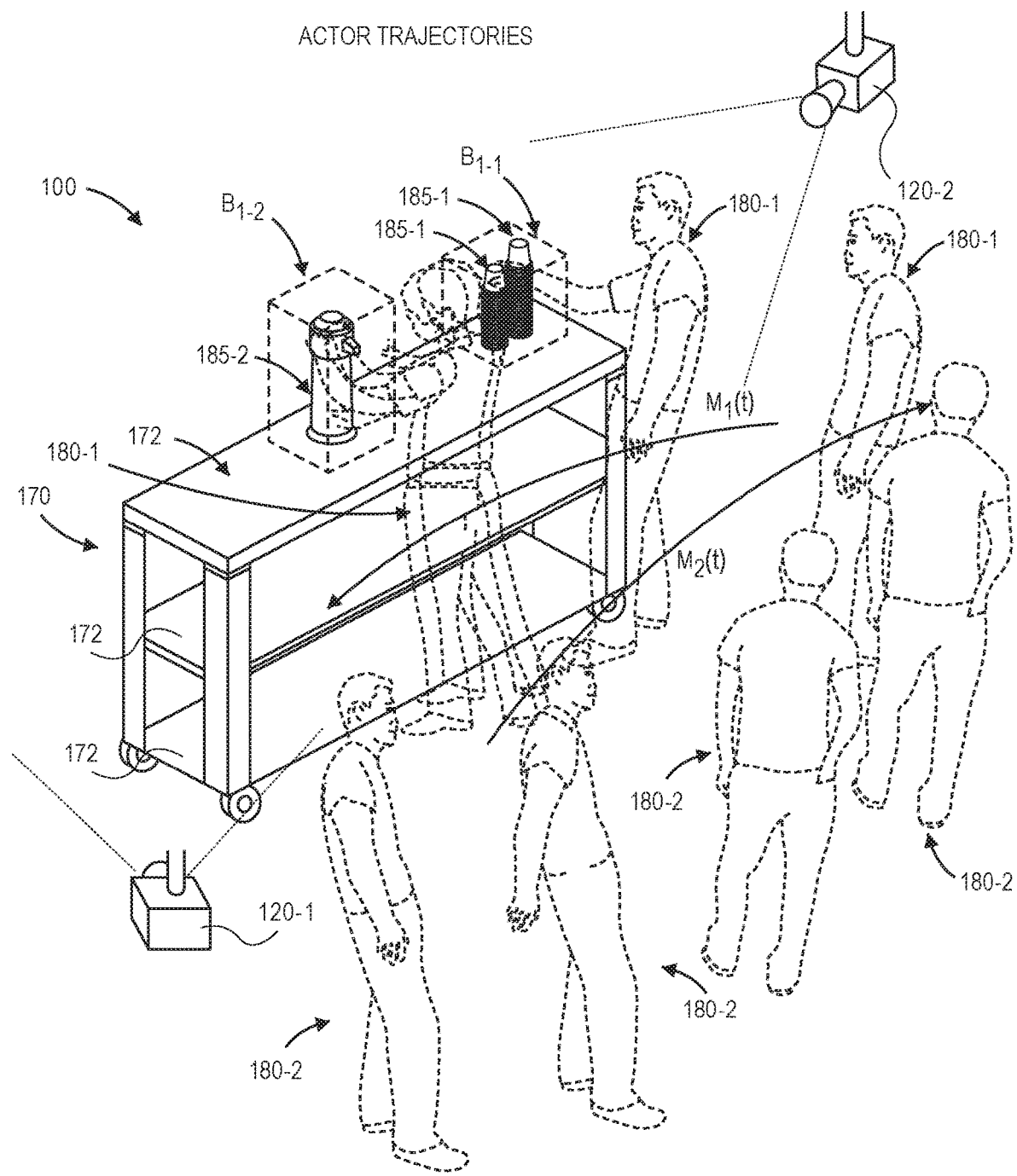

As is shown in FIG. 1L, trajectories $M_1(t)$, $M_2(t)$ of the motion of the actors 180-1, 180-2 over time may be calculated based on imaging data captured using the imaging devices 120-1, 120-2, or determined from any other source, e.g., a locating service dedicated at least in part to generating trajectories of motion of actors at the scene 110. For example, as is shown in FIG. 1L, the trajectory $M_1(t)$ may be a three-dimensional articulated model of partial or complete sets of body parts of the actor 180-1 as the actor 180-1 moves throughout the scene, e.g., to retrieve coffee from the coffee dispenser 185-2 using one or more of the cups 185-1. The trajectory $M_1(t)$ may be generated based on information or data gathered by sensors such as the imaging devices 120-1, 120-2, or any other sensors. Likewise, the trajectory $M_2(t)$ may be another three-dimensional articulated model of partial or complete sets of body parts of the actor 180-2, as the actor 180-2 moves throughout the scene, e.g., to pass behind the actor 180-1, and may be generated based on information or data gathered by sensors such as the imaging devices 120-1, 120-2, or any other sensors.

In accordance with implementations of the present disclosure, whether an event of interest associated with a non-discretized item, such as one or more liquids within the coffee dispenser 185-2, has occurred at the scene 110, or whether the event of interest may be associated with any actors at the scene 110, may be determined based on a variety of information or data obtained from the scene 110, including but not limited to imaging data captured using the imaging devices 120-1, 120-2. As is shown in FIG. 1M, the images 122-1A, 122-1B, 122-2A, 122-2B, 122-3A, 122-3B, 122-4A, 122-4B captured at times $t_1$, $t_2$, $t_3$, $t_4$ using the imaging devices 120-1, 120-2, and others (not shown), may be provided to a server 162 or other computer device or machine over one or more networks (not shown), along with information or data regarding the interaction points and/or the bounding boxes $B_{1-1}$, $B_{1-2}$, or the trajectories $M_1(t)$, $M_2(t)$.

The server 162 may operate one or more machine learning tools, systems or techniques that are trained to receive inputs in the form of imaging data and, alternatively, any additional data or metadata, and to generate one or more outputs based on such inputs. In particular, and as is shown in FIG. 1M, the machine learning tools, systems or techniques operated by the server 162 may be trained to detect segments of body parts (e.g., arms) of actors on the scene 110 (viz., the actors 180-1, 180-2), including but not limited to hands, wrists, forearms (e.g., ulna and/or radius), elbows, upper arms or shoulders, or any other body parts. The machine learning tools, systems or techniques may also generate outputs in the form of regression vectors 184-1, 184-2 (or association scores, or other pairings) that associate pixels of the respective images 122-1A, 122-1B, 122-2A, 122-2B, 122-3A, 122-3B, 122-4A, 122-4B with one of the actors depicted therein, viz., the actors 180-1, 180-2, or other pairings of pixels with aspects of the one or more actors 180-1, 180-2.

In some implementations, where a regression vector, an association score, or another pairing of pixels is generated, the vector, the score or the other pairing may be accompanied by a calculation of a confidence score or other measure indicative of a confidence in the vector or pairing. Any number of regression vectors, association scores or other pixel pairings may be generated for a given pixel, and a regression vector, an association score or a pixel pairing having a highest confidence score may be used to identify a pixel that is most likely associated with that given pixel. The machine learning tools, systems or techniques may further generate outputs in the form of probabilities that a given interaction (e.g., an event of interest) is depicted as occurring or having occurred at a given pixel within a given one of the images 122-1A, 122-1B, 122-2A, 122-2B, 122-3A, 122-3B, 122-4A, 122-4B. For example, for each of a plurality of pixels within each of the images 122-1A, 122-1B, 122-2A, 122-2B, 122-3A, 122-3B, 122-4A, 122-4B, probabilities that a given pixel depicts or represents an event of interest (e.g., a taking event by which non-discretized items are retrieved by an actor or distributed to the actor), does not depict or represent any event, or depicts or represents an event other than the event of interest, such as where an actor interacts with one or more of the cups 185-1 or the coffee dispenser 185-2 but does not retrieve the one or more of the cups 185-1 or coffee, are calculated.

Figure 1M:
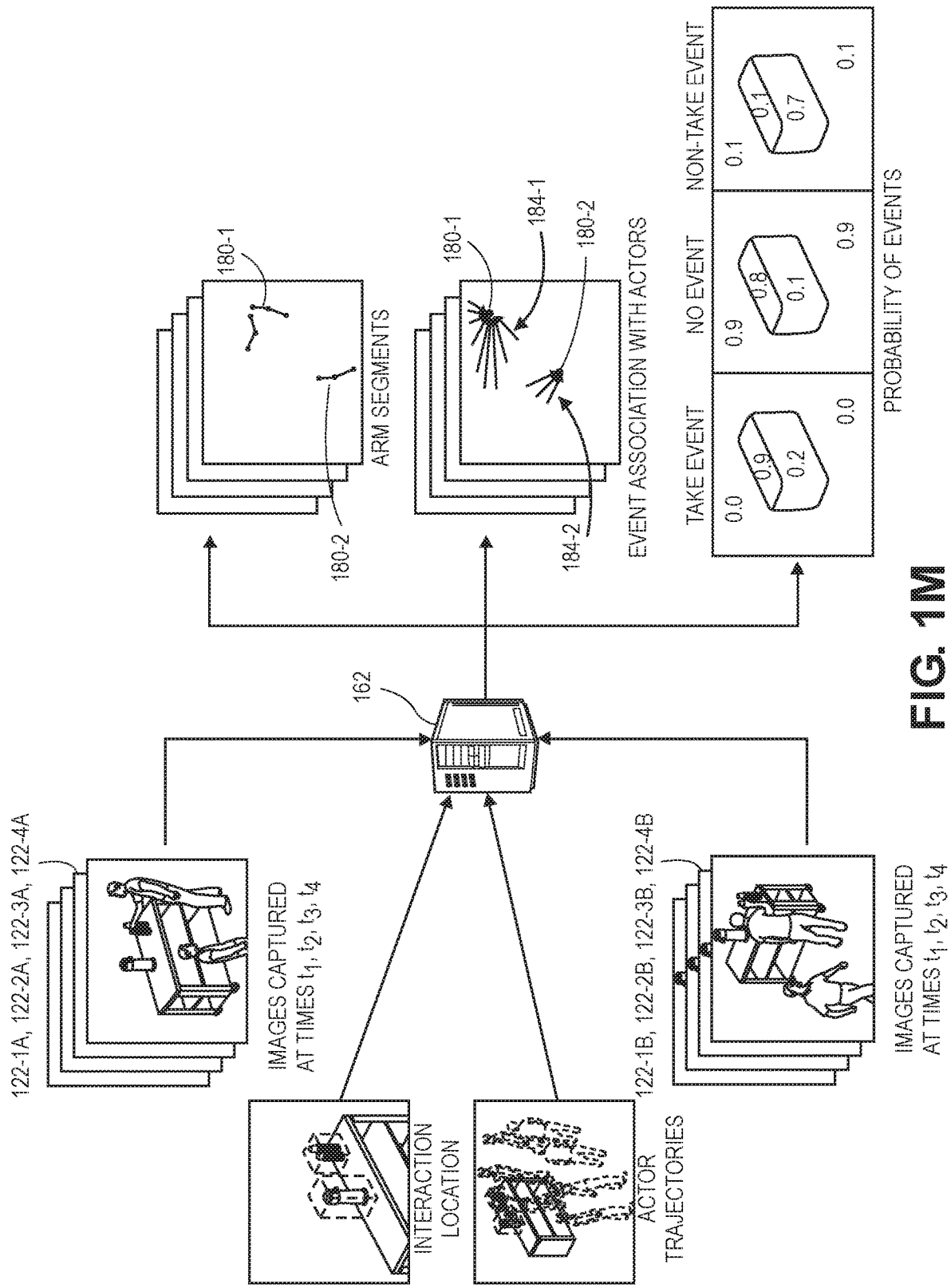

As is shown in FIG. 1N, information or data regarding the arm segments (or other body parts) of actors, the regression vectors (or association scores or pairings of pixels) and the probabilities of interactions that are determined based on the images 122-1A, 122-1B, 122-2A, 122-2B, 122-3A, 122-3B, 122-4A, 122-4B as shown in FIG. 1M may be considered by the server 162 along with positions $(x, y, z)_1$, $(x, y, z)_2$ of the imaging devices 120-1, 120-2 and their respective axes of orientation $\theta_1$, $\theta_2$, as well as with planogram data regarding the scene 110, and the trajectories $M_1(t)$, $M_2(t)$ representing locations and/or motion of the actors 180-1, 180-2, to determine whether the positions of the arm segments correspond to one or more discrete interactions involving the coffee dispenser 185-2 within a finite period of time, e.g., within respective periods of time including the times $t_1$, $t_2$, $t_3$, $t_4$, or whether such interactions constitute an event of interest, e.g., a retrieval or distribution of coffee from the coffee dispenser 185-2, and to assign such interactions to one or more actors, viz., the actors 180-1, 180-2. In some implementations, the planogram data may include any information or data regarding the locations of one or more products or other items on the scene 110, including but not limited to the locations of the cups 185-1 or the coffee dispenser 185-2 atop the uppermost shelf 172 of the storage unit 170, or coordinates of the bounding boxes $B_{1-1}$, $B_{1-2}$ which define product spaces including the cups 185-1 and the coffee dispenser 185-2.

As is shown in FIG. 1N, based on the arm segments, the regression vectors, the probabilities of interactions, the locations and motion of the actors 180-1, 180-2 and the positions $(x, y, z)_1$, $(x, y, z)_2$ and axes of orientation of the imaging devices 120-1, 120-2, an event of interest by the actor 180-1 is determined to have occurred between time $t_2$ and time $t_4$. The event of interest (e.g., a purchase of at least a portion of the liquid within the coffee dispenser 185-2) may be associated with the actor 180-1 accordingly.

Accordingly, one or more implementations of the present disclosure may capture imaging data from a scene where non-discretized items such as liquids or solids are provided in one or more containers or vessels, e.g., on a storage unit or other system. The imaging data may be processed to detect one or more body parts such as arms or portions thereof (e.g., hands, wrists, forearms, elbows, upper arms or shoulders), to generate regression vectors, association scores or other pairs of pixels associating portions of the imaging data with specific actors on the scene, and to calculate probabilities that a given portion of a scene depicted in the imaging data is in a given state within a finite period of time. As is noted above, a probability distribution indicating whether an event of interest has occurred at a given portion of an image, whether no event has occurred at the given portion of the image, or whether an event other than the event of interest has occurred at the given portion of the image, may be determined for the period of time.

For example, when an inventory area is established and includes a plurality of inventory shelves or other storage units, pixels corresponding to regions associated with interaction points (or product spaces) for such inventory shelves or storage units (e.g., "touchpoints") may be identified within image planes of an imaging device as corresponding to portions of such image planes where an event is likely to occur. Information or data regarding body parts thereof that are present on the scene, as well as the regression vectors, association scores or other pixel pairings and the probabilities that interactions occurred at such locations may be used, along with trajectories (or tracklets) representing locations, movements or orientations of actors on the scene, and positions and orientations of cameras, to determine periods of time during which an interaction with the non-discretized items occurred, or to associate the interaction with one of the actors.

In some implementations, a scene that includes one or more storage units or other systems for accommodating non-discretized items may be a facility such as a materials handling facility, a fulfillment center, a warehouse, or any other facility (e.g., indoor or outdoor). One or more processors or processor units within each of the digital cameras or other imaging devices may be programmed to execute a machine learning tool, system or technique that is trained not only to detect body parts within images, but also to generate vectors extending from pixels of such images to pixels corresponding to body parts depicted within such images, or scores associating such pairs of pixels, thereby associating each of such pixels with a position of a body part depicted within the image, to varying levels of confidence, and to calculate a probability that an interaction occurred at each of such pixels. In some implementations, probabilities that an event of interest occurred at such pixels, that an event other than the event of interest occurred at such pixels, or that no event occurred at such pixels, may be calculated. Alternatively or additionally, the processors or processor units that are programmed to execute the trained machine learning tool, system or technique may reside external to the digital cameras or imaging devices, such as servers or other computer devices or machines in one or more physical, alternate or virtual locations, e.g., in a "cloud"-based environment.

In some implementations of the present disclosure, imaging data captured using one or more imaging devices (e.g., digital cameras) may be provided as inputs to one or more machine learning tools, systems or techniques that are trained to detect one or more body parts of actors depicted within imaging data, and to identify, for one or more pixels of such images, one or more body parts of an actor depicted therein that would be most likely associated with an interaction that might occur at one or more of such pixels. The machine learning tools, systems or techniques may be any type or form of tools, systems or techniques that are trained to detect one or more body parts of actors within images, and to associate pixels of such images that depict or represent such body parts or actors with pixels corresponding to locations or interactions occurring within such images. In some implementations, a processor or processor unit provided on an imaging device, a server or another computer device or machine may be programmed to execute a fully convolutional network (e.g., a residual network, such as a deep residual learning network) on inputs including images captured thereby. Alternatively, the processor or processor unit may be programmed to operate any other type or form of tool, system or technique, e.g., a sequential model, such as a Markov model, a linear dynamical system, or the like.

Additionally, outputs received from machine learning tools, systems or techniques may be used to calculate values regarding a most likely body (or body part) of an actor to have been associated with each of the respective pixels of an image, if an interaction were to occur at such pixels. In some implementations, the values may represent vectors extending from each of such pixels to one of the actors depicted within an image, or scores associating each of such pixels with one of the actors depicted within the image. For example, such values may, for each pixel, identify a position of a centroid or other aspect of a body of an actor that is most likely associated with a hypothetical event occurring at that pixel. For any given pixel, such values may be calculated for each of the other pixels of an image, or a subset of the other pixels of an image. In some implementations, a machine learning tool, system or technique may receive pluralities of images from imaging devices as inputs, and return outputs from which pixels of most likely bodies (or body parts) may be identified. Additionally, a confidence score or other measure indicative of a level of confidence in a vector, a score or other pairing of pixels may be calculated. Where a number of vectors, scores or other pairings of pixels are generated for a given pixel, a vector, a score or a pixel pairing having a highest confidence score may be used to identify a pixel that is most likely associated with that given pixel.

The systems and methods of the present disclosure may be configured to determine any type or form of interaction or event associated with non-discretized items has occurred based on imaging data, as well as planogram data (e.g., locations of items of interest, or interaction points or product spaces associated with such locations), trajectories or other information regarding positions or motion of actors on a scene, and positions and orientations of imaging devices from which the imaging data was captured. From such information or data, arms or other body parts may be detected, and a probability distribution as to whether a given interaction was observed, along with a vector, a score or another factor that associates an event with an actor may be calculated. The probability distribution may indicate probabilities of whether an event of interest, such as a raising, lowering, rotating, repositioning or manipulation of a container or vessel of non-discretized items has occurred within a defined region in three-dimensional space, e.g., a bounding box defining an interaction point or product space, over defined periods of time. Alternatively, the probability distribution may also indicate probabilities of whether no event occurred, or whether an event other than the event of interest has occurred.

In some implementations, events of interest may involve any type of container or vessel of non-discretized items, including not only cups but also bowls, plates or dishes of any size or shape (e.g., round, square, triangular, or any other shape). Furthermore, in some implementations, non-discretized items may include any type or form of liquids such as beverages (e.g., coffee, milk, water, juice, soda or other fountain drinks), toppings (e.g., sauces, condiments, dressings), or any other form of liquids that may be purchased by customers in a non-discretized manner. The non-discretized items may further include any type or form of solids such as beans (e.g., vegetable beans, coffee beans), candies (e.g., jelly beans, bulk snacks), powders (e.g., flours, salts, coffee grounds, tea leaves), or any other form of liquids that may be purchased by customers in a non-discretized manner. The systems and methods of the present disclosure are not limited to detecting events involving the retrieval or distribution of non-discretized food products. For example, those of ordinary skill in the pertinent arts will recognize that the systems and methods disclosed herein may also be used to detect and track events involving non-food products such as fuels, soaps, or any other solvents, solutions, emulsions, suspensions or other liquids, as well as gravel, cements, fertilizers, soils, seeds or other solids. Such non-discretized items may be maintained in containers or vessels that are configured to maintain such items in any desired conditions, including but not limited to temperatures, pressures, humidities or other conditions.

Those of ordinary skill in the pertinent arts will recognize that imaging data, e.g., visual imaging data, depth imaging data, infrared imaging data, radiographic imaging data, or imaging data of any other type or form, may be captured using one or more imaging devices such as digital cameras, depth sensors, range cameras, infrared cameras or radiographic cameras. Such devices generally operate by capturing light that is reflected from objects, and by subsequently calculating or assigning one or more quantitative values to aspects of the reflected light, e.g., image pixels, then generating an output based on such values, and storing such values in one or more data stores. For example, a digital camera may include one or more image sensors (e.g., a photosensitive surface with a plurality of pixel sensors provided thereon), having one or more filters associated therewith. Such sensors may detect information regarding aspects of any number of image pixels of the reflected light corresponding to one or more base colors (e.g., red, green or blue) of the reflected light, or distances to objects from which the light was reflected. Such sensors may then generate data files including such information, and store such data files in one or more onboard or accessible data stores (e.g., a hard drive or other like component), or in one or more removable data stores (e.g., flash memory devices). Such data files may also be printed, displayed on one or more broadcast or closed-circuit television networks, or transmitted over a computer network such as the Internet.

An imaging device that is configured to capture and store visual imaging data (e.g., color images) is commonly called an RGB ("red-green-blue") imaging device (or camera), while an imaging device that is configured to capture both visual imaging data and depth imaging data (e.g., ranges) is commonly referred to as an RGBz or RGBD imaging device (or camera). Imaging data files may be stored in any number of formats, including but not limited to .JPEG or .JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), QuickTime (or ".MOV"), Moving Picture Experts Group (or ".MPG," ".MPEG" or ".MP4") or Windows Media Video (or ".WMV") files.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., a zoom level of the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

Similarly, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Furthermore, some imaging devices may digitally or electronically adjust an image identified in a field of view, subject to one or more physical or operational constraints. For example, a digital camera may virtually stretch or condense the pixels of an image in order to focus or broaden the field of view of the digital camera, and also translate one or more portions of images within the field of view. Some imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures or outlines of the features or objects, may be extracted from the data in any number of ways. For example, colors of image pixels, or of groups of image pixels, in a digital image may be determined and quantified according to one or more standards, e.g., the RGB color model, in which the portions of red, green or blue in an image pixel are expressed in three corresponding numbers ranging from 0 to 255 in value, or a hexadecimal model, in which a color of an image pixel is expressed in a six-character code, wherein each of the characters may have a range of sixteen. Colors may also be expressed according to a six-character hexadecimal model, or #NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as #FFFFFF and #000000, respectively, while the color candy apple red is expressed as #FF0800. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Furthermore, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations (e.g., intervals of time). Such algorithms or tools may be directed to recognizing and marking transitions (e.g., the contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny detectors or algorithms; Sobel operators, algorithms or filters; Kayyali operators; Roberts detection algorithms; Prewitt operators; Frei-Chen methods; or any other algorithms or techniques that may be known to those of ordinary skill in the pertinent arts. For example, objects or portions thereof expressed within imaging data may be associated with a label or labels according to one or more machine learning tools, algorithms or techniques, including but not limited to nearest neighbor methods or analyses, artificial neural networks, support vector machines, factorization methods or techniques, K-means clustering analyses or techniques, similarity measures such as log likelihood similarities or cosine similarities, latent Dirichlet allocations or other topic models, or latent semantic analyses.

The systems and methods of the present disclosure may be utilized in any number of applications in which non-discretized items (e.g., liquids or solids, as well as semi-liquid or semi-solid materials) are made available for retrieval by or distribution to actors, such as customers, including but not limited to events occurring within a materials handling facility. As used herein, the term "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose. For example, in some implementations, one or more of the systems and methods disclosed herein may be used to detect and distinguish between actors (e.g., customers) and recognize their respective interactions within a materials handling facility, including but not limited to events involving one or more non-discretized items within the materials handling facility.

Figure 2:
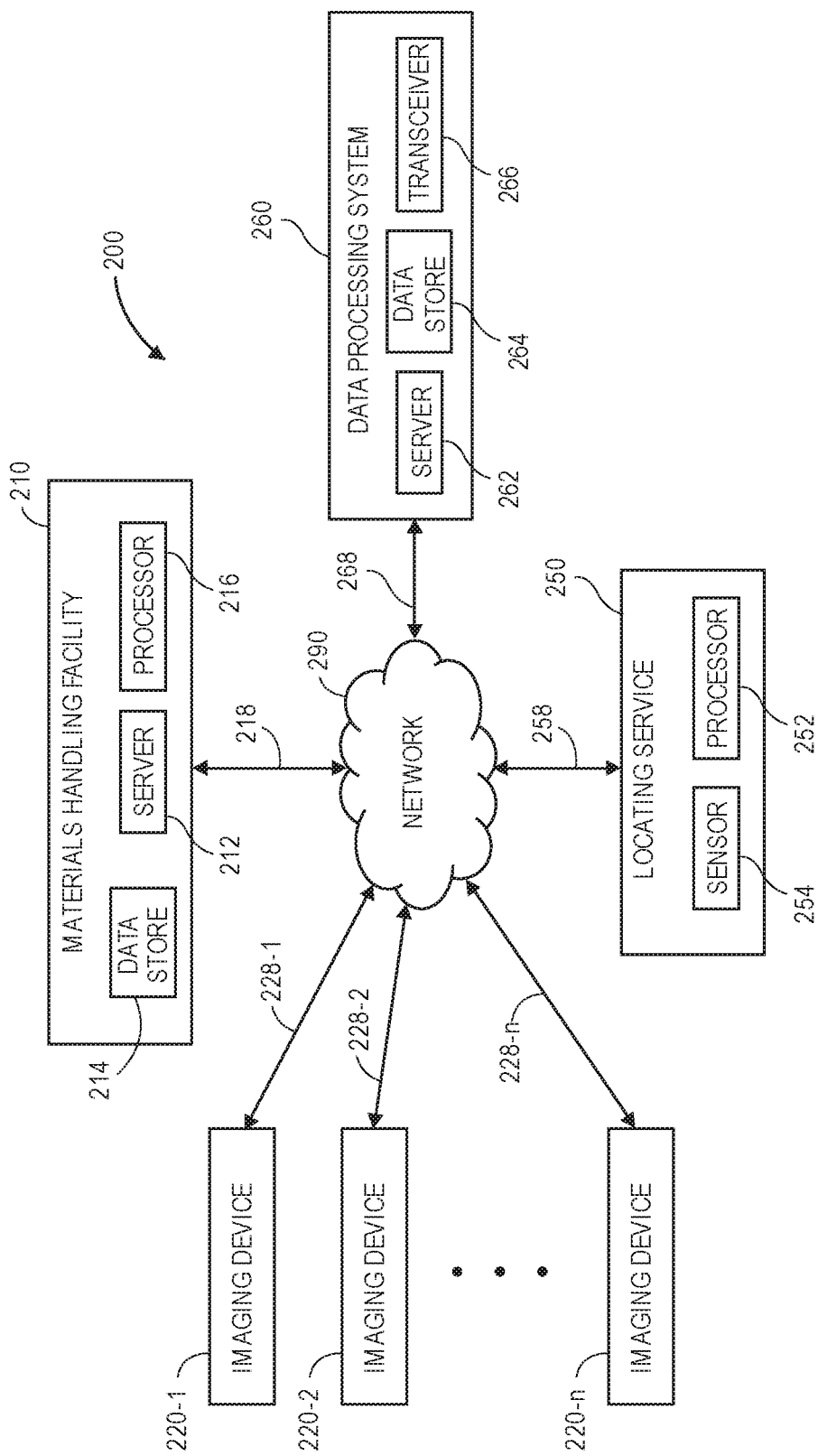
FIG. 2 is a block diagram of components of one system for detecting interactions with non-discretized items and associating interactions with actors in accordance with implementations of the present disclosure.

Referring to FIG. 2, a block diagram of components of one system 200 for detecting interactions with non-discretized items and associating interactions with actors in accordance with implementations of the present disclosure is shown. The system 200 includes a materials handling facility 210, a plurality of imaging devices 220-1, 220-2 . . . 220-n, a locating service 250 and a data processing system 260 that are connected to one another across a network 290, which may include the Internet in whole or in part. Except where otherwise noted, reference numerals preceded by the number "2" shown in FIG. 2 indicate components or features that are similar to components or features having reference numerals preceded by the number "1" shown in FIGS. 1A through 1N.

The materials handling facility 210 may be any facility that is adapted to receive, store, process and/or distribute items from a variety of sources to a variety of destinations, e.g., on behalf of or for an electronic marketplace, or on behalf of or for any other entity. The materials handling facility 210 may be configured to receive any type or kind of inventory items from various sources, to store the inventory items until a user orders or retrieves one or more of the items, or to distribute the inventory items to the user. For example, inventory items such as merchandise, commodities, perishables or any other type of item may be received from one or more suppliers, e.g., manufacturers, distributors, wholesalers, vendors or the like, at the materials handling facility 210. Upon their arrival at the materials handling facility 210, the inventory items may be prepared for storage, such as by unpacking or otherwise rearranging the inventory items, and updating one or more records to reflect the types, quantities, conditions, costs, locations or any other parameters associated with the arrival of the inventory items. Subsequently, the inventory items may be stocked, managed or dispensed in terms of countable, individual units or multiples of units, such as packages, cartons, crates, pallets or other suitable aggregations. Alternatively, one or more of the items, such as bulk products, commodities, or the like, may be stored in continuous or arbitrarily divisible amounts or volumes that may not be inherently organized into countable units, and may instead be managed in terms of measurable quantities such as units of length, area, volume, weight, time duration or other dimensional properties characterized by units of measurement.

Inventory items may be stored within an inventory area on an inventory shelf, a storage unit or another like system, such as in bins, on shelves or via other suitable storage mechanisms. The inventory shelves, storage units or like units may be flat or angled, stationary or mobile, and of any shape or size. In some implementations, all inventory items of a given type or kind may be stored in a common location within an inventory area. In other implementations, like inventory items may be stored in different locations. For example, to optimize the retrieval of inventory items having high turnover rates or velocities within a large materials handling facility, such inventory items may be stored in several different locations to reduce congestion that might be encountered if the items are stored at a single location.

When a request or an order specifying one or more of the inventory items is received, or as a user progresses through the materials handling facility 210, inventory items that are listed in the request or order, or are desired by the user, may be selected or "picked" from an inventory area at the materials handling facility 210. For example, in one implementation, a customer or other user may travel through the materials handling facility 210 with a list (e.g., a paper list, or a handheld mobile device displaying or including such a list) and may pick one or more of the inventory items from an inventory area at the materials handling facility 210. In other implementations, an employee of the materials handling facility 210 or another user may pick one or more inventory items, as may be directed by one or more written or electronic pick lists derived from orders. In some instances, an inventory item may be retrieved and delivered to a customer or another user who placed a request for the inventory item. In other instances, the inventory item may require repositioning from one location within an inventory area to another location. For example, in some instances, an inventory item may be picked from a first location (e.g., a first inventory shelf or other storage unit) in an inventory area, moved a distance, and placed at a second location (e.g., a second inventory shelf or other storage unit) in the inventory area.

As is shown in FIG. 2, the materials handling facility 210 includes a networked computer infrastructure for performing various computer-related functions associated with the receipt, storage, processing and distribution of such items, including one or more physical computer servers 212, data stores (e.g., databases) 214 and/or processors 216, that may be provided in the same physical location as the materials handling facility 210, or in one or more alternate or virtual locations, e.g., in a "cloud"-based environment. In some implementations, the servers 212, the data stores 214 and/or the processors 216 or any number of other computing devices or resources may further execute any type of computer-based function or compute any type or form of calculation, including but not limited to any formulas, equations, algorithms or techniques for determining one or more probabilities or performing any number of statistical tests.

In some implementations, the servers 212, the data stores 214 and/or the processors 216 may be configured to execute one or more machine learning tools, systems or techniques. For example, in some implementations, the servers 212 may be configured to execute an artificial neural network, such a convolutional neural network, to process imaging data received from one or more of the imaging devices 220-1, 220-2 . . . 220-*n* over the network 290.

The materials handling facility 210 may include one or more inventory areas having predefined two-dimensional or three-dimensional storage units for accommodating items and/or containers of such items, such as aisles, rows, bays, shelves, slots, bins, racks, tiers, bars, hooks, cubbies or other like storage means, or any other appropriate regions or stations, which may be flat or angled, stationary or mobile, and of any shape or size. Additionally, as is discussed above, the materials handling facility 210 may further include one or more receiving stations featuring any apparatuses that may be required in order to receive shipments of items at the materials handling facility 210 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The materials handling facility 210 may further include one or more distribution stations where items that have been retrieved from a designated inventory area may be evaluated, prepared and packed for delivery from the materials handling facility 210 to addresses, locations or destinations specified by customers, also by way of carriers such as cars, trucks, trailers, freight cars, container ships or cargo aircraft (e.g., manned aircraft or unmanned aircraft, such as drones).

Alternatively, an item received at a receiving station of the materials handling facility 210 may be transferred directly to a distribution station for further processing, or "cross-docked," without first being placed into storage in an intermediate inventory area. The materials handling facility 210 may also include one or more additional stations for receiving and distributing items to customers, as well as one or more conveying systems, autonomous mobile robots, or other manual or automated vehicles for transporting items between such stations or areas (not shown in FIG. 2). The materials handling facility 210 may operate one or more order processing and/or communication systems using computer devices or resources in communication with one or more of the servers 212, the data stores 214 and/or the processors 216, or through one or more other computing devices or resources that may be connected to the network 290, as is indicated by line 218, in order to transmit or receive information in the form of digital or analog data, or for any other purpose.

The materials handling facility 210 may be associated with a plurality of imaging devices 220-1, 220-2 . . . 220-*n* (or other sensors), which may be any form of optical recording device that may be used to photograph or otherwise record imaging data of structures, facilities or items within the materials handling facility 210, or for any other purpose. The imaging devices 220-1, 220-2 . . . 220-*n* may be mounted in any specific location or orientation within the materials handling facility 210, e.g., above, below or alongside one or more inventory areas or stations for receiving or distributing items. Alternatively, the imaging devices 220-1, 220-2 . . . 220-*n* may be provided in any open or enclosed environment or space in which any number of actors (e.g., humans, other animals or machines) may execute one or more poses, gestures or other actions within one or more of their fields of view.

Each of the imaging devices 220-1, 220-2 . . . 220-*n* shown in FIG. 2 may include one or more sensors, memory or storage components, processors or transceivers, and such sensors, memory components, processors or transceivers may further include one or more photosensitive surfaces, filters, chips, electrodes, clocks, boards, timers or any other relevant features (not shown). For example, each of the imaging devices 220-1, 220-2 . . . 220-*n* may include one or more optical sensors, including color sensors (or grayscale sensors or black-and-white sensors) and/or depth sensors configured to capture visual imaging data (e.g., textures) or depth imaging data (e.g., ranges) to objects within one or more fields of view of the imaging devices 220-1, 220-2 . . . 220-*n*. Additionally, the one or more processors, one or more memory components or one or more transceivers, and any other components (not shown), of the imaging devices 220-1, 220-2 . . . 220-*n* may be configured to capture, analyze and/or store imaging data from within the materials handling facility 210 environment in which such imaging devices 220-1, 220-2 . . . 220-*n* are provided. For example, the imaging devices 220-1, 220-2 . . . 220-*n* may capture one or more still or moving images (e.g., streams of visual and/or depth images or image frames), along with any relevant audio signals or other information (e.g., position data), and may also connect to or otherwise communicate with the servers 212, or any other computer devices within the materials handling facility 210 (not shown), or with one or more external computer devices over the network 290, through the sending and receiving of digital data. In some implementations, the transceivers may be configured to enable the imaging devices 220-1, 220-2 . . . 220-*n* to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, either by way of the servers 212 or over the network 290 directly.

The imaging devices 220-1, 220-2 . . . 220-*n* may be homogenous or heterogeneous in nature, in accordance with the present disclosure. For example, one or more of the imaging devices 220-1, 220-2 . . . 220-*n* may have both color sensors and depth sensors. Alternatively, one or more of the imaging devices 220-1, 220-2 . . . 220-*n* may have just a color sensor (or grayscale sensor or black-and-white sensor) or just a depth sensor. For example, in some implementations, one or more of the imaging devices 220-1, 220-2 . . . 220-*n* may be configured to capture depth imaging data, e.g., distances or ranges to objects within their respective fields of view. In some implementations, one or more of the imaging devices 220-1, 220-2 . . . 220-*n* may be configured to capture visual imaging data, e.g., visual images or images in color, grayscale or black-and-white. Moreover, in some implementations, the imaging devices 220-1, 220-2 . . . 220-*n* may be calibrated, such that mappings between coordinates of imaging data captured by the imaging devices 220-1, 220-2 . . . 220-*n* and directions relative to their respective image sensors are known.

One or more of the imaging devices 220-1, 220-2 . . . 220-*n* may be an RGB color camera, a still camera, a motion capture/video camera or any other type or form of camera. In other implementations, one or more of the imaging devices 220-1, 220-2 . . . 220-*n* may be depth-sensing cameras, such as an RGBz or RGBD camera. In still other implementations, one or more of the imaging devices 220-1, 220-2 . . . 220-*n* may be a thermographic or infrared (IR) camera. Additionally, in some implementations, the imaging devices 220-1, 220-2 . . . 220-*n* may simply be camera modules that include a lens and an image sensor configured to convert an optical image obtained using the lens of the camera into a digital signal or digital representation of the image (generally referred to herein as imaging data). In one implementation, the image sensor may be an RGB sensor capable of supporting an image resolution of at least 860× 480 at six frames per second that may likewise be configured to provide image data to other components (e.g., a graphics processing unit) for processing. In some implementations, the imaging devices 220-1, 220-2 . . . 220-*n* may be paired to provide stereo imagery and depth information, and may include a pair of camera modules. Additionally, imaging data may be stored in any variety of formats, including but not limited to RGB, RAW, .BMP, .JPG or .JPEG, .GIF, or the like.

The imaging devices 220-1, 220-2 . . . 220-*n* may also include manual or automatic features for modifying their respective fields of view or orientations. For example, one or more of the imaging devices 220-1, 220-2 . . . 220-*n* may be configured in a fixed position, or with a fixed focal length (e.g., fixed-focus lenses) or angular orientation. Alternatively, one or more of the imaging devices 220-1, 220-2 . . . 220-*n* may include one or more motorized features for adjusting a position of the imaging device, or for adjusting either the focal length (e.g., zooming the imaging device) or the angular orientation (e.g., the roll angle, the pitch angle or the yaw angle), by causing changes in the distance between the sensor and the lens (e.g., optical zoom lenses or digital zoom lenses), changes in the location of the imaging devices 220-1, 220-2 . . . 220-*n*, or changes in one or more of the angles defining the angular orientation.

For example, one or more of the imaging devices 220-1, 220-2 . . . 220-*n* may be hard-mounted to a support or mounting that maintains the device in a fixed configuration or angle with respect to one, two or three axes. Alternatively, however, one or more of the imaging devices 220-1, 220-2 . . . 220-*n* may be provided with one or more motors and/or controllers for manually or automatically operating one or more of the components, or for reorienting the axis or direction of the device, i.e., by panning or tilting the device. Panning an imaging device may cause a rotation within a horizontal axis or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Some of the imaging devices 220-1, 220-2 . . . 220-*n* may digitally or electronically adjust an image identified in a field of view, subject to one or more physical and operational constraints. For example, a digital camera may virtually stretch or condense the pixels of an image in order to focus or broaden a field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Once the characteristics of stationary or moving objects or portions thereof have been recognized in one or more digital images, such characteristics of the objects or portions thereof may be matched against information regarding contours, outlines, colors, textures, silhouettes, shapes or other characteristics of known objects, which may be stored in one or more data stores. In this regard, stationary or moving objects may be classified based at least in part on the extent to which the characteristics identified in one or more digital images correspond to one or more of the characteristics of the known objects.

The operability of the imaging devices 220-1, 220-2 ... 220-n, e.g., digital cameras, may be affected based on the lighting conditions and characteristics of the scenes in which the imaging devices 220-1, 220-2 ... 220-n are deployed, e.g., whether such scenes have sufficient lighting at appropriate wavelengths, whether such scenes are occluded by one or more objects, or whether such scenes are plagued by shadows or other visual impurities. The operability may also depend on the characteristics of the objects within the scenes, including variations, reflectances or deformations of their respective surfaces, as well as their sizes or textures.

Although the system 200 of FIG. 2 includes boxes corresponding to three imaging devices 220-1, 220-2 ... 220-n, those of ordinary skill in the pertinent arts will recognize that any number or type of imaging devices may be provided within the materials handling facility 210 in accordance with the present disclosure, including but not limited to digital cameras, depth sensors or range cameras, infrared cameras, radiographic cameras or other devices having one or more optical sensors. In some implementations, the system 200 (e.g., the materials handling facility 210) may include dozens or even hundreds of imaging devices of any type or form.

The materials handling facility 210 may also include any number of other sensors, components or other features for detecting one or more events or interactions therein, including one or more load sensors, RFID sensors, LIDAR sensors, or any other type or form of sensors. Information or data captured by a variety of sensors may be independently or collectively evaluated in order to determine a measure of a probability or likelihood that an event has occurred at a specific location, and processed according to one or more of the systems or methods disclosed herein if an event is determined to have occurred, to a predetermined level of confidence or accuracy, or discarded when it is determined that no event has occurred. Likewise, a location or a time of an event may be determined based on information or data captured by any of such sensors, which may be independently or collectively evaluated in order to identify the location or the time at which the event has most likely occurred.

The materials handling facility 210 may also include one or more other components or features for controlling or aiding in the operation of the materials handling facility 210, including but not limited to one or more thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), laser sensors, weight sensors, attitude indicators, depth gauges, accelerometers, or sound sensors (e.g., microphones, piezoelectric sensors, vibration sensors or other transducers for detecting and recording acoustic energy from one or more directions).

The materials handling facility 210 may also include one or more human operators (not shown), such as one or more workers, who may be any designated personnel tasked with performing one or more tasks within the materials handling facility 210 in general, or within one or more inventory areas, receiving stations, distribution stations or other locations of the materials handling facility 210 in particular. Such workers may handle or transport items (e.g., any type or form of good, product, media or other tangible consumer article) within the materials handling facility 210, or operate one or more pieces of equipment therein (not shown). Such workers may also operate one or more specific computing devices or resources for registering the receipt, retrieval, transportation or storage of items within the materials handling facility 210, e.g., a general purpose device such as a personal digital assistant, a digital media player, a smartphone, a tablet computer, a desktop computer or a laptop computer (not shown), which may include any form of input and/or output peripherals such as scanners, readers, keyboards, keypads, touchscreens or like devices.

In some implementations, such devices may include one or more wireless modules to facilitate communications with the servers 212, with one or more of the imaging devices 220-1, 220-2 ... 220-n, or with one or more computer devices or resources, such as the servers 212, over the network 290, as well as a display (e.g., a touchscreen display) to facilitate the visible presentation to and interaction with a human operator. Such devices may be configured to store a unique identifier associated with a given human operator, and provide the unique identifier to the servers 212 or to another computer device or resource in order to identify the human operator. In some implementations, a portable device may also include one or more other features, e.g., audio input/output peripherals or accessories, such as speakers or microphones, as well as video input/output peripherals or accessories, such as cameras, projectors, haptic peripherals, accessories such as keyboards, keypads, touchscreens, joysticks, control buttons, or other components. Such portable devices may operate in conjunction with or may otherwise utilize or communicate with one or more components of the materials handling facility 210.

The locating service 250 includes one or more processors 252 and one or more sensors 254 for detecting the presence or absence of one or more actors within the materials handling facility 210, and locating one or more poses, gestures or other actions executed by such actors within the materials handling facility 210. The processors 252 may be provided in the same physical location as the materials handling facility 210 or in one or more alternate or virtual locations, e.g., in a "cloud"-based environment.

The sensors 254 may be any components or systems for capturing information or data regarding the motion, locations and/or orientations of actors within operational ranges. In some implementations, the sensors 254 may include, but are not limited to, one or more imaging devices (e.g., digital cameras) having diverse fields of view of the materials handling facility 210, or other scenes, that are configured to capture data that may be processed to recognize and locate motion, locations and/or orientations of various actors within the materials handling facility 210. For example, in some implementations, an actor may present one or more credentials prior to entering the materials handling facility 210, or while such actors are present within the materials handling facility 210, within the fields of view of the sensors 254. One or more identifiers of the actor (e.g., an account number associated with the actor) may be determined based on such credentials, and assigned to pixels that are depicted or represented within such imaging data and correspond to the actor. Subsequently, the motion, locations and/or orientations of actors within the materials handling facility 210 may be monitored by the one or more sensors 254, which may include one or more of the imaging devices 220-1, 220-2 . . . 220-n, or other imaging devices or other sensors, based on such pixels. By assigning identifiers of actors to pixels, or by creating descriptors of pixels that are associated with actors, an actor may be identified in images that are subsequently captured by the sensors 254. When an actor has been identified as being associated with an event in which an item is retrieved or deposited, one of the item may be added to a virtual shopping cart or other record associated with the actor, or removed from the virtual shopping cart or other record associated with the actor, as necessary.

Alternatively, or in addition to imaging devices, the sensors 254 may include any other type of sensing systems for detecting actors and recognizing their motion, locations and/or orientations within the materials handling facility 210. Such sensors 254 may include, but are not limited to, one or more load or weight sensors provided on walking or traveling surfaces within the materials handling facility 210, one or more RFID components (e.g., antennas or tags) for transmitting and/or receiving RFID signals associated with actors, one or more LIDAR sensors or receivers for detecting actors, or any other systems or components by which information regarding actors and their motion, locations and/or orientations may be gathered. The type or form of sensors 254 that may gather information or data regarding actors and their motion, locations and/or orientations at the materials handling facility 210 are not limited.

The processors 252 may be programmed or otherwise configured to generate one or more trajectories or tracklets representative of the motion, the locations and/or the orientations of each of the actors within the materials handling facility 210, such as one or more three-dimensional articulated models of partial or complete sets of body parts of the actors within the materials handling facility 210, based on information or data gathered by the sensors 254. Such models may be generated as vectors or functions over time that represent motion of body parts embodied by nodes and edges between such nodes, or in any other manner.

For example, a number and positions of actors within a material handling facility may be identified based on imaging data captured by a plurality of cameras, such as based on one or more outlines, faces or other attributes of actors (e.g., customers, workers or other humans) detected in images captured by any of the cameras and recognized as corresponding to one or more actors, or possibly corresponding to one or more actors. A record of the number of actors within the materials handling facility, or the identities of the actors, may be determined based on images captured by such cameras (e.g., according to one or more other facial recognition and/or other object recognition techniques). Alternatively, a number and/or a position of one or more actors within the materials handling facility may be determined based on information or data gathered by one or more sensors other than a camera. For example, a materials handling facility may include a scanner, a reader or other device configured to identify actors who enter or exit the materials handling facility, e.g., based on information or data provided by an application operating on a mobile device carried by such actors, or in any other manner. In some implementations, the cameras that are used to determine the number and/or the position of the actors within the materials handling facility may be one or more of the same sensors that detected the event. In some implementations, the cameras need not be the same sensors that detected the event.

In some implementations, nodes corresponding to body parts may be represented in space by a set of Cartesian coordinates, or coordinates according to any other system, and an articulated model in the form of a record or vector may include one or more of such sets of coordinates. In some implementations, edges extending between a pair of nodes may be established by reference to each of the nodes of the pair, as well as a linear formula, a linear equation or other representation of points extending between the respective nodes of the pair, and an articulated model in the form of a record or a vector may identify edges by reference to their respective nodes, or include one or more of such formulas, equations or other representations for such edges. For example, detections of body parts may be matched across multiple views in two-dimensional images and converted to three-dimensional rays that begin at optical elements of the respective imaging devices and terminate at surfaces of objects at a given pixel, based on the intrinsic properties of such imaging devices and extrinsic properties of a scene, and merged into one, e.g., by triangulating the rays corresponding to such detections, thereby enabling a body part to be detected and re-detected in the multiple views even if the body part is temporarily occluded in one of the views. The trajectories may be models of smoothed three-dimensional tracks that best fit a plurality of two-dimensional observations of a body part within multiple images. In some implementations, trajectories may be defined by minimizing differences between ray projections extending from optical elements of imaging devices to pixels depicting or representing specific body parts detected within images captured by such imaging devices and splines or other curves defined from such frames, e.g., according to a least squares problem. Any method or technique for defining a three-dimensional track or trajectory of a body part or an actor from two-dimensional observations of the body part or the actor in images may be utilized in accordance with the present disclosure.

The data processing system 260 includes one or more physical computer servers 262 having one or more data stores 264 (e.g., databases) and transceivers 266 associated therewith, as well as provided for any specific or general purpose. For example, the data processing system 260 of FIG. 2 may be independently provided for the exclusive purpose of receiving, analyzing or storing imaging data or other information or data received from the materials handling facility 210, the imaging devices 220-1 . . . 220-n or the locating service 250, or, alternatively, provided in connection with one or more physical or virtual services that are configured to receive, analyze or store such imaging data or other information or data, as well as one or more other functions. In some implementations, the data processing system 260 may be associated with the materials handling facility 210, or any other physical or virtual facility.

The servers 262 may be connected to or otherwise communicate with the data stores 264, which may store any type of information or data, including but not limited to acoustic signals, information or data relating to imaging data, or information or data regarding environmental conditions, operational characteristics, or positions, for any purpose. For example, in some implementations, the servers 262 may process images captured by the imaging devices 220-1, 220-2 . . . 220-n, e.g., according to one or more machine learning tools or techniques. For example, one or more processors of each of the imaging devices 220-1, 220-2 . . . 220-*n* may be programmed or configured to execute one or more machine learning tools or techniques to detect one or more aspects of human actors or other objects, or to segment portions of imaging data that include the actors or objects. In some implementations, such processors may receive one or more of the images as inputs to such machine learning tools or techniques, and one or more aspects of the objects may be determined or predicted based on outputs received from the one or more machine learning tools or techniques. In some implementations, the imaging devices 220-1, 220-2 . . . 220-*n* may be configured to transmit the imaging data to one or more external computer devices or systems, which may be configured to execute one or more machine learning tools or techniques to detect one or more aspects of human actors or other objects, or to segment portions of imaging data that include the actors or objects, from the imaging data captured by one or more of the imaging devices 220-1, 220-2 . . . 220-*n*.

In some implementations, the servers 262 may be configured to execute an artificial neural network, such as a convolutional neural network, to process imaging data captured by one or more of the imaging devices 220-1, 220-2 . . . 220-*n*. For example, in some implementations, one such neural network may be a neural network backbone (e.g., a residual neural network backbone) with one or more output layers. In some implementations, a neural network may have two output layers, including one output layer associated with a prediction of an event-to-actor regression or score (e.g., a vector or an association score) extending between one or more pixels of an image and one or more pixels corresponding to one or more body parts (e.g., a head, a shoulder, a torso, a waist or a foot) of an actor, and one output layer associated with a confidence score or other metric associated with the regression or score. For example, for a given pixel of an image, a vector extending to a pixel of a body or body part of an actor may be defined by coordinate points of the pixel of the body or body part of that actor, e.g., a two-dimensional score corresponding to the coordinate points within an image plane of the image (e.g., an x, y coordinate pair). The confidence score may be represented by a one-dimensional score for each pixel, as well.

In some implementations, the servers 262 may calculate regression outputs by two-layer perceptrons for each pixel. For example, a first layer may combine features from multiple resolutions of an image, with the use of multiple filters, and a second layer may be a conventional output layer that is configured to generate a two-dimensional regression vector, e.g., one or more coordinate pairs corresponding to a body or body part of an actor. In some implementations, confidence outputs may also be generated from the same image, at a single resolution or at multiple different resolutions of the image, either unfiltered or with the use of one or more filters.

The servers 262, the computer data stores 264 and/or the transceivers 266 may also connect to or otherwise communicate with the network 290, as indicated by line 268, through the sending and receiving of digital data. For example, the data processing system 260 may include any facilities, stations or locations having the ability or capacity to receive and store information or data, such as media files, in one or more data stores, e.g., media files received from the imaging devices 220-1 . . . 220-*n*, or from one or more other external computer systems (not shown) via the network 290. In some implementations, the data processing system 260 may be provided in a physical location. In other such implementations, the data processing system 260 may be provided in one or more alternate or virtual locations, e.g., in a "cloud"-based environment. In still other implementations, the data processing system 260 may be provided onboard one or more vehicles, e.g., an unmanned aerial vehicle.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some implementations, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and other resources described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method (e.g., speech recognition or gesture recognition devices or techniques) to interact with the computers, servers, devices and the like, or to "select" an item, link or any other aspect of the present disclosure.

Those of ordinary skill in the pertinent arts will understand that process steps described herein as being performed by a "materials handling facility," a "locating service," a "data processing system," an "actor" (or "customer," or "user," or "worker," or "human operator") or like terms, may be automated steps performed by their respective computer devices or resources, or implemented within software modules (or computer programs) executed by one or more general purpose computers. Those of ordinary skill in the pertinent arts would also recognize that process steps described as being performed by a "materials handling facility," a "locating service," a "data processing system" or an "actor" (or "customer," or "user," or "worker," or "human operator") may be typically performed by a human, but could, alternatively, be performed by an automated agent.

The materials handling facility 210 (or any actors associated therewith), the imaging devices 220-1, 220-2 . . . 220-*n*, the locating service 250 and/or the data processing system 260 may use any web-enabled or Internet applications or features, or any other client-server applications or features including electronic mail (or E-mail), or other messaging techniques, to connect to the network 290 or to communicate with one another, such as through short or multimedia messaging service (SMS or MMS) text messages. For example, the servers 212 may be adapted to transmit or receive information or data in the form of synchronous or asynchronous messages to or from the imaging devices 220-1, 220-2 . . . 220-*n*, the locating service 250 and/or the data processing system 260, or any other computer device (e.g., any device having any number of other servers, data stores, processors or the like) in real time or in near-real time, or in one or more offline processes, via the network 290. Those of ordinary skill in the pertinent art would recognize that the materials handling facility 210 (or any actors associated therewith), the imaging devices 220-1, 220-2 . . . 220-*n*, the locating service 250 and/or the data processing system 260 may operate any of a number of computing devices or resources that are capable of communicating over the network 290, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a transitory and/or non-transitory computer-readable medium that is within or accessible by computers or computer components such as the servers 212, the data stores 214, the processor 216, the imaging devices 220-1, 220-2 . . . 220-*n*, the processor 252, the sensors 254 and/or the server 262, the data store 264 or the transceiver 266, or any other computers or control systems utilized by the materials handling facility 210, the imaging devices 220-1, 220-2 . . . 220-*n*, the locating service 250 and/or the data processing system 260 and having sequences of instructions which, when executed by a processor (e.g., a central processing unit, or "CPU," or a graphics processing unit, or "GPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

The present disclosure references a number of computer-based functions or tasks that may be executed by one or more computer processors, systems or resources. In some implementations, each of such functions or tasks may be executed by processors that are external to imaging devices, such as in one or more other physical, alternate or virtual locations, e.g., in a "cloud"-based environment. In some other implementations, each of such functions or tasks may be executed by processors associated with an imaging device, or two or more imaging devices, which may control one or more aspects of the capture, processing and/or storage of imaging data. In still other implementations, such functions or tasks may be executed in a distributed manner, such as by computer processors, systems or resources in two or more locations. For example, some of such functions or tasks may be executed by processors associated with one or more imaging devices, while other functions or tasks may be executed by processors located in one or more other physical, alternate or virtual locations.

Figure 3:
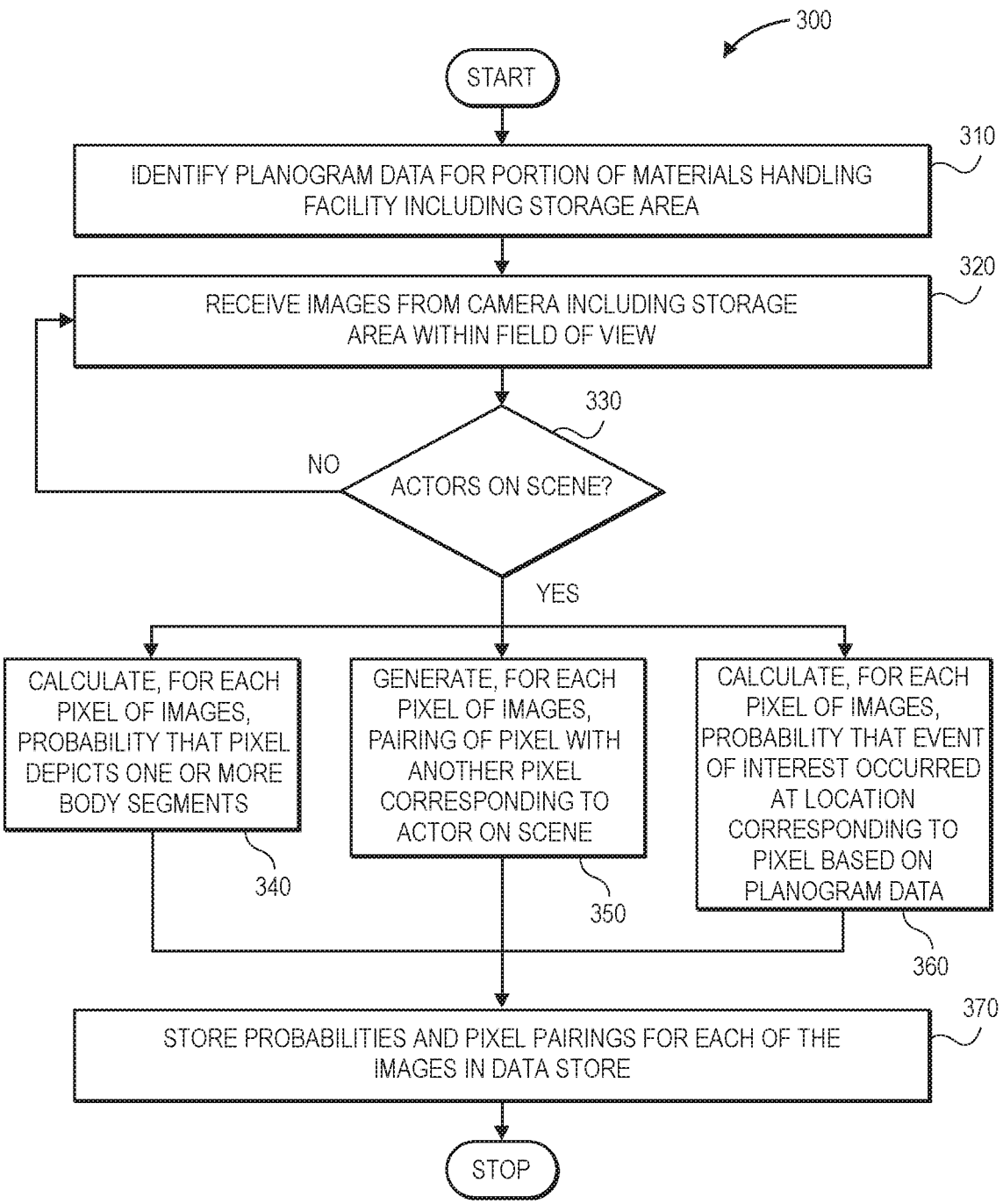
FIG. 3 is a flow chart of one process for detecting interactions with non-discretized items and associating interactions with actors in accordance with implementations of the present disclosure.

As is discussed above, one or more imaging devices of the present disclosure, or one or more other computer processors, systems or resources associated with such imaging devices, may be programmed to execute a machine learning tool, system or technique for detecting bodies or body parts of actors within imaging data (e.g., images) captured thereby, for determining which of the pixels expressed within the imaging data is most likely associated with one of such bodies, and for determining a probability that an event of interest has occurred at a given location within a materials handling facility, as depicted within the imaging data, or is associated with one or more of the actors. Referring to FIG. 3, a flow chart 300 of one process for detecting interactions with non-discretized items and associating interactions with actors in accordance with implementations of the present disclosure is shown. At box 310, planogram data for at least a portion of a materials handling facility including a storage area (or storage unit) is identified. The planogram data may consist of one or more diagrams, drawings or other representations of details regarding placements of products in one or more locations at the materials handling facility, including but not limited to one or more surfaces within the storage area. In some implementations, the planogram data may comprise sets of coordinates or other identifiers of locations of surfaces at the materials handling facility, as well as whether or which of such surfaces has one or more items thereon, at any level or degree of complexity.

At box 320, images are received from a camera including the storage area within their respective fields of view. For example, referring again to FIGS. 1A and 1B, each of the imaging devices 120-1, 120-2 may be connected to a server or other computer device or system (not shown) over one or more networks, e.g., by wired or wireless connections. In some implementations, the images may be received from any number of digital cameras or other imaging devices, such as visual digital cameras, depth cameras, combinations of visual and depth cameras (e.g., RGBD cameras), or any other optical system configured to capture imaging data from a scene that includes one or more shelves or one or more other storage components such as bays, slots, bins, tables, racks, tiers, bars, hooks or cubbies. Additionally, such cameras may be calibrated, such that mappings between coordinates of imaging data captured by the cameras and directions relative to their respective image sensors are known.

At box 330, whether any actors are present on a scene is determined. The actors may be detected or identified in any manner, such as by processing one or more of the images received from any number of cameras at box 320, e.g., in order to determine whether any of such images captured over a predetermined period of time depict one or more human actors. Alternatively, where a locating service has determined positions of actors using one or more sensors (e.g., imaging devices, load sensors, RFID components, LIDAR components), such as by generating one or more trajectories or tracklets corresponding to the positions or motions of such actors, whether any actors are present within the scene may be determined based on information or data captured using such sensors, or from such trajectories or tracklets.

If there are no actors present on the scene, the process returns to box 320, where pluralities of images continue to be received from the camera. If there are any actors present on the scene, however, then the process advances to box 340, where a probability that a given pixel depicts or represents one or more segments of a human body (e.g., an arm) is calculated for each pixel of each of the images received from the cameras over a period of time. For example, in some implementations, the images may be provided as inputs to a machine learning tool, system or algorithm such as a deep neural network, a convolutional neural network, a support vector machine, or other type or form of classifier, algorithm or technique that is trained to recognize any number of discrete body parts within an image frame, including but not limited to one or more of a hand, a wrist, a forearm, an elbow, an upper arm and/or a shoulder.

In parallel, at box 350, for each pixel of each of the images received from the cameras over the period of time, a pairing of the pixel (e.g., a regression vector or association score extending between a given pixel and one or more body parts of an actor on the scene) with another pixel of an actor on the scene is generated. At box 360, a probability that an event of interest occurred over the period of time at a location corresponding to the pixel is calculated based at least in part on the planogram data. In some implementations, for each pixel of an image, a pairing of pixels such as a pixel-to-actor regression vector or association score may take the form of a coordinate pair, e.g., an (x, y) pair for each pixel that identifies another pixel depicting or representing a body part of an actor within an image plane of the image. In some implementations, the pixel pairings may be generated using one or more processors or processor units operating on the cameras that captured the images, or on one or more other computer devices or machines, e.g., by a machine learning system to detect the body parts within the images captured by the digital camera, or to associate such body parts with locations within such images. Likewise, a probability that a pixel or set of pixels within a given image depicts or represents an event of interest, e.g., a "taking event" by which non-discretized items are retrieved by an actor or distributed to the actor, may be calculated. Alternatively, a probability that the pixel or set of pixels does not depict or represent any events, or a probability that the pixel or set of pixels depicts or represents an event other than the event of interest, e.g., an event that is not a "taking event," may also be calculated. The probabilities that the event of interest has occurred, that no event has occurred, or that an event other than the event of interest has occurred, may be generated as a part of a property distribution. In some implementations, such processors or processor units may be provided in the same physical location as the cameras, or in close proximity to the cameras. In other implementations, the processors or processor units may be provided in one or more other locations, e.g., alternate or virtual locations, such as in a "cloud"-based environment. Moreover, the probabilities may be calculated for the pixels on any basis.

At box 370, the probabilities calculated for each of the images at boxes 340 and 360, and the pairings of pixels generated for each of the images at box 350, are stored in one or more data stores, and the process ends. As is discussed above, the process shown in the flow chart 300 of FIG. 3 may be performed for each of the images captured by each of a plurality of cameras, and probabilities and pairings of pixels calculated or generated for each of such images may be stored in the one or more data stores accordingly.

Referring to FIGS. 4A through 4F, views of aspects of one system for detecting interactions with non-discretized items and associating interactions with actors in accordance with implementations of the present disclosure are shown. Except where otherwise noted, reference numerals preceded by the number "4" shown in FIGS. 4A through 4F indicate components or features that are similar to components or features having reference numerals preceded by the number "2" shown in FIG. 2, or by the number "1" shown in FIGS. 1A through 1N.

As is shown in FIG. 4A, a system 400 includes a materials handling facility 410 having a plurality of imaging devices 420-1, 420-2, 420-3, 420-4 and an inventory area 470 (or storage unit) provided at least partially within the fields of view of the imaging devices 420-1, 420-2, 420-3, 420-4. Each of the imaging devices 420-1, 420-2, 420-3, 420-4 is in communication with a network 490, e.g., by wired or wireless connections. The inventory area 470 includes a kettle 485-1 or other system for maintaining non-discretized items (e.g., soups or other liquids) in a desired condition or state (e.g., at a desired temperature or pressure), and a plurality of bowls 485-2 into which at least some of the non-discretized items may be dispensed from the kettle 485-1. As is also shown in FIG. 4A, a bounding box $B_4$ defines an interaction point or product space with respect to the kettle 485-1. The bounding box $B_4$ may include a plurality of pixels or positions of such pixels in three-dimensional space that surround or are otherwise associated with the kettle 485-1. Alternatively, another bounding box (not shown in FIG. 4A), similar to the bounding box $B_{1-1}$ of FIG. 1C, may define an interaction point or product space with respect to one or more of the bowls 485-2. Additionally, as is also shown in FIG. 4A, a pair of actors 480-1, 480-2 are located within the materials handling facility 410.

In accordance with the present disclosure, images captured using the imaging devices 420-1, 420-2, 420-3, 420-4 may be processed to detect interactions with the kettle 485-1 or the non-discretized items therein using one or more machine learning tools, systems or techniques. More specifically, one or more interaction points or product spaces at the materials handling facility 410, including the interaction point or product space defined by the bounding box $B_4$ or any others (not shown), may exist in or be represented by one of three states at any given time: that an event of interest is occurring at the interaction point or product space, that no event is occurring at the interaction point or product space, or that an event other than the event of interest is occurring at the interaction point or product space. For example, where a materials handling facility includes P product spaces, the number of possible states of the material handling facility is $3^P$.

Where a change in any of the states corresponding to any one of the interaction points or product spaces is detected over a period of time, probabilities may be calculated based on imaging data captured following the change in state in order to predict the state in which the interaction point or product space exists, viz., whether an event is occurring at the interaction point or product space for which the change in state is detected. In some implementations, a state of an interaction point or a product space may be determined for each of a plurality of finite periods of time beginning at a time when a change in state is detected, and ending at a time when another change in the state is detected, with the state presumably remaining constant between the times of the detected changes, and for a number of the finite periods of time. Once a change in state of a given interaction point or product space is determined, information or data obtained from imaging data captured during the finite periods of time since the previous change in state are processed to determine the state of the interaction point or product space during the finite periods of time, and, where the state is that an event of interest is occurring at the interaction point or product space, to determine an actor associated with the event of interest during the finite periods of time. For example, where a plurality of images are processed along with planogram data, trajectories of actors and locations and orientations of cameras to identify one or more body parts, to detect interactions with interaction points or product spaces, or to associate interactions with customers, predictions of interactions (e.g., whether an event of interest, no event, or an event other than the event of interest is predicted to have occurred), and associations of such interactions with actors determined from images captured by a plurality of imaging devices may be merged to result in a final, overall list or set of events of interest that are predicted to have occurred at the scene.

Figure 4B:
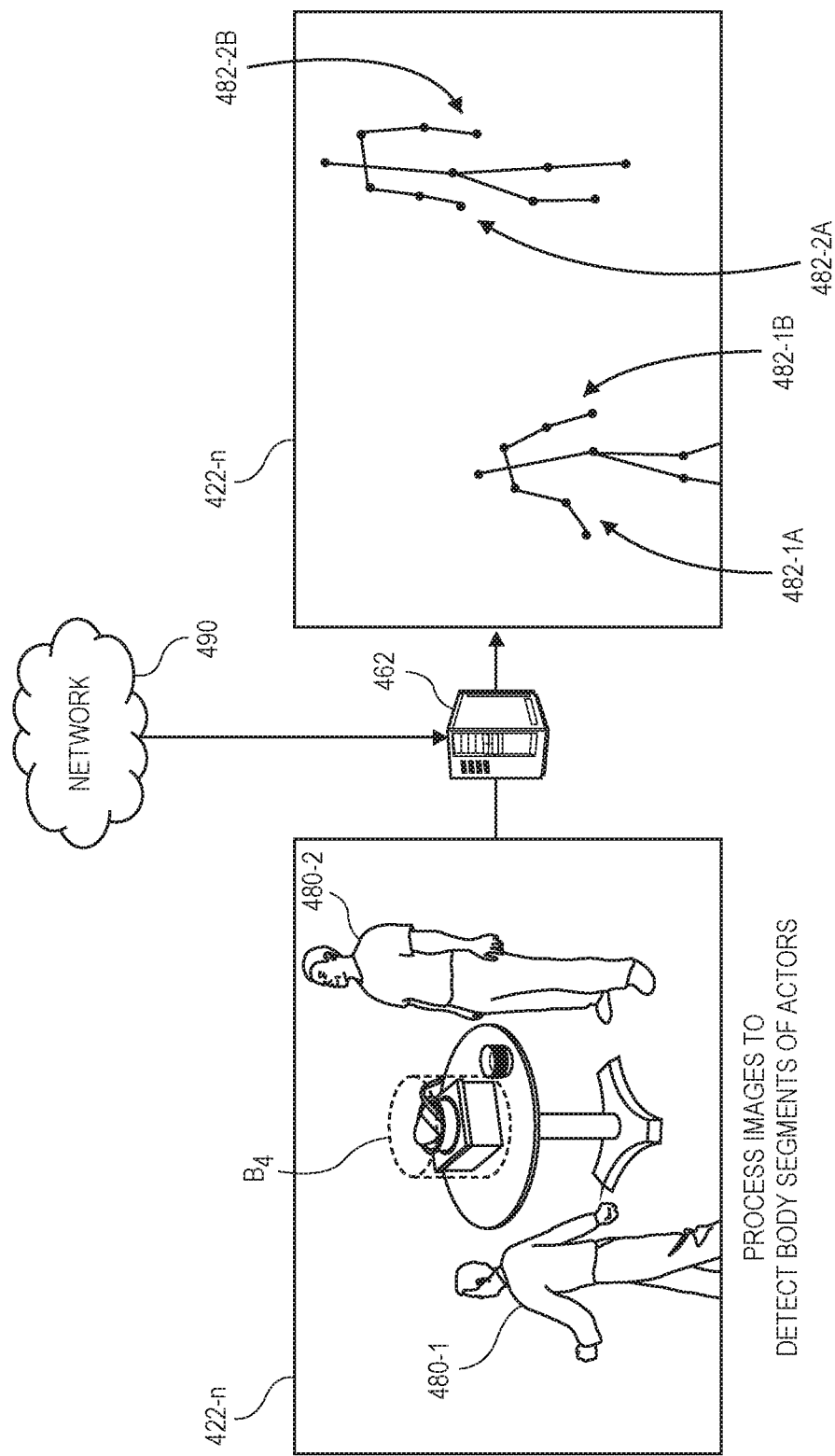

As is shown in FIG. 4B, the images 422-n captured by the imaging devices 420-1, 420-2, 420-3, 420-4 may be provided as inputs to a machine learning tool, system or technique operating on one or more servers 462 that are connected to the network 490, and body parts of the actors 480-1, 480-2 at the materials handling facility 410 may be detected based on outputs received therefrom. For example, as is shown in FIG. 4B, a machine learning tool, system or technique (e.g., a residual neural network), may be trained to detect segments 482-2A, 482-2B of a body of the actor 480-2, who is nearest and facing the bounding box $B_4$ surrounding the kettle 485-1. The machine learning tool, system or technique may also be trained to detect segments 482-1A, 482-1B of a body of the actor 480-1, who is farthest and facing away from the bounding box $B_4$, within the images 422-n. In some implementations, the segments 482-1A, 482-1B, 482-2A, 482-2B may be detected within the images 422-n by the server 462 or another computer device or system that is external to the imaging devices 420-1, 420-2, 420-3, 420-4. In some other implementations, the segments 482-1A, 482-1B, 482-2A, 482-2B may be detected within the images 422-n by the server 462 or by processors operating on the imaging devices 420-1, 420-2, 420-3, 420-4, and provided to the server 462 over the network 490.

Figure 4C:
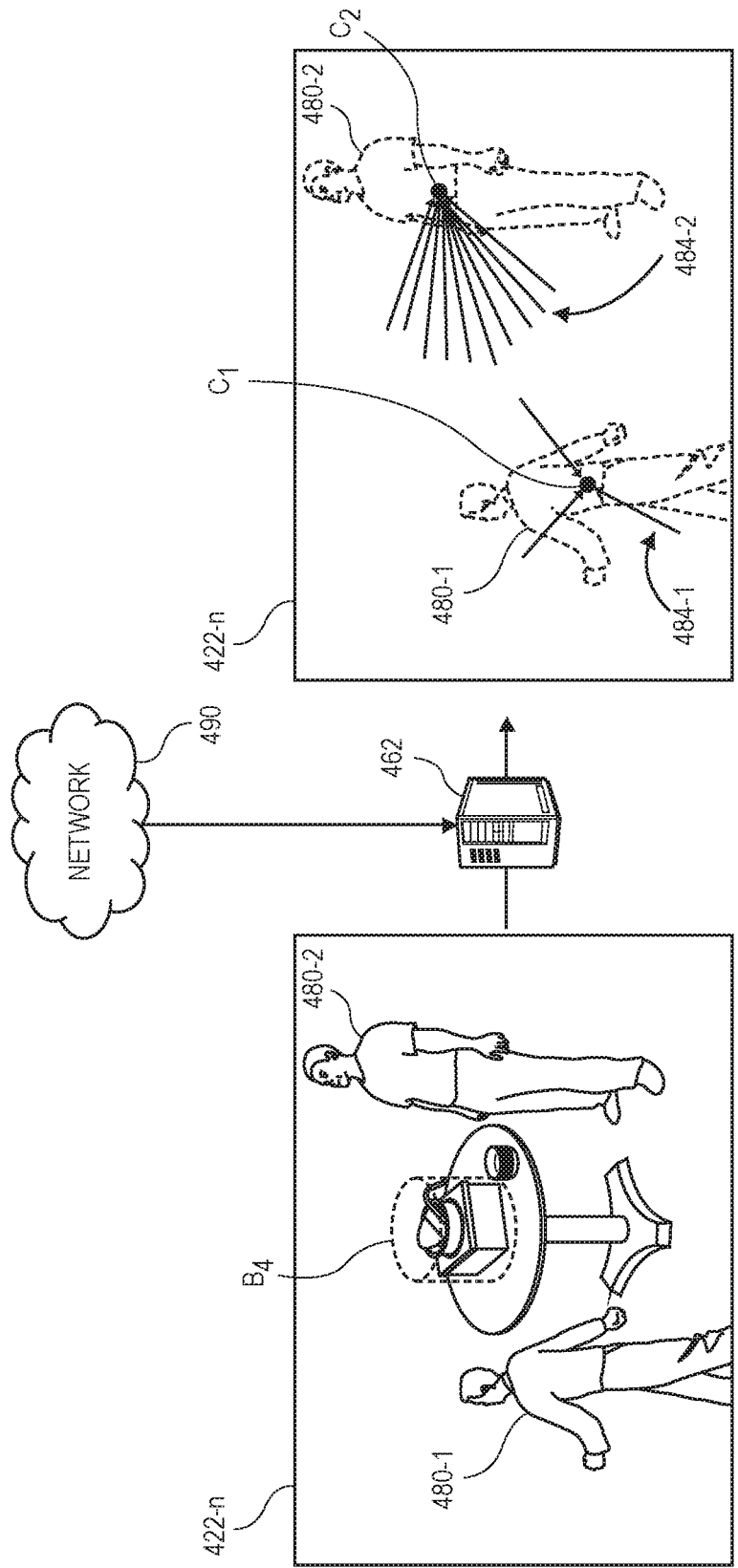

Similarly, images captured using the imaging devices 420-1, 420-2, 420-3, 420-4 may also be processed to generate pairs of pixels extending from locations (e.g., pixels) within such images to detected portions of bodies or body parts of actors within such images based on planogram data. As is shown in FIG. 4C, the images 422-n and/or the planogram data may be provided as inputs to a machine learning tool, system or technique operating on the one or more servers 462, and sets of regression vectors 484-1, 484-2 (or association scores or other values) associating pixels of the images 422-n with pixels of one of the actors 480-1, 480-2 at the materials handling facility 410 may be generated based on outputs received therefrom. For example, as is shown in FIG. 4C, a machine learning tool, system or technique (e.g., a residual neural network) may be trained to generate a plurality of regression vectors or association scores extending between pixels of each of the images 422-n, and pixels of each of the images 422-n corresponding to one of the actors 480-1, 480-2, along with confidence scores or other metrics indicative of a level of confidence in such vectors or association scores.

In some implementations, regression vectors or association scores may include, for each pixel of each of the images 422-n corresponding to surfaces of the storage area 470, a pair of coordinates $(x_j, y_j)$ of one or more other pixels corresponding to respective centroids $C_1$, $C_2$ of the actors 480-1, 480-2, or any other body parts of the actors 480-1, 480-2, within which an event occurring at the pixel is most likely associated. Alternatively, the regression vectors or association scores may be generated by one or more processors or processor units operating on the imaging devices 420-1, 420-2, 420-3, 420-4, and provided to the servers 462 over the network 490.

Figure 4D:
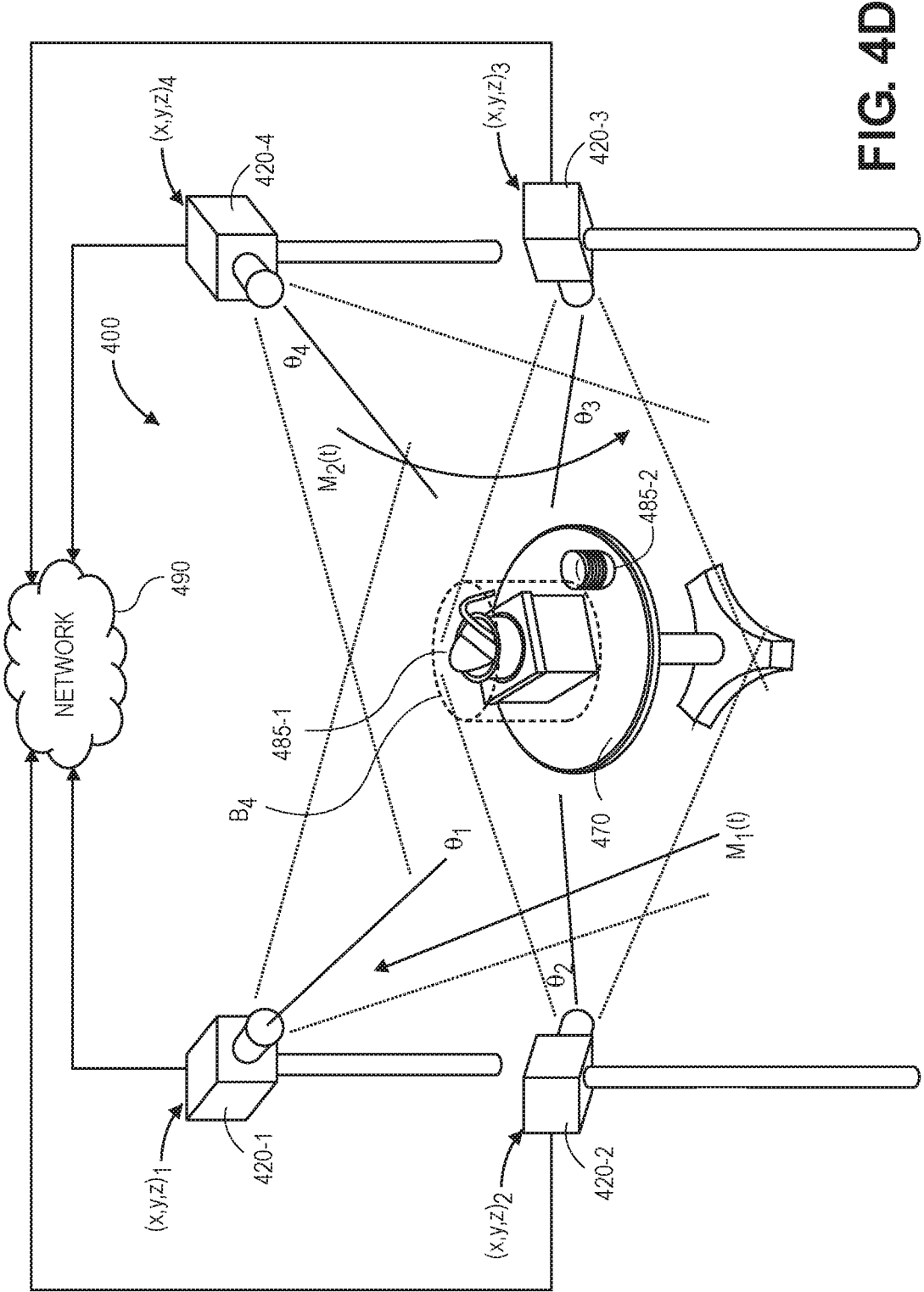

Additionally, trajectories (or tracklets) representative of locations, motion or orientations of actors on the scene, as well as positions or angles of orientation of imaging devices on the scene, may also be determined with respect to the interaction point or product space defined by the bounding box $B_4$. As is shown in FIG. 4D, trajectories $M_1(t)$, $M_2(t)$ that are representative of the locations, the motion and/or the orientations of the actors 480-1, 480-2 may be generated, e.g., by a locating service, based on information or data captured using sensors such as imaging devices, load sensors, RFID components, LIDAR components or others (not shown). For example, the trajectories $M_1(t)$, $M_2(t)$ may be one or more three-dimensional articulated models of partial or complete sets of body parts of the actors 480-1, 480-2, which may be generated as vectors or functions over time and represent motion of body parts embodied by nodes and edges between such nodes, or in any other manner. The positions may be represented in three-dimensional space by coordinates, e.g., (x, y, z), which identify positions of image sensors of the imaging devices 420-1, 420-2, 420-3, 420-4, as well as angles of orientation of their respective image sensors, with respect to one or more axes. In some implementations, the imaging devices 420-1, 420-2, 420-3, 420-4 may be calibrated, such that mappings between coordinates of imaging data captured by the imaging devices 420-1, 420-2, 420-3, 420-4 and directions relative to their respective image sensors are known. Thus, where pixels corresponding to one of the actors 480-1, 480-2 (or any other objects or features) are identified within images captured using one of the imaging devices 420-1, 420-2, 420-3, 420-4, locations corresponding to such pixels may be back-projected into the image planes of the other imaging devices based on the positions and angles of orientation of the respective imaging devices 420-1, 420-2, 420-3, 420-4 to identify pixels corresponding to the one of the actors 480-1, 480-2 or other objects or features.

Images captured using the imaging devices 420-1, 420-2, 420-3, 420-4 may also be processed to determine probabilities that one or more events of interest occurred at locations depicted within the images. For example, as is shown in FIG. 4E, the images 422-n and trajectories $M_1(t)$, $M_2(t)$ of the actors 480-1, 480-2 may be provided as inputs to a machine learning tool, system or technique operating on one or more servers 462, and probabilities that each of the pixels depicts or represents an event of interest at the materials handling facility 410, does not depict or represent any events at the materials handling facility 410, or depicts or represents an event other than the event of interest at the materials handling facility 410, may be determined based on outputs received therefrom.

Figure 4E:
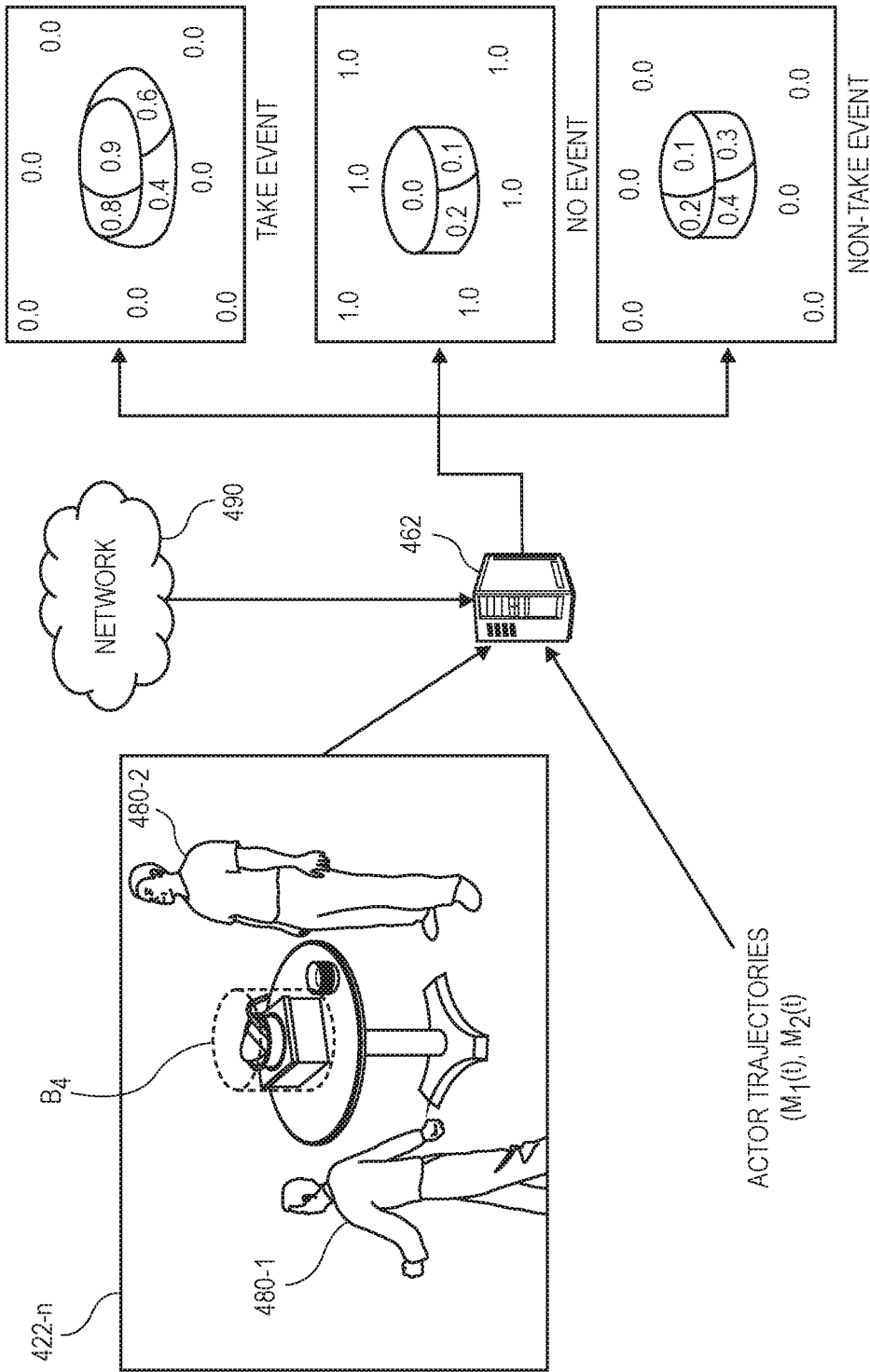

As is shown in FIG. 4E, a machine learning tool, system or technique (e.g., a residual neural network) may be trained to calculate probabilities for each pixel of the respective images 422-n, or for sets of pixels of the respective images 422-n. Such probabilities may include, for each pixel or set of pixels of each of the images 422-n, a value (e.g., between 0 and 1) indicative of a likelihood that the pixel or set of pixels depicts or represents one of the actors 480-1, 480-2 performing one or more aspects of an event of interest, such as a taking or removal of some of the non-discretized items within the kettle 485-1, e.g., by raising a ladle, a spoon or other tool or utensil having some amount or volume of the non-discretized items therein, or a placement of the non-discretized items within one of the bowls 485-2, e.g., by rotating and/or inverting the ladle, the spoon or the other tool or utensil, to deposit the amount or volume of the non-discretized items therein into the one of the bowls 485-2, and a return of the ladle, the spoon or the other tool or utensil to the kettle 485-1.

As is shown in FIG. 4E, probabilities that the event of interest is observed are highest at locations within image planes of the imaging devices 420-1, 420-2, 420-3, 420-4 corresponding to locations on surfaces of the storage unit 470 nearest the actor 480-2, who is closest to the storage unit 470. Such locations are around or near the bounding box $B_4$ defining the interaction point or product space for the kettle 485-1, which may be identified based on any information or data (e.g., planogram data) regarding the storage unit 470. Conversely, such probabilities are lowest at locations that are remote from the storage unit 470, or at locations at or near the storage unit 470 that are farthest from the actor 480-2, or nearest the actor 480-1. Additionally, probabilities that events of interest are observed have positive values at locations that are around or below the storage unit 470.

As is also shown in FIG. 4E, such probabilities may further include, for each pixel or set of pixels of each of the images 422-n, a value indicative of a likelihood that the pixel or pixels do not depict or represent any of the actors 480-1, 480-2 performing any events at the materials handling facility 410. Probabilities that no event has been observed are highest at locations within image planes of the imaging devices 420-1, 420-2, 420-3, 420-4 that are most remote from the storage unit 470, and are lowest at locations corresponding to surfaces of the storage unit 470 around or near the bounding box $B_4$. Probabilities that no events have been observed have positive values at locations that are around or below the storage unit 470.

As is further shown in FIG. 4E, such probabilities may further include, for each pixel or set of pixels of each of the images 422-n, a value indicative of a likelihood that the pixel or pixels depict an event other than the event of interest, e.g., an event other than a taking or removal of some of the non-discretized items from the kettle 485-1. Probabilities that an event other than the event of interest has been observed have positive values at locations within image planes of the imaging devices 420-1, 420-2, 420-3, 420-4 corresponding to locations on surfaces of the storage unit 470, and also at locations that are around or below the storage unit 470.

Thus, for each of the images 422-n captured by the imaging devices 420-1, 420-2, 420-3, 420-4, a probability distribution representing whether an event of interest has occurred at each of the pixels depicted within each of the images 422-n captured at a given time, whether no event has occurred at each of such pixels, or whether an event other than the event of interest has occurred at each of such pixels, may be generated. Alternatively, probabilities may be determined for fewer than all of the pixels of one or more of the images 422-n. In particular, pixels that are associated with locations where interactions are most likely to occur (or not likely to occur) may be identified, e.g., based on planogram data or any other information or data, and associated with body parts depicted within such images. In such implementations, pixels in locations other than those locations where interactions are most likely to occur may be excluded from consideration.

Upon detecting arm segments, generating pairs of pixels (e.g., regression vectors or values), determining probabilities, and identifying trajectories of actors and positions and orientations of imaging devices, periods or intervals of time during which interactions have likely occurred may be determined. For example, information or data regarding the body parts, regression vectors, probabilities, trajectories and positions or orientations may be provided to one or more machine learning tools, systems or techniques as inputs, and periods or intervals of time during which such interactions have occurred may be determined based on outputs received from the machine learning tools, systems or techniques. As is shown in FIG. 4F, intervals or periods of time during which one or more interactions have occurred may be selected for each of the actors 480-1, 480-2 at the materials handling facility 410, and a determination as to which of the actors 480-1, 480-2 is associated with an event of interest may be determined based at least in part on the locations, positions and/or orientations of the actors 480-1, 480-2 during such intervals or periods of time.

The systems and methods of the present disclosure may be programmed or configured to detect any type of event or interaction associated with the dispensation of non-discretized items. Referring to FIGS. 5A through 5D, views of aspects of interactions with non-discretized items that may be detected and associated with actors in accordance with implementations of the present disclosure are shown. Except where otherwise noted, reference numerals preceded by the number "5" shown in FIGS. 5A through 5D indicate components or features that are similar to components or features having reference numerals preceded by the number "4" shown in FIGS. 4A through 4F, by the number "2" shown in FIG. 2, or by the number "1" shown in FIGS. 1A through 1N.

As is shown in FIG. 5A, a hand 580A of an actor executes an interaction with an inventory area 570A (e.g., a traditional beverage fountain) having a plurality of contact levers 585A-1, 585A-2, 585A-3, 585A-4, 585A-5, 585A-6 by extending a container (or vessel) 585A-7 into one of the contact levers 585A-1, 585A-2, 585A-3, 585A-4, 585A-5, 585A-6 or other components, which causes one or more non-discretized items to descend into the container 585A-7. In some implementations, each of the contact levers 585A-1, 585A-2, 585A-3, 585A-4, 585A-5, 585A-6 may be associated with a different non-discretized item, such as beverages or other mixtures of solids, liquids or gases (e.g., syrups, carbonated water). Alternatively, the non-discretized items of FIG. 5A may be any other liquids or solids that may be caused to flow from the inventory area 570A into the container 585A-7.

In accordance with implementations of the present disclosure, imaging data captured using one or more imaging devices (not shown) may be processed to detect arm segments (e.g., the hand 580A of the actor) within such imaging data, including extensions and/or flexions, or any other movements, which interact with a bounding box or region $B_{5A}$, e.g., while causing the flow of the non-discretized items to be initiated. For example, because the distribution of non-discretized items from the inventory area 570A is initiated and ended by contact with the contact levers 585A-1, 585A-2, 585A-3, 585A-4, 585A-5, 585A-6, forward extensions and reverse flexions of the arm connected to the hand 580A into and out from the bounding box or region $B_{5A}$ that are detected within imaging data may be associated with events or interactions with the inventory area 570A, such as the distribution of at least some of the non-discretized items therefrom. Additionally, such imaging data may also be processed to determine pairs of pixels, such as regression vectors or values associating pixels with one or more body parts (e.g., the hand 580A) of the actor, or any other actors on the scene (not shown). Detected events or interactions with the bounding box or region $B_{5A}$ while pressing the container 585A-7 into contact with one or more of the contact levers of the inventory area 570A, including but not limited to the contact levers 585A-1, 585A-2, 585A-3, 585A-4, 585A-5, 585A-6, may be associated with one or more actors or body parts thereof, e.g., the hand 580A, that are present at the materials handling facility 510A.

A duration of an event or interaction may be determined based at least in part on the imaging data, which may depict not only contact with one or more of the contact levers 585A-1, 585A-2, 585A-3, 585A-4, 585A-5, 585A-6 over a period of time but also an initiation of such contact, or an end to such contact. In some implementations, an amount or volume of the non-discretized items dispensed into the container 585A-7 may be determined based on entry into the bounding box or region $B_{5A}$ alone, e.g., where the amount or volume is assumed to be nominal. Alternatively, an amount or volume of the non-discretized items dispensed into the container 585A-7 may be determined based at least in part on a duration that the hand 585A-7 is within the bounding box or region $B_{5A}$ e.g., the period of time, where information or data regarding flow capacities associated with the respective contact levers 585A-1, 585A-2, 585A-3, 585A-4, 585A-5, 585A-6, is known. Alternatively, where the container 585A-7 is recognized within the imaging data, an amount or volume of the non-discretized items dispensed into the container 585A-7 may be determined based at least in part on properties of the container 585A-7 that may be determined from the imaging data, including but not limited to sizes, shapes or other factors.

Figure 5B:
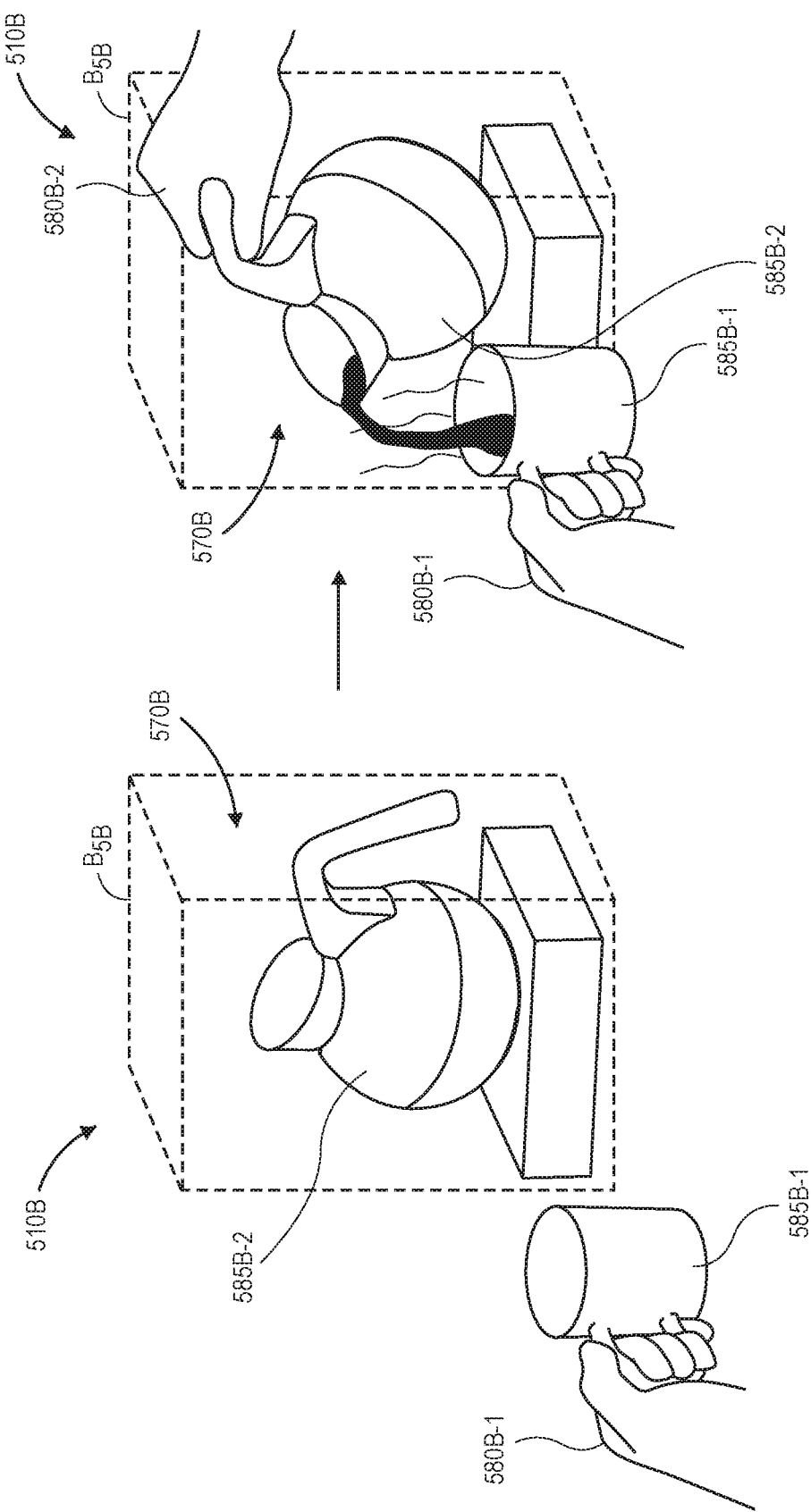

Similarly, as is shown in FIG. 5B, an actor holds a mug 585B-1 within a left hand 580B-1 while executing one or more interactions with an inventory area 570B defined with respect to a coffee carafe 585B-2 resting on a warming plate by a right hand 580B-2. The actor extends the right hand 580B-2 into a bounding box or region $B_{5B}$ to retrieve the coffee carafe 585B-2, and to rotate the coffee carafe 585-2 about an axis defined by the radius and the ulna bones of his or her right forearm to tip liquid into the mug 585B-1, and to dispense a flow of coffee into the mug 585B-1. After a desired amount or volume of coffee has been poured into the mug 585B-1, the actor may reverse the rotation of the coffee carafe 585B-2 about the axis defined by the radius and the ulna bones of his or her right forearm, before lowering the coffee carafe 585B-2 onto the warming plate within the bounding box or region $B_{5B}$.

In accordance with implementations of the present disclosure, imaging data captured using one or more imaging devices (not shown) may be processed to detect body parts (e.g., the hands 580B-1, 580B-2 of the actor) within such imaging data, and to determine whether such body parts are executing one or more interactions with the inventory area 570B, by moving into and out from the bounding box or region $B_{5B}$. For example, because the distribution of non-discretized items from the inventory area 570B is initiated by rotating the coffee carafe 585B-2, to pour coffee into the mug 585B-1 by the hand 580B-2 within the bounding box or region $B_{5B}$ and ended by reversing the rotation of the coffee carafe 585B-2, interactions with the bounding box or region $B_{5B}$ by the actor may be associated with events or interactions with the inventory area 570B, and, therefore, the distribution of at least some of the non-discretized items therefrom. Additionally, such imaging data may also be processed to determine regression vectors or values associating pixels with one or more body parts (e.g., the hands 580B-1, 580B-2) of the actor, or any other actors on the scene (not shown), such that detected events or interactions with the bounding box or region $B_{5B}$ may be associated with one or more actors or body parts thereof that are present at the materials handling facility 510B. An amount or volume of the non-discretized items dispensed into the mug 585B-1 may be determined based at least in part on any factor, including but not limited to a duration of the interaction, e.g., a duration for which the coffee carafe 585B-2 is rotated, or a size or shape of the mug 585B-1.

Figure 5C:
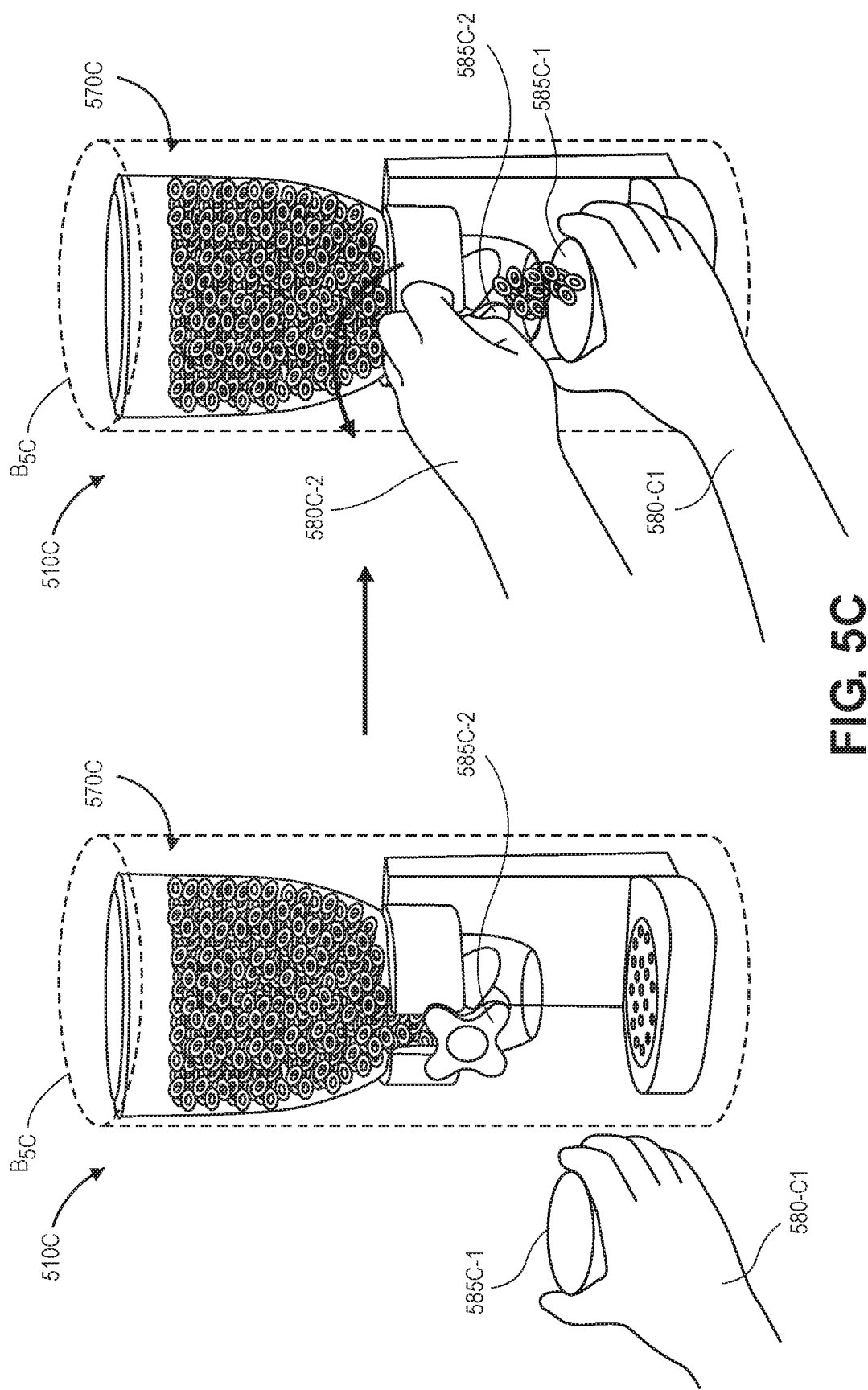

Likewise, as is shown in FIG. 5C, an actor executes one or more interactions with an inventory area 570C (e.g., a dry cereal dispenser) by maintaining a hand 580C-1 within a bounding box or region $B_{5C}$ while holding a bowl 585C-1 within the inventory area 570C (e.g., below a spout of the dry cereal dispenser) and activating a flow of non-discretized items from the inventory area 570C by rotating a valve 585C-2 with a hand 580C-2 within the bounding box or region $B_{5C}$.

In accordance with implementations of the present disclosure, imaging data captured using one or more imaging devices (not shown) may be processed to detect body parts (e.g., the hands 580C-1, 580C-2 of the actor) within such imaging data, and to determine whether such body parts are executing one or more interactions with the inventory area 570C, by moving into and out from the bounding box or region $B_{5C}$. For example, because the distribution of non-discretized items from the inventory area 570C is initiated and ended by operations of the valve 585C-2, an extension of the bowl 585C-1 by the hand 580C-1 into the bounding box or region $B_{5C}$ or an extension of the hand 580C-2 into the bounding box or region $B_{5C}$ to rotate the valve 585C-2 may be associated with events or interactions with the inventory area 570C, and, therefore, distribution of at least some of the non-discretized items therefrom. Additionally, such imaging data may also be processed to determine regression vectors or values associating pixels with one or more body parts (e.g., the hands 580C-1, 580C-2) of the actor, or any other actors on the scene (not shown), such that detected events or interactions with the valve 585C-2 of the inventory area 570C may be associated with one or more actors or body parts thereof that are present at the materials handling facility 510C. An amount or volume of the non-discretized items dispensed into the bowl 585C-1 may be determined based at least in part on any factor, including but not limited to a duration for which the valve 585C-2 is rotated, or a size or shape of the bowl 585C-1.

Figure 5D:
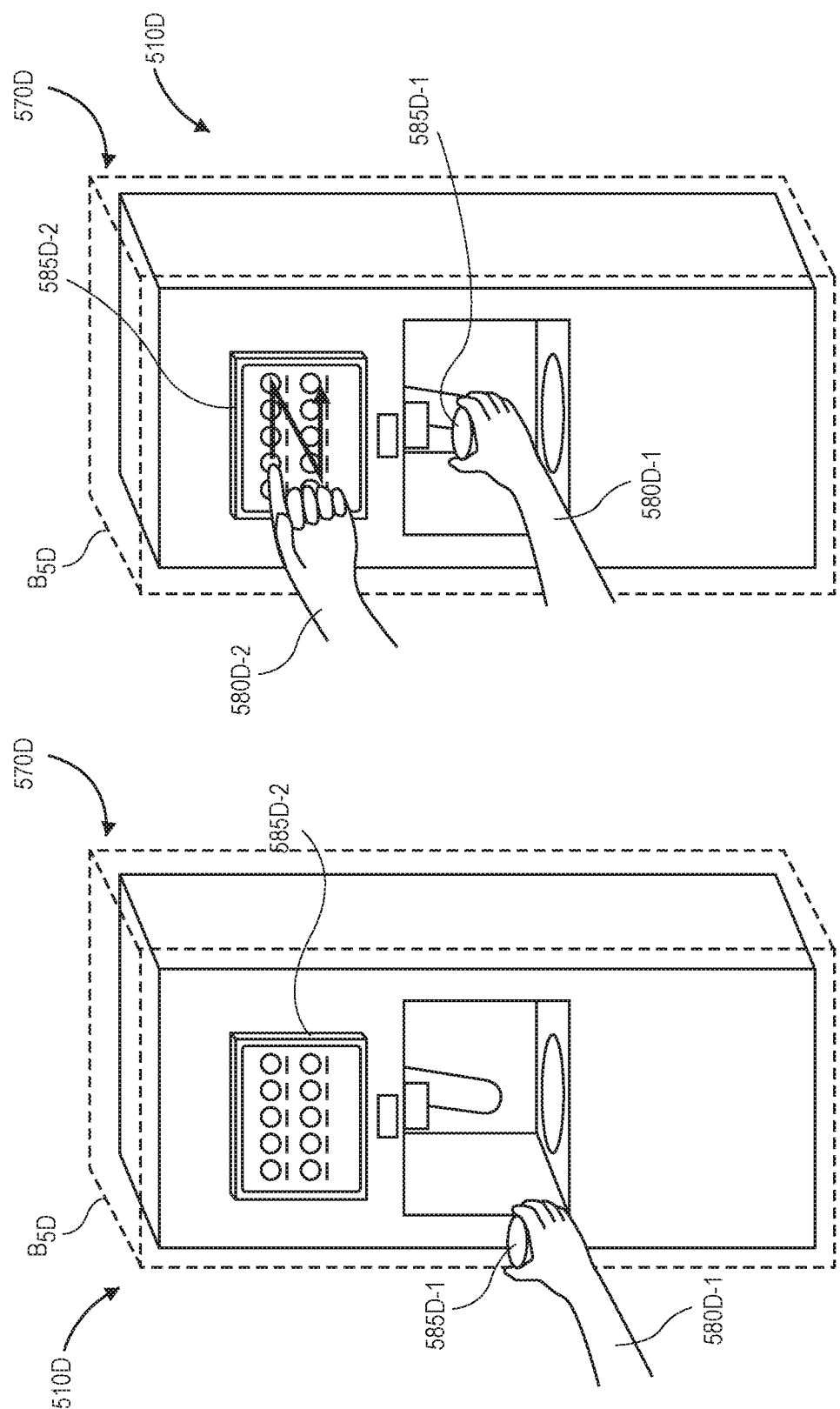

As is shown in FIG. 5D, an actor extends a right hand 580D-1 into a bounding box or region $B_{5D}$ of an inventory area 570D (e.g., an automated beverage fountain) to place a container (or vessel) 585D-1 below a spout of the inventory area 570D. As is also shown in FIG. 5D, the actor extends a left hand 580D-2 into the bounding box or region $B_{5D}$ to execute one or more interactions with a touchscreen 585D-2 on the inventory area 570D, thereby causing one or more non-discretized items to descend into the container 585D-1. In accordance with implementations of the present disclosure, imaging data captured using one or more imaging devices (not shown) may be processed to detect body parts (e.g., the hands 580D-1, 580D-2 of the actor) within such imaging data, and to determine whether such body parts are executing one or more interactions with the inventory area 570D, by moving into and out from the bounding box or region $B_{5D}$. For example, because the distribution of non-discretized items from the inventory area 570D is initiated or ended by contact with the touchscreen 585D-2, which thereby opens one or more valves or otherwise initiates flow of the non-discretized items, an extension of the container 585D-1 by the hand 580D-1 into the bounding box or region $B_{5D}$ followed by contact with the touchscreen 585D-2 by the hand 580D-2 within the bounding box or region $B_{5D}$ may be associated with events or interactions with the inventory area 570D, and, therefore, distribution of at least some of the non-discretized items therefrom. Additionally, such imaging data may also be processed to determine regression vectors or values associating pixels with one or more body parts (e.g., the hands 580D-1, 580D-2) of the actor, or any other actors on the scene (not shown), such that detected events or interactions with the bounding box or region $B_{5D}$ may be associated with one or more actors or body parts thereof that are present at the materials handling facility 510D. An amount or volume of the non-discretized items dispensed into the container 585D-2 may be determined based at least in part on any factor, including but not limited to a size or shape of the container 585D-1, a location from which the container 585D-1 was obtained, or a combination of interactions with the touchscreen 585D-2.

Figure 6:
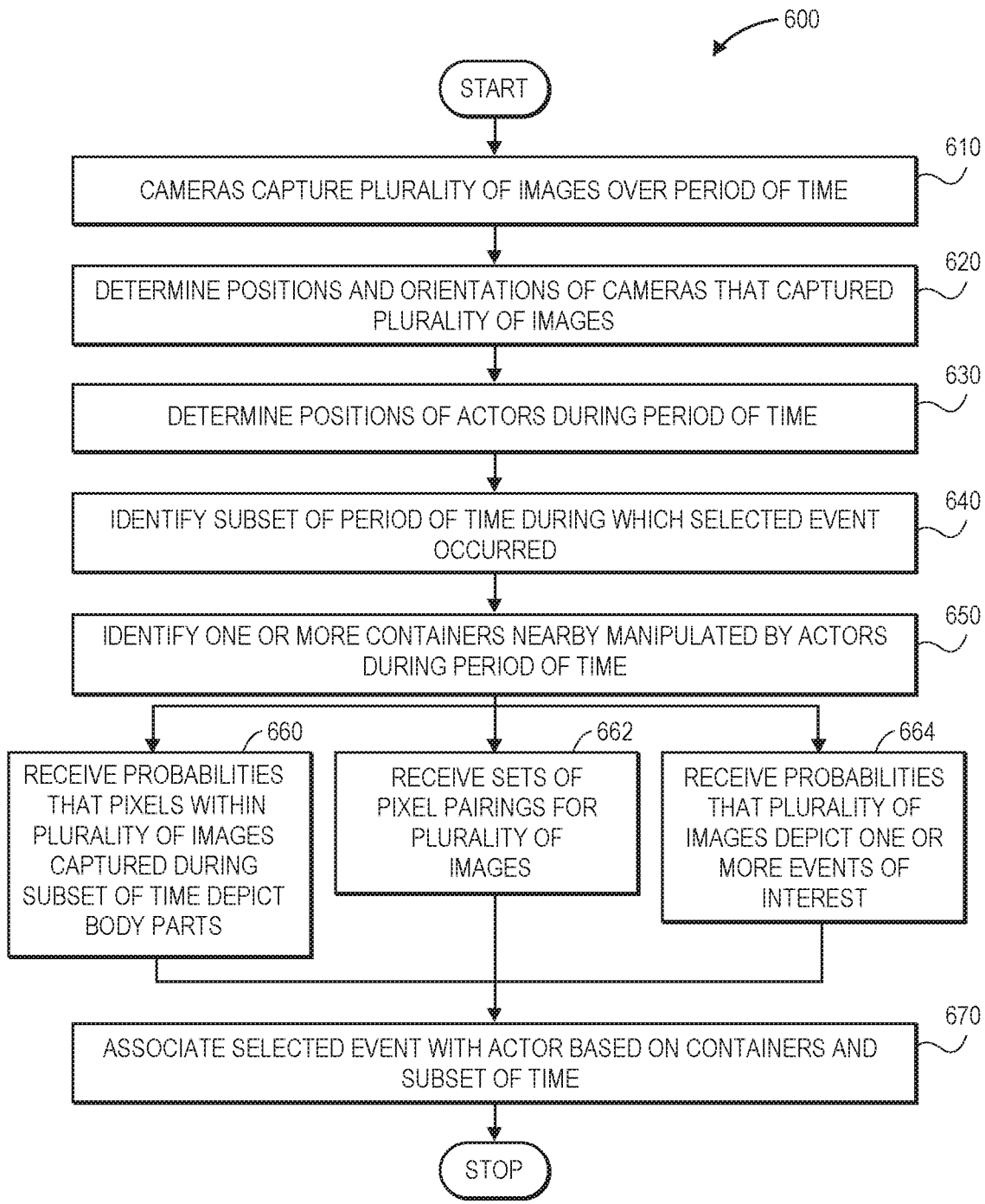
FIG. 6 is a flow chart of one process for detecting interactions with non-discretized items and associating interactions with actors in accordance with implementations of the present disclosure.

Referring to FIG. 6, a flow chart 600 of one process for detecting interactions with non-discretized items and associating interactions with actors in accordance with implementations of the present disclosure is shown. At box 610, cameras capture a plurality of images over a period of time. The cameras may be disposed in any locations and aligned at any orientations on a scene. In some implementations, the cameras may be calibrated, such that mappings between coordinates of imaging data captured by the cameras and directions relative to their respective image sensors are known. At box 620, positions and orientations of the cameras that captured the images are determined. For example, such positions may be represented in three-dimensional space by coordinates, e.g., (x, y, z), which identify positions of image sensors of such cameras, as well as angles of orientation of their respective image sensors, which may be defined with respect to one or more axes.

At box 630, positions of a plurality of actors on the scene during the period of time are determined. For example, a locating service may detect one or more actors within a materials handling facility using one or more sensors (e.g., imaging devices, load sensors, RFID components, LIDAR components), and generate one or more trajectories (or tracklets) representative of the motion, the locations and/or the orientations of each of the actors within the materials handling facility, such as one or more three-dimensional articulated models of partial or complete sets of body parts of the actors within the materials handling facility, based on information or data gathered by such sensors. In some implementations, the trajectories, tracklets and/or models may be generated as vectors or functions over time that represent motion of body parts embodied by nodes and edges between such nodes, or in any other manner.

At box 640, a selected event is determined to have occurred during a subset of the period of time. The occurrence of the selected event, such as an event of interest in which an amount or volume of a non-discretized item is retrieved by or dispensed to an actor, may be determined based on any information or data regarding the actors on the scene. For example, a change in state of one or more interaction points or product spaces on the scene may be determined based on a proximity of one or more of the actors to such interaction points or product spaces, which may be calculated based on the trajectories of the actors determined at box 630, or based on any other information or data obtained from any source. Alternatively, the selected event determined to have occurred during the subset of the period of time may be no event at all or may be an event other than an event of interest.

At box 650, one or more nearby containers are identified as having been manipulated by at least one actor. The containers may be associated with the one or more interaction points or product spaces on the scene, and may be systems having one or more components for storing non-discretized liquids such as beverages (e.g., coffee), toppings, sauces, soups, dressings, or the like, or for accommodating non-discretized solids (e.g., powders such as cocoa or flour, grains, beans, candy or the like) in a similar manner. For example, such containers may be vessels having nominal sizes such as "small," "medium" or "large," volumetric sizes such as "one cup," "12 ounces," "one pint," or "half-gallon," or one or more common or standard sizes. In some implementations, the containers may be configured to supply heat to such non-discretized items, or to maintain the non-discretized items at one or more selected temperature levels. Alternatively, in some implementations, the containers may be bags, sacks, papers or other devices for transporting one or more items.

Additionally, in some implementations, the containers of the non-discretized items that may have been manipulated may be associated with individually accessible containers into which such non-discretized items may be deposited. In some implementations, such as the materials handling facility 110 of FIGS. 1A through 1N, the containers may be located in an associated interaction point or product space, e.g., the interaction point or product space defined by the bounding box $B_{1-1}$, and interactions involving such containers may be independently determined. Alternatively, in some other implementations, such as the materials handling facility 410 of FIGS. 4A through 4F, such containers may be provided in association with a single interaction point or product space for the non-discretized items, e.g., the interaction point or product space defined by the bounding box $B_4$, and interactions with such containers need not be tracked with respect to a separate or distinct interaction point or product space.

At box 660, a plurality of probabilities that pixels within the plurality of images captured over the subset of the period of time depict or represent body parts are received. For example, each of the plurality of images may have been provided to a machine learning tool, system or technique (e.g., a convolutional neural network) that is trained to detect hands, wrists, forearms, elbows, upper arms and/or shoulders or other body parts within imaging data, and the probabilities may be calculated based at least in part on outputs received from the machine learning tool, system or technique. Alternatively, a probability that a given pixel depicts or represents one or more body parts may be calculated in any other manner.

In parallel, at box 662, a set of regression vectors (or association scores or other values) is received for each of the plurality of images. For example, the regression vectors may associate pixels of the plurality of images with pixels depicting or representing one of the actors therein. In some implementations, the regression vectors may be generated based on outputs received from a machine learning tool, system or technique, such as a convolutional neural network, a deep learning neural network, or other tool, system or technique that includes one or more output layers for predicting regressions from each pixel of an image received as an input, or for determining a confidence score associated with such predictions. In some implementations, for each pixel of the image, regressions may take the form of a coordinate pair, e.g., an (x, y) pair identifying a pixel associated with a body part of an actor within an image plane of the image.

At box 664, probabilities that pixels of the plurality of images depict or represent one or more events of interest are determined. In some implementations, the probabilities that the pixels of the plurality of images depict or represent one or more events of interest may be accompanied by probabilities that such pixels do not depict or represent any events, or depict or represent events other than the events of interest, e.g., in a probability distribution of all of such probabilities.

At box 670, the selected event is associated with an actor based at least in part on the container and the subset of the period of time identified at box 640, and the process ends. For example, upon detecting that a selected event likely occurred over the subset of the period of time at box 640, the respective predictions of events of interest and associations of such events with actors determined from imaging data captured over the subset of the period of time, may be merged together to determine the event of interest that has occurred, and to associate the most likely actor with that event of interest. For example, an event-customer association score may be calculated based on probabilities of pairs of regions of images corresponding to events and body parts of customers, and also on regression vectors or association scores pointing from or associating pixels of images corresponding to events of interest with pixels of images corresponding to actors.

Although some of the implementations disclosed herein reference the detection of events or interactions with non-discretized items such as beverages, soups or other liquids, or the association of human actors with events or interactions, or items associated with such events or interactions, the systems and methods of the present disclosure are not so limited. For example, the systems and methods disclosed herein may be used to associate any non-human animals, as well as any number of machines or robots, with events, interactions or items of one or more types. The systems and methods disclosed herein are not limited to recognizing and detecting humans, or to associating humans with events or items of one or more types. Furthermore, although some of the implementations disclosed herein reference associating actors with interactions with specific items or items of a specific type in a commercial setting, e.g., within a materials handling facility such as a fulfillment center, the systems and methods of the present disclosure are likewise not so limited. Rather, the systems and methods disclosed herein may be utilized to associate actors with events occurring within any type of commercial or non-commercial settings.

Furthermore, although some of the implementations disclosed herein describe events involving the retrieval (e.g., picking) of non-discretized items of one or more types from a storage unit or other location at a materials handling facility, the systems and methods disclosed herein are not so limited, and may be utilized to associate events involving the depositing (e.g., stowing) of items of one or more types at a storage unit or other location in accordance with the present disclosure. For example, where an event is identified as having occurred at a location, imaging data captured by one or more cameras prior to, during and after the event may be identified and processed to associate pixels of such imaging data with body parts of actors at or near the location at a time of the event based on such imaging data. Trajectories or tracklets of such actors may be generated and used to determine which of such actors may have deposited an item of a given type at the location, in a manner that is similar but reciprocal to one or more of the processes discussed above.

Additionally, although some of the implementations described herein or shown in the accompanying figures refer to the processing of imaging data that is in color, e.g., according to an RGB color model, the systems and methods disclosed herein are not so limited, and may be used to process any type of information or data that is provided in color according to any color model, or in black-and-white or grayscale.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Additionally, it should also be appreciated that the detailed description is set forth with reference to the accompanying figures. In the figures, the use of the same reference numbers in different figures indicates similar or identical items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Moreover, with respect to the one or more methods or processes of the present disclosure shown or described herein, including but not limited to the flow charts shown in FIG. 3 or 6, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A system comprising:
    a first digital camera having a first field of view;
    a second digital camera having a second field of view;
    a storage unit comprising a shelf, wherein at least a portion of the shelf is within each of the first field of view and the second field of view;
    a first container of non-discretized items disposed on the portion of the shelf; and
    a server in communication with the first digital camera and the second digital camera, wherein the server comprises at least one processor configured to at least:
        receive a first plurality of images from the first digital camera, wherein each of the first plurality of images was captured during a period of time;
        receive a second plurality of images from the second digital camera, wherein each of the second plurality of images was captured during the period of time;
        provide at least some of the first plurality of images and at least some of the second plurality of images to a first machine learning tool as inputs, wherein the first machine learning tool is trained to detect at least a portion of an arm within imaging data;
        receive at least a first output from the first machine learning tool;
        determine a first position of at least a portion of a first arm of a first actor based at least in part on the first output;
        determine a second position of at least a portion of a second arm of a second actor based at least in part on the first output;
        generate a first plurality of regression vectors for at least some of the first plurality of images based at least in part on the first output, wherein each of the regression vectors associates at least one pixel of one of the first plurality of images corresponding to the portion of the shelf with at least one pixel of the one of the first plurality of images corresponding to one of the first actor or the second actor;
        generate a second plurality of regression vectors for at least some of the second plurality of images based at least in part on the first output, wherein each of the regression vectors associates at least one pixel of one of the second plurality of images corresponding to the portion of the shelf with at least one pixel of the one of the second plurality of images corresponding to one of the first actor or the second actor;
        determine, for each of the first plurality of images, a first plurality of probabilities that each of the pixels of one of the first plurality of images represents at least one interaction with a first product space on the portion of the shelf corresponding to the first container based at least in part on the first output;
        determine, for each of the second plurality of images, a second plurality of probabilities that each of the pixels of one of the second plurality of images represents the at least one interaction with the first product space based at least in part on the first output;
        provide at least the first position, the second position, the first plurality of regression vectors, the second plurality of regression vectors, the first plurality of probabilities or the second plurality of probabilities to a second machine learning tool as inputs;
        receive at least a second output from the second machine learning tool; and
        in response to receiving at least the second output,
            identify a subset of the period of time during which the at least one interaction with the first product space occurred based at least in part on the second output; and
            determine that one of the first actor or the second actor is associated with the at least one interaction with the first product space based at least in part on the second output.

2. The system of claim 1, wherein the each of the first plurality of probabilities is one of:
   a probability that a pixel represents an event of interest involving the first product space;
   a probability that the pixel does not represent any event involving the first product space; or
   a probability that the pixel represents an event other than the event of interest involving the first product space.

3. The system of claim 2, further comprising at least one sensor in communication with the server,
   wherein the portion of the shelf is within an operating range of the at least one sensor, and
   wherein the at least one processor is further configured to at least:
      capture data by at least one sensor; and
      determine trajectories of each of a plurality of actors based at least in part on the data captured by the at least one sensor, wherein the plurality of actors comprises the first actor and the second actor, and
   wherein that the first actor executed the at least one interaction during the subset of the period of time is determined based at least in part on a distance between the first product space and at a first trajectory of the first actor.

4. The system of claim 1, wherein the non-discretized item is a beverage.

5. A method comprising:
   capturing, by a first imaging device, a first plurality of images during at least a first period of time, wherein the first imaging device has a first field of view that includes at least a portion of a first inventory area having a first container with a non-discretized item disposed therein and at least a first actor;
   detecting, by at least a first processor unit, at least a first portion of a first body of the first actor within at least some of the first plurality of images;
   generating, by at least the first processor unit, a first plurality of pairs of pixels, wherein each of the first plurality of pairs of pixels associates at least one pixel of one of the first plurality of images corresponding to the first portion of the first body with at least one pixel of the one of the first plurality of images corresponding to the portion of the first inventory area;
   determining a first plurality of probabilities for each of the first plurality of images, wherein each of the first plurality of probabilities is calculated for at least one pixel of each of the first plurality of images, and wherein each of the first plurality of probabilities is one of a probability that the at least one pixel represents an event of interest involving at least one of the first container or the non-discretized item, a probability that the at least one pixel does not represent any events, or a probability that the at least one pixel represents an event other than the event of interest;
   determining a first trajectory for the first actor during at least a portion of the first period of time;
   determining that the first actor executed the event of interest during a second period of time based at least in part on the first portion of the first body, the first plurality of pairs of pixels, at least the first trajectory and the first plurality of probabilities, wherein the second period of time is a subset of the first period of time; and
   storing an indication that the event of interest is associated with the first actor in at least one data store.

6. The method of claim 5, further comprising:
   capturing, by a second imaging device, a second plurality of images during at least the first period of time, wherein the second imaging device has a second field of view that includes at least the portion of the scene;
   detecting, by at least the first processor unit, at least the first portion of the first body of the first actor within at least some of the second plurality of images; and
   generating, by at least the first processor unit, a second plurality of pairs of pixels, wherein each of the second plurality of pairs of pixels associates at least one pixel of the one of the second plurality of images corresponding to the first portion of the first body with at least one pixel of the one of the second plurality of images corresponding to the portion of the first inventory area; and
   determining a second plurality of probabilities for each of the second plurality of images, wherein each of the second plurality of probabilities is calculated for at least one pixel of each of the second plurality of images, and wherein each of the second plurality of probabilities is one of a probability that the at least one pixel represents an event of interest involving at least one of the first container or the non-discretized item, a probability that the at least one pixel does not represent any events, or a probability that the at least one pixel represents an event other than the event of interest,
   wherein that the first actor executed the event of interest during the second period of time is determined based at least in part on the second plurality of pairs of pixels and the second plurality of probabilities.

7. The method of claim 5, wherein detecting at least the first portion of the first body of the first actor comprises:
   detecting portions of bodies within at least some of the first plurality of images, wherein each of the portions of bodies corresponds to one of the plurality of actors,
   wherein the first portion of the first body is one of the portions of bodies, and
   wherein that the first actor executed the event of interest during a second period of time based at least in part on the portions of the bodies.

8. The method of claim 5, further comprising:
   receiving information regarding at least one surface of the first inventory area; and
   defining a product space for the first container based at least in part on the information regarding at least one surface of the first inventory area, wherein the product space includes a location of the first container on the at least one surface of the first inventory area,
   wherein that the first actor executed the event of interest during the second period of time is determined based at least in part on a distance between the product space and at least a portion of the first trajectory.

9. The method of claim 8, wherein determining at least the first trajectory of the first actor during at least the portion of the first period of time comprises:
   capturing data by at least one sensor including the first inventory area within an operating range; and
   determining trajectories of each of a plurality of actors based at least in part on the data captured by the at least one sensor, wherein the first trajectory is one of the trajectories, and
   wherein that the first actor executed the event of interest during the second period of time is determined based at least in part on distances between the product space and at least a portion of each of the trajectories.

10. The method of claim 5, wherein the event of interest comprises at least one of:
grasping the first container by at least the first portion of the first body;
raising the first container by at least the first portion of the first body;
rotating the first container by at least the first portion of the first body, wherein the first container is rotated about an axis defined by at least the first portion of the first body;
lowering the first container by at least the first portion of the first body;
operating a valve associated with the first container by at least the first portion of the first body; or
causing at least some of the amount of the non-discretized item to be transferred from the first container to a second container by at least the first portion of the first body.

11. The method of claim 10, wherein the first container comprises one of a carafe or a kettle, and
wherein the second container is one of a cup, a bowl, a plate or a dish.

12. The method of claim 10, further comprising:
identifying a product space associated with the second container having at least one attribute;
determining, based at least in part on at least one of the first plurality of images, that the first actor executed at least one interaction with the product space associated with the second container;
in response to determining that the first actor executed the at least one interaction with the product space associated with the second container,
determining an amount of the non-discretized item associated with the event of interest based at least in part on the at least one attribute of the second container,
wherein the indication that the first actor executed the event of interest during the second period of time identifies the amount of the non-discretized item.

13. The method of claim 5, wherein the non-discretized item is one of:
a beverage;
a topping;
a sauce;
a soup;
a powder;
a grain; or
a bean.

14. The method of claim 5, wherein each of the first plurality of pixels is a regression vector pointing from the at least one pixel of one of the first plurality of images corresponding to the first portion of the first body to at least one pixel of one of the first plurality of images corresponding to the portion of the first inventory area.

15. The method of claim 5, further comprising:
providing the first plurality of images to a machine learning tool as inputs, wherein the machine learning tool is trained to at least:
detect at least one portion of a body within an image; and
associate at least one pixel of the image representing the at least one portion of the body with at least one pixel representing at least a portion of an inventory area; and
receiving at least one output from the machine learning tool,
wherein the first portion of the first body is detected within the at least some of the plurality of images based at least in part on the at least one output, and
wherein the first plurality of pairs of pixels are generated based at least in part on the at least one output.

16. The method of claim 5, wherein the first processor unit is one of:
a component of the first imaging device; or
a component of a server in communication with the first imaging device.

17. A method comprising:
capturing a first plurality of images by a first imaging device having a first field of view, wherein each of the first plurality of images was captured during a period of time, wherein at least one of a shelf or a table is within the first field of view, and wherein a first container comprising a volume of a substance comprising a liquid is in a location on the at least one of the shelf or the table;
capturing a second plurality of images by a second imaging device having a second field of view, wherein each of the second plurality of images was captured during the period of time, wherein the second field of view overlaps the first field of view at least in part, and wherein the at least one of the shelf or the table is within the second field of view;
detecting at least a portion of a first body of a first actor within at least one of the first plurality of images or at least one of the second plurality of images;
detecting at least a portion of a second body of a second actor within at least one of the first plurality of images or at least one of the second plurality of images;
generating regression vectors for each of the first plurality of images and each of the second plurality of images, wherein each of the regression vectors associates a pixel of one of the first plurality of images or the second plurality of images with one of a plurality of actors, wherein the plurality of actors comprises the first actor and the second actor;
determining, for each of the first plurality of images and each of the second plurality of images, probabilities that pixels of at least one of the first plurality of images or the second plurality of images represent at least one interaction with a product space including the location on the at least one of the shelf or the table;
determining, based at least in part on the first body, the second body, the regression vectors and the probabilities, that the first actor executed the at least one interaction with the product space within an interval of the period of time; and
storing an indication that the first actor deposited at least some of the volume of the substance into a second container within the interval of the period of time.

18. The method of claim 17, further comprising:
providing the at least some of the first plurality of images or the second plurality of images to a machine learning tool as inputs, wherein the machine learning tool is trained to at least:
detect at least one portion of a body within an image;
associate at least one pixel of the image with at least one other pixel representing at least a portion of the body; and
calculate a probability that at least one pixel of the image represents an interaction with the product space; and
receiving at least one output from the machine learning tool, wherein the portion of the first body and the portion of the second body are detected within the at least some of the first plurality of images or the second plurality of images based at least in part on the at least one output, and wherein the regression vectors are generated based at least in part on the at least one output.

19. The method of claim 17, further comprising:
determining at least a first trajectory of the first actor over the period of time; and
determining at least a second trajectory of the second actor over the period of time,
wherein that the first actor executed the at least one interaction with the product space occurred within the interval of the period of time is determined based at least in part on a first distance between a product space associated with the first container and the first trajectory and a second distance between the product space and the second trajectory.

20. The method of claim 17, wherein each of the probabilities is one of:
a probability that a pixel represents an event comprising depositing the at least some of the volume of the substance from the first container into the second container;
a probability that the pixel does not represent any event associated with the first container; or
a probability that the pixel represents an event other than depositing the at least some of the volume of the substance from the first container into the second container.

21. A system comprising:
a digital camera having a field of view;
a storage unit comprising a shelf, wherein at least a portion of the shelf is within the field of view;
a container of non-discretized items disposed on the portion of the shelf; and
a server in communication with at least the digital camera, wherein the server comprises at least one processor configured to at least:
receive a plurality of images from the digital camera, wherein each of the plurality of images was captured during a period of time;
provide at least some of the plurality of images to a first machine learning tool as first inputs, wherein the first machine learning tool is trained to detect at least a portion of an arm within imaging data;
receive at least a first output from the first machine learning tool;
determine a first position of at least a portion of a first arm of a first actor based at least in part on the first output;
generate a plurality of regression vectors for at least some of the plurality of images based at least in part on the first output, wherein each of the regression vectors associates at least one pixel of one of the plurality of images corresponding to the portion of the shelf with at least one pixel of the one of the plurality of images corresponding to at least a portion of the first actor;
determine, for each of the plurality of images, a plurality of probabilities that each of the pixels of one of the plurality of images represents at least one interaction with a first product space on the portion of the shelf corresponding to the container based at least in part on the first output;
provide at least the first position, the plurality of regression vectors, or the plurality of probabilities to a second machine learning tool as second inputs;
receive at least a second output from the second machine learning tool; and
in response to receiving at least the second output,
identify a subset of the period of time during which the at least one interaction with the first product space occurred based at least in part on the second output; and
determine that the first actor is associated with the at least one interaction with the first product space based at least in part on the second output.

22. A method comprising:
capturing, by an imaging device, a plurality of images during at least a first period of time, wherein the imaging device has a field of view that includes at least a portion of an inventory area having a container with a substance disposed therein and an actor;
detecting, by at least one processor, at least a portion of the actor within at least some of the plurality of images;
generating, by the at least one processor unit, a plurality of pairs of pixels, wherein each of the plurality of pairs of pixels includes at least one pixel of one of the plurality of images corresponding to the portion of the actor and at least one pixel of the one of the plurality of images corresponding to the portion of the inventory area;
determining a plurality of probabilities for each of the plurality of images, wherein each of the plurality of probabilities is calculated for at least one pixel of each of the plurality of images, and wherein each of the plurality of probabilities is one of a probability that the at least one pixel represents an event of interest involving at least one of the container or the substance, a probability that the at least one pixel does not represent any events, or a probability that the at least one pixel represents an event other than the event of interest;
determining at least one position of the actor during at least a portion of the period of time;
determining that the actor executed the event of interest during the portion of the period of time based at least in part on the portion of the actor, the plurality of pairs of pixels, the at least one position and the plurality of probabilities; and
storing an indication that the event of interest is associated with the actor in at least one data store.

* * * * *